US006927261B2

(12) United States Patent
Shih

(10) Patent No.: US 6,927,261 B2
(45) Date of Patent: *Aug. 9, 2005

(54) METHOD OF MAKING SUPPORTED TRANSITION METAL POLYMERIZATION CATALYSTS AND COMPOSITIONS FORMED THEREFROM

(75) Inventor: Keng-Yu Shih, Columbia, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 29 days.

This patent is subject to a terminal disclaimer.

(21) Appl. No.: 10/120,291

(22) Filed: Apr. 10, 2002

(65) Prior Publication Data

US 2003/0203808 A1 Oct. 30, 2003

Related U.S. Application Data
(60) Provisional application No. 60/287,607, filed on Apr. 30, 2001.

(51) Int. Cl.⁷ .............................. C08F 4/44; B01J 31/38
(52) U.S. Cl. .................. 526/89; 526/161; 526/167; 502/104; 502/119; 502/120; 502/132; 502/133; 502/167; 502/232; 502/235; 502/236; 502/238; 502/242
(58) Field of Search ................................ 502/104, 119, 502/120, 132, 133, 167, 232, 235, 236, 238, 89, 127, 161, 171, 152, 81, 118, 239, 242; 526/127, 89, 161, 171

(56) References Cited

U.S. PATENT DOCUMENTS

| 2,825,721 | A | 3/1958 | Hogan et al. ............... 260/88.1 |
|---|---|---|---|
| 4,131,452 | A | 12/1978 | Collin ............................ 75/60 |
| 4,176,090 | A | 11/1979 | Vaughan et al. ............. 252/455 |
| 4,216,188 | A | 8/1980 | Shabrai et al. .............. 423/118 |
| 4,238,364 | A | 12/1980 | Shabtai ........................ 252/455 |
| 4,248,739 | A | 2/1981 | Vaughan et al. ............. 252/455 |
| 4,271,043 | A | 6/1981 | Vaughan et al. ............. 252/455 |
| 4,367,163 | A | 1/1983 | Pinnavaia et al. ........... 252/455 |
| 4,375,406 | A | 3/1983 | Santilli ........................ 208/251 |
| 4,629,712 | A | 12/1986 | Pinnavaia et al. ............ 502/63 |
| 4,637,992 | A | 1/1987 | Lewis et al. ................... 502/84 |
| 4,761,391 | A | 8/1988 | Occelli ......................... 502/63 |
| 4,859,648 | A | 8/1989 | Landis et al. ................ 502/242 |
| 4,981,825 | A | 1/1991 | Pinnavaia et al. ............ 502/63 |
| 4,995,964 | A | 2/1991 | Gortsema et al. ........... 208/112 |
| 5,064,802 | A | 11/1991 | Stevens et al. .............. 502/155 |
| 5,225,500 | A | 7/1993 | Elder et al. .................. 526/127 |
| 5,238,892 | A | 8/1993 | Chang ......................... 502/111 |
| 5,241,025 | A | 8/1993 | Hlatky et al. ................ 526/127 |
| 5,243,002 | A | 9/1993 | Razavi ......................... 526/170 |
| 5,250,277 | A | 10/1993 | Kresge et al. ............. 423/329.1 |
| 5,308,811 | A | 5/1994 | Suga et al. .................... 502/62 |
| 5,321,106 | A | 6/1994 | LaPointe ..................... 526/126 |
| 5,360,775 | A | 11/1994 | Suda et al. .................... 502/84 |
| 5,362,825 | A | 11/1994 | Hawley et al. .............. 526/125 |
| 5,395,808 | A | 3/1995 | Miller et al. .................... 502/7 |
| 5,399,636 | A | 3/1995 | Alt et al. ..................... 526/129 |
| 5,403,799 | A | 4/1995 | Miller et al. .................. 502/64 |
| 5,403,809 | A | 4/1995 | Miller et al. ................ 502/413 |
| 5,427,991 | A | 6/1995 | Turner ......................... 502/103 |
| 5,541,272 | A | 7/1996 | Schmid et al. .............. 526/160 |
| 5,569,634 | A | 10/1996 | Miller et al. .................. 502/64 |
| 5,624,878 | A | 4/1997 | Devore et al. .............. 502/152 |
| 5,633,419 | A | 5/1997 | Spencer et al. ............. 585/522 |
| 5,643,847 | A | 7/1997 | Walzer, Jr. .................. 502/117 |
| 5,714,424 | A | 2/1998 | Warthen et al. ............. 502/105 |
| 5,753,577 | A | 5/1998 | Hamura et al. ............. 502/113 |
| 5,807,800 | A | 9/1998 | Shamshoum et al. ....... 502/104 |
| 5,807,938 | A | 9/1998 | Kaneko et al. ............. 526/160 |
| 5,817,724 | A | 10/1998 | Aoki et al. .................. 526/127 |
| 5,830,820 | A | 11/1998 | Yano et al. ................... 502/62 |
| 5,866,663 | A | 2/1999 | Brookhart et al. .......... 526/170 |
| 5,880,241 | A | 3/1999 | Brookhart ................... 526/348 |
| 5,880,323 | A | 3/1999 | Brookhart, III et al. .... 585/527 |
| 5,886,224 | A | 3/1999 | Brookhart et al. .......... 564/272 |
| 5,891,963 | A | 4/1999 | Brookhart et al. ....... 525/326.1 |
| 5,928,982 | A | 7/1999 | Suga et al. .................. 502/118 |
| 5,955,555 | A | 9/1999 | Bennett ....................... 526/133 |
| 5,973,084 | A | 10/1999 | Suga et al. .................. 526/129 |
| 6,110,858 | A | 8/2000 | Kaneko et al. ............... 502/62 |
| 6,133,138 | A | 10/2000 | Ishibashi ..................... 438/623 |
| 6,174,976 | B1 | 1/2001 | Killian et al. ............... 526/172 |
| 6,184,171 | B1 | 2/2001 | Shih ............................ 502/158 |
| 6,329,315 | B1 | * | 12/2001 | Denton et al. ............. 502/232 |
| 6,399,535 | B1 | * | 6/2002 | Shih et al. .................. 502/167 |
| 6,559,090 | B1 | * | 5/2003 | Shih et al. .................. 502/152 |

FOREIGN PATENT DOCUMENTS

| DE | 19943936 | 9/1999 | ............. C08F/4/52 |
|---|---|---|---|
| EP | 426637 | 5/1991 | ........... C08F/4/603 |
| EP | 426638 | 5/1991 | ........... C08F/4/602 |
| EP | 490226 | 6/1992 | .............. B01J/2/00 |
| EP | 849288 | 12/1997 | ........... C08F/10/00 |
| EP | 849292 | 6/1998 | ........... C08F/10/00 |
| EP | 874006 | 10/1998 | ........... C08F/10/00 |

(Continued)

OTHER PUBLICATIONS

U.S. Appl. No. 09/431,803, filed Nov. 1, 1999, Shih.
U.S. Appl. No. 10/120,289, filed Apr. 10, 2002, Shih et al.
U.S. Appl. No. 10/120,291, filed Apr. 10, 2002, Shih.
U.S. Appl. No. 10/120,310, filed Apr. 10, 2002, Shih et al.
U.S. Appl. No. 10/120,314, filed Apr. 10, 2002, Shih et al.
U.S. Appl. No. 10/120,317, filed Apr. 10, 2002, Shih.
U.S. Appl. No. 10/120,331, filed Apr. 10, 2002, Shih.

(Continued)

Primary Examiner—Robert D. Harlan
(74) Attorney, Agent, or Firm—Howard J. Troffkin

(57) ABSTRACT

The present invention is directed to a novel one-step method for forming a supported catalyst complex of high activity by substantially simultaneously contacting a bidentate or tridentate ligand forming compound, a transition metal compound and a Lewis acid support-activator agglomerate. The catalyst can be formed prior to polymerization of olefins or within the polymerization reaction zone.

67 Claims, No Drawings

FOREIGN PATENT DOCUMENTS

| | | | |
|---|---|---|---|
| EP | 881232 | 12/1998 | ............ C08F/4/602 |
| JP | 2-78663 | 3/1990 | ......... C07D/213/53 |
| JP | 10-338516 | 12/1998 | ............ C01B/33/40 |
| JP | 11-292912 | 3/2000 | ............. C08F/4/52 |
| WO | WO 91/14713 | 10/1991 | ............ C08F/4/642 |
| WO | WO 92/00333 | 1/1992 | ............ C08F/10/00 |
| WO | WO 96/23010 | 8/1996 | ......... C08F/210/16 |
| WO | WO 97/19959 | 10/1996 | ............ C08F/4/603 |
| WO | WO 97/48743 | 12/1997 | ............ C08F/10/00 |
| WO | WO 98/27124 | 6/1998 | ............ C08F/10/00 |
| WO | WO 98/30612 | 7/1998 | ............ C08F/10/06 |
| WO | WO 99/46302 | 9/1999 | ............. C08F/4/70 |
| WO | WO 99/46303 | 9/1999 | ............ C08F/10/00 |
| WO | WO 99/46304 | 9/1999 | ............. C08F/4/70 |
| WO | WO 01/25149 | 4/2001 | ......... C01B/33/154 |
| WO | WO 01/32721 | 5/2001 | ............ C08F/10/00 |
| WO | WO 01/32722 | 5/2001 | ............ C08F/10/00 |
| WO | WO 01/42320 | 6/2001 | ............ C08F/10/00 |
| WO | WO 01/49747 | 7/2001 | ............. C08F/4/02 |

OTHER PUBLICATIONS

U.S. Appl. No. 60/287,600, filed Apr. 30, 2001, Shih et al.
U.S. Appl. No. 60/287,601, filed Apr. 30, 2001, Shih et al.
U.S. Appl. No. 60/287,602, filed Apr. 30, 2001, Shih et al.
U.S. Appl. No. 60/287,617, filed Apr. 30, 2001, Shih et al.
George J.P. Britovsek, Vernon C. Gibson, and Duncan F. Wass, Agnew. Chem. Int. Ed 1999, vol. 38, pp 428–447 "The Search for New–Generation Olefin Polymerization Catalysts: Life Beyond Metallocenes".
Pasquale Longo, Fabia Grisi, Antonio Proto, Adolfo Zambelli, "New Ni(II) based catalysts in the polymerization of olefins", Macromol. Rapid Commun. 19, 31–34 (1998).
Lynda K. Johnson, Stefan Mecking, and Maurice Brookhart, "Copolymerization of Ethylene and Propylene with Functionalized Vinyl Monomers by Palladium (II) Catalysts", 1996 American Chemical Society, vol. 118, No. 1, 1996.
Lynda K. Johnson, Christopher M. Killian, and Maurice Brookhart, "New Pd(II)– and Ni(II)– Based Catalysts for Polymerizatin of Ethylene and a–olefins", Journal American Chemical Society 1995, 177, 6414–6415.
"Novel polymerization reactions catalyzed by homogeneous Pd(II) and Ni(ii) a–diimino complexes", CatTech Highlights, Mar. 1997; p. 65–66.
"Move Over Metallocenes", Chemical Week, Apr. 29, 1998, p. 72.
"New Catalysts to Polymerize Olefins", C&EN, Apr. 13, 1998, pp 11–12.
Rip A. Lee, Rene J. Lachicotte, and Guillermo C. Bazan, "Zirconium Complexes of 9–Phenyl–9–borataanthracene. Synthesis, Structural Characterization, and Reactivity", Journal American Chemical Society 1998, 120, 6037–6046.
Brooke L. Small, Maurice Brookhart, and Alison M.A. Bennett, "Highly Active Iron and Cobalt Catalysts for the Polymerization of Ethylene", Journal American Chemical Society 1998, 120, 4049–4050.
John A. Ewen, Robert L. Jones, A. Razavi, "Syndiospecific Propylene Polymerizations with Group 4 Metallocenes", J. Am. Chem. Soc. 1988, 110, 6255–6256.
Thomas J. Pinnavaia "Intercalated Clay Catalysts", Science, Apr. 22, 1983, vol. 220, No. 4595, pp 365–371.
Yoshinori Suga, Eiji Isobe, Toru Suzuki, Kiyotoshi Fujioka, "Novel Clay Mineral–Supported Metallocene Catalysts For Olefin Polymerization," Publication Presentation at MetCon 99: "Polymers in Transition," Jun. 9–10, 1999, Houston, Texas, United States of America.
Nakamura, Yuji et al., "Clay Column Chromatography for Optical Resolution: Partial Resolutionof 1, 1'–Binaphthol on Optically Active [Co(phen)3–x(am)x]n+–Montmorillonite Columns"; Clay Sci. (1990), 8(1), 17–23, XP000983072, p. 18.

* cited by examiner

METHOD OF MAKING SUPPORTED TRANSITION METAL POLYMERIZATION CATALYSTS AND COMPOSITIONS FORMED THEREFROM

The present application is made with respect to U.S. provisional application Ser. No. 60/287,607, filed on Apr. 30, 2001.

FIELD OF THE INVENTION

The present invention relates to a novel method of preparing supported heterogeneous transition metal catalysts that are useful in olefin polymerization and to the catalyst compositions formed therefrom. More specifically, the present invention provides a single step method of forming a supported catalytic complex by substantially simultaneously contacting a bidentate or tridentate ligand forming compound, a transition metal compound and certain support-activator agglomerates and recovering the resultant supported catalytic composition. The resultant product is useful for the catalytic polymerization of olefins. The resultant product exhibits high catalytic activity while not requiring the presence of a separate activator (or cocatalyst) to achieve polymerization of olefins therewith.

BACKGROUND OF THE INVENTION

The present invention is directed to a single step process of forming a coordination catalyst composition by contacting a bidentate or a tridentate ligand forming compound, a transition metal compound and an inorganic oxide support-activator agglomerate. Further, the present process provides a coordination catalyst composite which does not require the initial formation and isolation of a bidentate or tridentate transition metal chelate nor the need to treat said chelate with a conventional cocatalyst compound (e.g. MAO, boranes or borates) to provide an active catalyst composition. The absence of such cocatalysts eliminates the need to handle flammable or hazardous compounds.

Coordination catalyst systems, which are usually based on transition metal compounds of Group 3 to 10 and organometallic compounds of Group 13 of the Periodic Table of the Elements, are an exceptionally diverse group of catalysts which are employed in chemical reactions of olefinically unsaturated compounds for the preparation of olefin polymers by coordination polymerization.

The preparation of polyethylene of increased density (high-density polyethylene, HDPE) and of polymers and copolymers of ethylene, propylene or other 1-alkenes is of considerable industrial importance. The use of organometallic catalyst for preparation of such polymers and copolymers has become of increasing interest.

The prevailing belief on the reaction mechanism of coordination catalysts is that the transition metal of the catalyst compound forms a catalytically active center to which the olefinically unsaturated compound bonds by coordination in a first step. Olefin polymerization takes place via coordination of the monomers and a subsequent insertion reaction into a transition metal-carbon or a transition metal-hydrogen bond.

The presence of activator compounds (e.g., organoaluminum compounds such as methylalumoxane) as part of coordination catalyst systems or during the catalyzed reaction is thought to be necessary in order to activate the catalyst. The chelate compound containing the transition metal atom is typically referred to as a "pre-catalyst." The required presence of certain compounds (e.g. MAO) known to be capable of causing alkylation of the transition metal atom and subsequent abstraction of hydrocarbyl group is believed required to provide an active catalytic site with respect to the pre-catalyst. Such compounds are typically referred to as "co-catalysts" and are selected from alkyl alumoxanes or certain borane or borate compounds. The combination of a pre-catalyst with a co-catalyst is believed required to provide an active catalytic complex system, generally referred to as a "primary catalyst". These co-catalysts have certain drawbacks which have inhibited the use of the resultant complex in commercial applications. The alumoxanes are pyrophoric and require special handling when used. The borane and borate co-catalysts, although easier to handle, are more expensive due to their formation from reagents that are difficult to handle. Because each of the co-catalysts is used in large amounts to form a resultant catalytic complex system, the concerns related to each is substantial.

The best known industrially used catalyst systems for coordination polymerization are those of the "Ziegler-Natta catalyst" type and the "Phillips catalyst" type. The former comprise the reaction product of a metal alkyl or hydride of an element of the first three main groups of the Periodic Table and a reducible compound of a transition metal element of Groups 4 to 7. The combination used most frequently comprises an aluminum alkyl, such as diethylaluminum chloride and titanium (IV) chloride. For example, it is known that highly active Ziegler-Natta catalysts are systems in which the titanium compound is fixed chemically to the surface of magnesium compounds, such as, in particular, magnesium chloride.

The Phillips Process for ethylene polymerization developed around Phillips catalyst that is composed of chromium oxide on silica as the support. This catalyst was developed by Hogan and Banks and described in U.S. Pat. No. 2,825,721, as well as A. Clark et al. in Ind. Eng. Chem. 48, 1152 (1956). Commercialization of this process provided the first linear polyalkenes and accounts for a large amount of the high-density polyethylene (HDPE) produced today.

More recent developments have focused on single-site catalyst systems. Such systems are characterized by the fact that their metal centers behave alike during polymerization to make very uniform polymers.

Catalysts are judged to behave in a single-site manner when the polymer they make meets some basic criteria (e.g., narrow molecular weight distribution, or uniform comonomer distribution). Thus, the metal can have any ligand set around it and be classified as "single-site" as long as the polymer that it produces has certain properties. Includable within single-site catalyst systems are metallocene catalysts and constrained geometry catalysts.

A "metallocene" is conventionally understood to mean a metal (e.g., Zr, Ti, Hf, Sc, Y, Vi or La) complex that is bound to at least one cyclopentadienyl (Cp) rings, or derivatives thereof, such as indenyl, tetrahydroindenyl, fluorenyl and mixtures. In addition to the two Cp ligands, other groups can be attached to the metal center, most commonly halides and alkyls. The Cp rings can be linked together (so-called "bridged metallocene" structure), as in most polypropylene catalysts, or they can be independent and freely rotating, as in most (but not all) metallocene-based polyethylene catalysts. The defining feature is the presence of two Cp ligands or derivatives thereof.

Metallocene catalysts can be employed either as so-called "neutral metallocenes" in which case an alumoxane, such as methylalumoxane, is used as an activator or they can be employed as so-called "cationic metallocenes" which incorporate a stable and loosely bound non-coordinating anion as a counter ion to a cationic metal metallocene center. Cationic metallocenes are disclosed in U.S. Pat. Nos. 5,064,802; 5,225,500; 5,243,002; 5,321,106; 5,427,991; and 5,643,847; and EP 426,637 and EP 426,638.

"Constrained geometry" is a term that refers to a particular class of organometallic complexes in which the metal center is bound by only one modified Cp ring or derivative. The Cp ring is modified by bridging to a heteroatom such as nitrogen, phosphorus, oxygen, or sulfur, and this heteroatom also binds to the metal site. The bridged structure forms a fairly rigid system; thus the term "constrained geometry". By virtue of its open structure, the constrained geometry catalyst can produce resins (long chain branching) that are not possible with normal metallocene catalysts.

The above-described single site catalyst systems are primarily based on early transition metal d° complexes useful in coordination polymerization processes. However, these catalysts are known to be oxophilic and, therefore, have low tolerance with respect to even small amounts of oxygenated impurities, such as oxygen, water and oxygenated hydrocarbons. Thus these materials are difficult to handle and use.

More recently, late transitional metal (e.g., Fe, Co, Ni, or Pd) bidentate and tridentate catalyst systems have been developed. Representative disclosures of such late transition metal catalysts are form in U.S. Pat. No. 5,880,241 and its divisional counterparts U.S. Pat. Nos. 5,880,323; 5,866,663; 5,886,224; 5,891,963; 6,184,171; 6,174,976; 6,133,138, and PCT International Application Nos. PCT/US98/00316; PCT/US97/23556; PCT/GB99/00714; PCT/GB99/00715; and PCT/GB99/00716.

It is commonly believed that both single site and late transition metal pre-catalysts typically require activation to form a cationic metal center by an organometal Lewis acid (e.g., methyl alumoxane (MAO)) (characterized as operating through a hydrocarbyl abstraction mechanism). Such activators or cocatalysts are pyrophoric (or require pyrophoric reagents to make the same), and are typically employed in quantities which are multiples of the catalyst. Attempts to avoid such disadvantages have led to the development of borane (e.g., trispentaflurophenylborane) and borate (e.g., ammonium tetrakispentaflurophenylborate) activators that are non-pyrophoric but more expensive to manufacture. These factors complicate the development of heterogeneous versions of such catalyst systems in terms of meeting cost and performance targets.

Use of these chelated transition metal pre-catalysts and related types in various polymerization processes can give products with sometimes extremely different properties. In the case of olefin polymers, which are generally known to be important as commercial materials suitable for a variety of applications depending on the one hand, on the nature of the monomers on which they are based and on the choice and ratio of comonomers and the typical physical parameters which characterize the polymer, such as average molecular weight, molecular weight distribution, degree of branching, crosslinking, crystallinity, density, presence of functional groups in the polymer and the like and on the other hand, on properties resulting from the process, such as the degree of branching of the resultant polymer structure, content of low molecular weight impurities, presence of catalyst residues, and, last but not least on costs.

In addition to realization of the desired product properties, other factors are decisive for evaluating the efficiency of a coordination catalyst system, such as the activity of the catalyst system, that is to say the amount of catalyst required for economic conversion of a given amount of olefin, the product conversion per unit time and the product yield. Catalyst systems such as the Fe or Co catalysts described herein, which exhibit high productivity and high specificity in favor of a low degree of branching of the polymer, are sought for certain applications, such as blow molding and the like. Catalyst systems utilizing the Ni and Pd catalysts, also described herein, seek to achieve highly branched polymers with reasonable productivity.

The stability and ease of handling of the catalyst or its components is another factor that affects the choice of commercial embodiments thereof. Practically all known coordination catalysts are extremely sensitive to air and moisture to varying degrees. Coordination catalysts are typically reduced in their activity or irreversibly destroyed by access to (atmospheric) oxygen and/or water. Most Ziegler-Natta and metallocene catalysts, for example, deactivate spontaneously on access to air and become unusable. Most coordination catalysts must therefor typically be protected from access to air and moisture during preparation, storage and use, which of course makes handling difficult and increases the cost to make polymer product using these catalysts.

An additional factor to be considered is the ability to utilize the coordination catalyst as a heterogeneous catalyst system. The advantages of a heterogeneous catalyst system are more fully realized in a slurry and gas phase polymerization processes. For example, slurry polymerizations are often conducted in a reactor wherein monomer, catalysts, and diluent are continuously fed into the reactor. The solid polymer that is produced is not dissolved in the diluent and is allowed to settle out before being periodically withdrawn from the reactor. In this kind of polymerization, factors other than activity and selectivity, which are always present in solution processes, become of paramount importance.

For example, in the slurry process it is desired to have a supported catalyst that produces relatively high bulk density polymer. If the bulk density is too low, the handling of the solid polymer becomes impractical. It is also an advantage to have the polymer formed as uniform, spherical particles that are relatively free of fines. Although fines can have a high bulk density, they do not settle as well as larger particles and thus present additional handling problems with the later processing of the polymer fluff.

Furthermore, slurry polymerization processes differ in other fundamental ways from the typical solution polymerization processes. Solution polymerization is normally conducted at high reaction temperatures (>130° C.) and pressure (>450 psi) which often results in lower molecular weight polymers. The lower molecular weight is attributed to the rapid chain-termination rates under such reaction conditions. Although lowering the reaction temperature and/or pressure, or changing molecular structure of the catalyst used in a solution process may produce higher molecular weight polymer, it becomes impractical to process the resulting high molecular weight polymers in the downstream equipment due to the high viscosity.

In contrast, a slurry reaction process overcomes many of the above disadvantages by simply operating at lower temperature (<110° C.). As a result, a higher molecular weight polymer with a uniform particle size and morphology can be routinely obtained. It is also advantageous to carry out slurry reactions with sufficiently high polymerization efficiencies such that residues from the polymerization catalysts do not have to be removed from the resulting polymers.

The above-discussed advantages of slurry polymerization processes provide incentive for developing coordination catalysts in heterogeneous form.

Thus, there has been a continuing search to develop a coordination catalyst system and methods of forming the same, which demonstrates high catalyst activity, are readily formed and can be produced in an inexpensive and efficient manner. Further, it is highly desired to have a coordination catalyst system which does not require an additional cocatalyst component, especially those conventionally used which are difficult, and even dangerous, to handle. Still further, there has also been a particular need to discover compounds, which are less sensitive to deactivation and/or less hazardous and still suitable as activating components in coordination catalyst systems. The present invention was developed in response to these searches.

The concerns directed to materials which are useful as a support for coordination pre-catalysts are described in WO97/48743 directed to spray-dried agglomerates of silica gel of controlled morphology and U.S. Pat. Nos. 5,395,808; 5,569,634; 5,403,799; 5,403,809 and EP 490,226 directed to formation of ultimate particles of bound clay by spray drying.

Supported catalyst systems are described in U.S. Pat. No. 5,633,419 which describes the use of spray-dried silica gel as a support for Ziegler-Natta catalyst systems; U.S. Pat. No. 5,362,825 directed to supported Ziegler-Natta catalysts formed by contacting a pillared clay material with a Ziegler-Natta catalyst composition; U.S. Pat. No. 5,807,800 directed to a supported metallocene catalyst formed by contacting a particulate support with a formed stereo specific metallocene ligand; U.S. Pat. No. 5,238,892 directed to use of undehydrated silica as support for metallocene and activator; and U.S. Pat. No. 5,308,811 directed to formation of supported metallocene-type transition metal compound by contacting it with a clay and an organoaluminum compound.

WO 0125149 A2 discloses a composition comprising an acid treated cation exchanging layered substrate material dispersed in silica gel as a support for a metallocene polymerization catalyst. Acidification is accomplished using a Bronsted acid such as sulfuric acid or an acidified amine, e.g., ammonium sulfate in a mixture with alkaline metal silicate such that the latter precipitates as silica hydrogel. The resulting slurry is dried, e.g., spray dried, and contacted with a metallocene catalyst. Preferably the layered silicate material is fully acid exchanged.

WO 0149747A1 discloses a supported catalyst composition comprising an organoaluminum compound, an organometal compound and an oxide matrix support wherein the latter is a mixture of an oxide precursor compound such as a silica source and a substantially decomposed (exfoliated) layered mineral such as a clay. Decomposition of the clay is achieved, for example, by solvent digestion in a strong acidic and basic medium at elevated temperatures combined with high energy or high shear mixing to product a colloidal suspension. Decomposition (exfoliation) converts the material to its residual mineral components and is said to be complete when the layered mineral no longer has its original layered structure.

WO 0142320 discloses a clay or expanded clay useful as a polymerization catalyst support. The support comprises the reaction product of the clay or expanded clay with an organometallic, or organometalloid, compound in order to reduce, cap or remove residual hydroxyl or other polar functionality of the clay and replace such groups with the organometallic compound. An organometallic or organometalloid derivative is bound to the support through the support oxygen or other polar functionality. Prior to reaction with the organometallic compound, the clay can be ion exchanged to replace at least a portion of alkali or alkali earth metal cations, e.g. sodium or magnesium, originally present in the clay. The chemically modified clay may be calcined either before or after treatment with the organometallic compound; prior treatment is preferred. The organometallic or organometalloid compound contains Mg, Zn or boron, preferably Zn, and the organic group preferably is a $C_1$–$C_{10}$ alkyl.

The teachings of intercalated clays as support materials for catalytic compositions include; U.S. Pat. No. 5,753,577 (directed to a polymerization catalyst comprising a metallocene compound, a co-catalyst such as proton acids, ionized compounds, Lewis acids and Lewis acidic compounds, and a clay mineral); U.S. Pat. No. 5,399,636 (directed to a composition comprising a bridged metallocene which is chemically bonded to an inorganic moiety such as clay or silica); EP 849,292 (directed to an olefin polymerization catalyst consisting essentially of a metallocene compound, a modified clay compound, and an organoaluminum compound); U.S. Pat. No. 5,807,938 (directed to an olefin polymerization catalyst obtained by contacting a metallocene compound, an organometallic compound, and a solid component comprising a carrier and an ionized ionic compound capable of forming a stable anion on reaction with the metallocene compound); U.S. Pat. No. 5,830,820 and EP 881,232 (directed to an olefin polymerization catalyst comprising a metallocene compound, and an organoaluminum compound and a clay mineral which has been modified with a compound capable of introducing a cation into the layer interspaces of the clay); EP 849,288 (discloses an olefin polymerization catalyst consisting essentially of metallocene compound, an organoaluminum compound, and a clay compound that has been modified with a proton acid); and U.S. Pat. No. 4,761,391 (directed to delaminated clays whose x-ray defraction patterns do not contain a distinct first order reflection. These clays are made by reacting swelling clays with a pillaring agent.) The ratio of clay to pillaring agents is disclosed to be between about 0.1 and about 10. To obtain the delaminated clay, a suspension of swelling clay, having the proper morphology, e.g., colloidal particle size, is mixed with a solution or a suspension of the pillaring agent at the aforedescribed ratios. As the reactants are mixed, the platelets of clay rapidly sorb the pillaring agent producing a flocculated mass.

Additional patents, which disclose intercalated clays, are U.S. Pat. Nos. 4,375,406; 4,629,712 and 4,637,992. Additional patents, which disclose pillared clays, include U.S. Pat. Nos. 4,995,964 and 5,250,277.

PCT International Application No. PCT/US96/17140, corresponding to U.S. Ser. No. 562,922, discloses a support for metallocene olefin polymerization comprising the reaction product of an inorganic oxide comprising a solid matrix having reactive hydroxyl groups or reactive silane functionalized derivatives of hydroxyl groups on the surface thereof, and an activator compound. The activator compound comprises a cation which is capable of reacting with a metallocene compound to form a catalytically active transition metal complex.

U.S. Pat. No. 5,880,241 discloses various late transition metal bidentate catalyst compositions. At column 52, lines 18 et seq., it is disclosed that the catalyst can be heterogenized through a variety of means including the use of heterogeneous inorganic materials as non-coordinating counter ions. Suitable inorganic materials disclosed include aluminas, silicas, silica/aluminas, cordierites, clays, and $MgCl_2$ but mixtures are not disclosed. Spray drying the catalyst with its associated non-coordinating anion onto a polymeric support is also contemplated. Examples 433 and 434 employ montmorillonite clay as a support but polymer morphology is not disclosed for these examples.

PCT International Application No. PCT/US97/23556 discloses a process for polymerizing ethylene by contact with Fe or Co tridentate ionic complex formed either through alkylation or abstraction of the metal alkyl by a strong Lewis acid compound, e.g., MAO, or by alkylation with a weak Lewis acid, e.g., triethylaluminum and, subsequent abstraction of the resulting alkyl group on the metal center with a stronger Lewis acid, e.g., $B(C_6F_5)_3$.

U.S. Ser. No. 09/166,545, filed Oct. 5, 1998, by Keng-Yu Shih, an inventor of the present application, discloses a supported late transition metal bidentate or tridentate catalyst system containing anion and cation components wherein the anion component contains boron, aluminum, gallium, indium, tellurium and mixtures thereof covalently bonded to an inorganic support (e.g., $SiO_2$) through silane derived intermediates such as silica-tethered anilinium borate.

U.S. Ser. No. 09/431,803 by Keng-Yu Shih discloses the use of silica agglomerates as a support for transition metal catalyst systems employing specifically controlled (e.g., very low) amounts of non-abstracting aluminum alkyl activators.

U.S. Ser. No. 09/432,008 by Keng-Yu Shih et al. discloses the use of a support-activator in agglomerate form used with metallocene and/or constrained geometry coordination catalyst components and methods of their preparation.

U.S. Ser. No. 09/431,771 by Keng-Yu Shih et al discloses the use of a support-activator in agglomerate form and coordination catalyst systems based on certain transition metal compounds in combination with organometallic compounds of Group 13 of the Periodic Table of Elements.

In general, the above Shih et al. teachings utilize a supported catalyst system that requires the formation of the pre-catalyst component and then applying the same by deposition or chemical bonding the pre-catalyst to a support material. Thus, one first forms and isolates the pre-catalyst compound for subsequent application to an inorganic oxide support. Both the pre-catalyst and activator agents must be carefully handled to prevent their deactivation.

The following documents are known to the present inventors:

U.S. provisional application Ser. No. 60/287,601, filed on Apr. 30, 2001, discloses catalyst composition composed of a support-activator agglomerate comprising i) at least one inorganic oxide component, and ii) at least one ion-containing layered component, and the agglomerate has chromium atoms covalently immobilized thereon and therein.

U.S. provisional application Ser. No. 60/287,602, filed on Apr. 30, 2001, discloses a catalyst composition composed of a support-activator agglomerate comprising i) at least one inorganic oxide component, and ii) at least one ion-containing layered component. The agglomerate is a support activator for a combination of catalysts comprising at least one metallocene catalyst and at least one coordination catalyst of a bidentate or tridentate pre-catalyst transition metal compound.

U.S. provisional application Ser. No. 60/287,617, filed on Apr. 30, 2001, discloses a process for forming a catalyst composition comprising substantially simultaneously contacting at least one bidentate ligand forming compound or at least one tridentate ligand forming compound or mixtures thereof with a transition metal compound and with a support-activator agglomerate comprising i) at least one inorganic oxide component, and ii) at least one ion-containing layered component and the agglomerate has chromium atoms covalently bonded to oxygen atoms of the inorganic oxide. The reference is further directed to the resultant catalyst composition for which the support-activator agglomerate functions as the activator for the catalyst system.

U.S. provisional application Ser. No. 60/287,600, filed on Apr. 30, 2001, discloses a catalyst composition composed of a support-activator agglomerate comprising i) at least one inorganic oxide component, and ii) at least one ion-containing layered component and the agglomerate has chromium atoms covalently bonded to oxygen atoms of the inorganic oxide. The agglomerate provides a support for at least one coordination catalyst comprising a pre-catalyst composed of a bidentate or tridentate ligand containing transition metal compound.

Additional patent applications known to the inventors are concurrently filed and copending U.S. applications having Ser. No. 10/120,289; Ser. No. 10/120,317; Ser. No. 10/120,331; Ser. No. 10/120,310; and Ser. No. 10/120,314. The teachings of each of the above cited provisional applications and concurrently filed applications are incorporated herein in their entirety by reference.

SUMMARY OF THE INVENTION

The present invention relies on the discovery that a supported late transition metal catalyst system can be directly formed in a single step process. The process comprises substantially simultaneously contacting a ligand forming compound with a transition metal compound and with an inorganic oxide agglomerate composite particle, all of which are fully described herein below.

The present process eliminates the need for initially forming a transition metal chelate pre-catalyst, isolating it, and subsequently treating the chelate with a chosen support to provide a pre-catalyst which can be subsequently activated with known activators or co-catalysts, such as methylalumoxane.

The present invention further relies on the discovery that the single step process described herein provides a catalyst composition that generally is higher in activity than compositions formed from related, previously isolated, chelate complexes, which are subsequently transformed into a supported coordination catalyst system.

The present invention still further relies on the discovery that the formed supported, single site transition metal catalyst complex provides the desired catalytic activity without the need for known difficult to handle catalyst activators.

DETAILED DESCRIPTION OF THE INVENTION

The present invention is directed to a process of forming a heterogeneous catalyst composition that does not require the isolation and subsequent utilization of a bidentate or tridentate transition metal complex and to the catalyst composition produced by the present process. The catalyst composition is capable of polymerizing olefins in high activity without the need for a traditional cocatalyst (or activator), such as MAO or perflourinated borane reagents.

The present process is carried out in substantially a single step comprising contacting:

I. A bidentate (IA) or tridentate (IB) forming compound or mixtures thereof, which collectively are referred to as compound or ligand I; with II. A transition metal compound (II) wherein the metal is selected from at least one metal of Group 3 to 10 of the Periodic Table; and with III. A support-activator agglomerate (III) comprising a composite of I(A) at least one inorganic oxide component and (B) at least one ion containing layered material.

In another aspect of the present invention the process can, alternately, be carried out in substantially a single step comprising contacting:

I'. Precursor reagents capable of forming a bidentate (IA) or tridentate ligand (IB) forming compound, which collectively are referred to as I-Pre; and II'. A transition metal compound (II) wherein the metal is selected from at least one metal of Group 3 to 10 of the Periodic Table; and with III'. A support-activator agglomerate (III) comprising a composite of I(A) at least one inorganic oxide component; and (B) at least one ion containing layered material.

In still another embodiment of the present invention, the present invention can be carried out by contacting, in substantially a single step the agents of I or I-Pre with II and further with a mixture of:

III" At least one inorganic oxide component selected from $SiO_2$, $Al_2O_3$, MgO, $AlPO_4$, $TiO_2$, $ZrO_2$, $Cr_2O_3$, mixed oxides thereof and mixtures of the same; and III'" At least one ion containing layered material having interspaces between the layers and having a cationic component and an anionic component, wherein the cationic component is present within the interspaces of the layered material; and agglomerating III" and III'" in the presence of the other components of the mixture.

Each of components of I, I', II, II' III, or III', III" and III'" above are fully described herein below.

Component I can be generally represented by the formula:

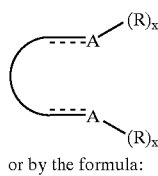

IA or by the formula:

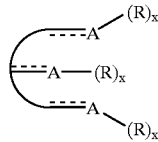

IB wherein in each of formulas IA and IB above:

each A independently represents oxygen, sulfur, phosphorous or nitrogen, and preferably represents oxygen or nitrogen or a combination thereof, and most preferably each A in IA and at least two A's of IB represent nitrogen;

each R independently represents hydrogen, an unsubstituted or substituted $C_1$–$C_{20}$, preferably $C_3$–$C_{20}$ hydrocarbyl, such as an alkyl, aryl, alkaryl or aralkyl group;

each x independently represents an integer of 0, 1 or 2 provided that when A is either a nitrogen or phosphorous atom x is 1 where A is bonded by a double bond (when - - - represents a double bond) and x is 2 when A is bonded by a single bond (when - - - represents a single bond) and provided that when A is either an oxygen or sulfur x is 0 when A is bonded by a double bond; and x is 1 when A is bonded by a single bond; and the lines joining each A to each other A represent a hydrocarbon based radical, (typically a $C_2$to $C_{90}$ (e.g., $C_2$to $C_{20}$) preferably $C_3$ to $C_{30}$ (e.g., $C_3$ to $C_{12}$) hydrocarbon based radical, such as a hydrocarbylene radical providing a ring or fused ring hydrocarbylene structure or substituted hydrocarbylene structure. Portions of the structure may be comprised of carbon-carbon double bonds, carbon-carbon single bonds and, with respect to covalent bonds between a carbon and an A atom, each may independently be a carbon-A atom double bonds (wherein - - - represents a double bond) and carbon-A atom single bonds (wherein - - - represents a single bond).

Typically, for the ligand forming compounds used in the present invention, the carbons includable in the lines connecting each of the (A) groups collectively can be joined by a 4 to 7, preferably 5 to 7 member ring structures.

The above described ligand forming compounds from which the subject catalyst is derived are known. The disclosure of such components and the methods of forming the same have been described in various publications, including PCT Pub. Nos. WO 96/23010; WO 99/46302; WO 99/46303; and WO 99/46304; U.S. Pat. Nos. 5,880,241; 5,880,323; 5,866,663; 5,886,224; and 5,891,963; Journal of the American Chemical Society (JACS) 1998, 120, 6037–6046, JACS 1995, 117, 6414–6415 and Supplemental Teachings; JACS 1996, 118, 1518; Macromol. Rapid Commun. 19, 31–34 (1998); Caltech Highlights 1997, 65–66; Chem Week Apr. 29, 1998, 72; C&EN Apr. 13, 1998 11–12; JACS 1998, 120, 4049–4050; Japanese Patent Application 02-078,663, and Angew. Chem. Int. Ed. 1999, vol. 38, pp 428–447, The Search for New-Generation Olefin Polymerization Catalysts: Life Beyond Metallocenes. The teaching of each of the above cited references are incorporated herein in its entirety by reference.

As used herein and in the appended claims, the term "hydrocarbon-based radical or group" denotes a radical or group having a carbon atom directly attached to the remainder of the molecule and having a predominantly hydrocarbon character within the context of this invention. Moreover, in this context the terms "group" and "radical" are used interchangeably. Such radicals include the following:

Hydrocarbon radicals; that is, aliphatic radicals, aromatic- and alicyclic-substituted radicals, and the like, of the type known to those skilled in art.

Substituted hydrocarbon radicals; that is, radicals containing pendant non-hydrocarbon substituents, that in the context of this invention, do not alter the predominantly hydrocarbon character of the radical or constitute a poison for the subject catalyst composition or any of the components thereof. Those skilled in the art will be aware of suitable substituents; examples are halo, nitro, hydroxy, alkoxy, carbalkoxy, and alkythio.

Hetero radicals; that is, radicals which, while predominantly hydrocarbon in character within the context of this invention, contain atoms other than carbon present as a member of the linear structure of a chain or ring otherwise composed of carbon atoms. Suitable heteroatoms will be apparent to those skilled in the art and include, for example, nitrogen, oxygen and sulfur. In general, no more than three substituents or hetero atoms, and preferably no more than one, will be present for each 10 carbon atoms in the hydrocarbon based radical.

Preferred ligand forming compounds known to provide bidentate complexes may, for example, be represented as compounds of the formula:

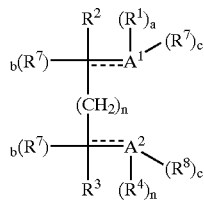

wherein
a, b and c each independently represents 1 or 0 to indicate whether its associated R group is present (1) or not (0);

$R^1$ and $R^4$ are each independently selected from an unsubstituted or substituted $C_1$–$C_{20}$, preferably $C_3$–$C_{20}$ hydrocarbyl, such as alkyl, aryl, alkaryl or aralkyl group, as for example, i-propyl; t-butyl; 2,4,6-trimethylphenyl; 2-methylphenyl; 2,6-diisopropylphenyl; their fluorinated derivatives and the like; or with adjacent groups, together, may represent a $C_3$–$C_{20}$ hydrocarbylene group;

$R^2$, $R^3$, $R^5$, $R^6$, $R^7$, and $R^8$ are each independently selected from hydrogen, an unsubstituted or substituted $C_1$–$C_{20}$ hydrocarbyl group such as an alkyl, aryl, alkaryl or aralkyl group, as for example, methyl, ethyl, i-propyl, butyl (all isomers), phenyl, toluyl, 2,6-diisopropylphenyl and the like; or any of the R groups and adjacent carbon atoms, such as $R^2$ and $R^3$, taken together can provide an unsubstituted or substituted $C_3$–$C_{20}$ ring forming hydrocarbylene group, such as hexylene, 1,8-naphthylene and the like;

each A independently represents oxygen, nitrogen, sulfur or phosphorous and preferably represents oxygen or nitrogen and most preferably represents nitrogen. The bonds depicted by a dotted line signify the possibility that the atoms bridged by said dotted line may be bridged by a single or double bond.

It will be understood that the particular identity of a, b and c, in Formula I(a) will be dependent on (i) the identity of heteroatom A and (ii) whether the bond between heteroatom A and its adjacent ring carbon is single or double.

More specifically, when $A^1$ in Formula I(a) is nitrogen, it will always have at least 3 available vacancies for bonding. If the bond between such N and its adjacent ring carbon is a double covalent bond, the a for $R^1$ and the b for $R^5$ will be zero, and only one further vacancy will be available for the N for a covalent bond with $R^7$ (thus c would be 1), or if the bonds between the N and the adjacent ring carbon is a single covalent bond, then a of $R^1$, the b of $R^5$ and the c of $R^7$ will be 1.

The above rules are modified when $A^1$ in Formula I(a) has a valence of 2, such as oxygen because oxygen has only 2 available vacancies rather than the 3 vacancies for N. Thus, when $A^1$ is oxygen and is double covalently bonded to the adjacent ring carbon, the a of $R^1$, the b of $R^5$ and the c of $R^7$ will each be 0. If such double bond is replaced by a single bond, then a of $R^1$ and the b of $R^5$ will be 1.

The vacancy rules when $A^1$ is sulfur are the same as for $A^1$ being oxygen. Phosphorous typically has 3 available vacancies for 3 single covalent bonds or 1 double covalent bond and 1 single covalent bond and will have the same rules as described above for nitrogen.

Similar considerations to those described above for $A^1$ apply in respect to $A^2$ of Formula Ia and in respect to all A groups and a, b, c, of Formula Ib discussed hereinafter.

Illustrative of ligand forming compounds which are useful in providing the catalyst composition of the present invention are compounds of Ia having the following combination of groups:

TABLE Ia

| # | n | $R^1$/$R^4$ | $R^2$/$R^3$ | $R^5$/$R^6$ | $R^7$/$R^8$ | $A^1$ | $A^2$ | c | b | a |
|---|---|---|---|---|---|---|---|---|---|---|
| 1 | 0 | 2,6-i-$Pr_2$Ph | Me | N/A | N/A | N | N | 0 | 0 | 1 |
| 2 | 0 | 2,6-n-$Pr_2$Ph | Me | N/A | N/A | N | N | 0 | 0 | 1 |
| 3 | 0 | 2,6-$Me_2$Ph | Me | N/A | N/A | N | N | 0 | 0 | 1 |
| 4 | 0 | 2,6-$Et_2$Ph | Me | N/A | N/A | N | N | 0 | 0 | 1 |
| 5 | 0 | 2,6-t-$Bu_2$Ph | Me | N/A | N/A | N | N | 0 | 0 | 1 |
| 6 | 0 | 2,6-$Ph_2$Ph | Me | N/A | N/A | N | N | 0 | 0 | 1 |
| 7 | 0 | 2,6-$Cl_2$Ph | Me | N/A | N/A | N | N | 0 | 0 | 1 |
| 8 | 0 | 2,6-$Br_2$Ph | Me | N/A | N/A | N | N | 0 | 0 | 1 |
| 9 | 0 | 2,6-$I_2$Ph | Me | N/A | N/A | N | N | 0 | 0 | 1 |
| 10 | 0 | 2,6-$Br_2$-4-MePh | Me | N/A | N/A | N | N | 0 | 0 | 1 |
| 11 | 0 | 2,4-$Ph_2C_4$N | Me | N/A | N/A | N | N | 0 | 0 | 1 |
| 12 | 0 | 2,5-i-$Pr_2C_4H_2$N | Me | N/A | N/A | N | N | 0 | 0 | 1 |
| 13 | 0 | 2,5-$Me_2C_4H_2$N | Me | N/A | N/A | N | N | 0 | 0 | 1 |
| 14 | 0 | 2,4-i-$Pr_2C_4$N | Me | N/A | N/A | N | N | 0 | 0 | 1 |
| 15 | 0 | 2,4-$Me_2C_4$N | Me | N/A | N/A | N | N | 0 | 0 | 1 |
| 16 | 1 | 2,6-i-$Pr_2$Ph | Me | N/A | N/A | N | N | 0 | 0 1 | |
| 17 | 1 | 2,6-n-$Pr_2$Ph | Me | N/A | N/A | N | N | 0 | 0 1 | |
| 18 | 1 | 2,6-$Me_2$Ph | Me | N/A | N/A | N | N | 0 | 0 | 1 |
| 19 | 1 | 2,6-$Et_2$Ph | Me | N/A | N/A | N | N | 0 | 0 | 1 |
| 20 | 1 | 2,6-t-$Bu_2$Ph | Me | N/A | N/A | N | N | 0 | 0 1 | |
| 21 | 1 | 2,6-$Ph_2$Ph | Me | N/A | N/A | N | N | 0 | 0 | 1 |
| 22 | 1 | 2,6-$Cl_2$Ph | Me | N/A | N/A | N | N | 0 | 0 | 1 |
| 23 | 1 | 2,6-$Br_2$Ph | Me | N/A | N/A | N | N | 0 | 0 | 1 |
| 24 | 1 | 2,6-$I_2$Ph | Me | N/A | N/A | N | N | 0 | 0 | 1 |
| 25 | 1 | 2,6-$Br_2$-4-MePh | Me | N/A | N/A | N | N | 0 | 0 1 | |
| 26 | 1 | 2,4-$Ph_2C_4$N | Me | N/A | N/A | N | N | 0 | 0 | 1 |
| 27 | 1 | 2,5-i-$Pr_2C_4$N | Me | N/A | N/A | N | N | 0 | 0 | 1 |
| 28 | 1 | 2,5-$Me_2C_4$N | Me | N/A | N/A | N | N | 0 | 0 | 1 |
| 29 | 1 | 2,4-i-$Pr_2C_4$N | Me | N/A | N/A | N | N | 0 | 0 | 1 |
| 30 | 1 | 2,4-$Me_2C_4$N | Me | N/A | N/A | N | N | 0 | 0 | 1 |
| 31 | 2 | 2,6-i-$Pr_2$Ph | Me | N/A | N/A | N | N | 0 | 0 | 1 |
| 32 | 2 | 2,6-n-$Pr_2$Ph | Me | N/A | N/A | N | N | 0 | 0 | 1 |
| 33 | 2 | 2,6-$Me_2$Ph | Me | N/A | N/A | N | N | 0 | 0 | 1 |
| 34 | 2 | 2,6-$Et_2$Ph | Me | N/A | N/A | N | N | 0 | 0 | 1 |
| 35 | 2 | 2,6-t-$Bu_2$Ph | Me | N/A | N/A | N | N | 0 | 0 1 | |
| 36 | 2 | 2,6-$Ph_2$Ph | Me | N/A | N/A | N | N | 0 | 0 | 1 |
| 37 | 2 | 2,6-$Cl_2$Ph | Me | N/A | N/A | N | N | 0 | 0 | 1 |
| 38 | 2 | 2,6-$Br_2$Ph | Me | N/A | N/A | N | N | 0 | 0 | 1 |
| 39 | 2 | 2,6-$I_2$Ph | Me | N/A | N/A | N | N | 0 | 0 | 1 |
| 40 | 2 | 2,6-$Br_2$-4-MePh | Me | N/A | N/A | N | N | 0 | 0 | 1 |
| 41 | 2 | 2,4-$Ph_2C_4$N | Me | N/A | N/A | N | N | 0 | 0 | 1 |
| 42 | 2 | 2,5-$Me_2C_4$N | Me | N/A | N/A | N | N | 0 | 0 | 1 |
| 43 | 2 | 2,5-i-$Pr_2C_4$N | Me | N/A | N/A | N | N | 0 | 0 | 1 |
| 44 | 0 | 2,6-i-$Pr_2$Ph | An | N/A | N/A | N | N | 0 | 0 | 1 |
| 45 | 0 | 2,6-n-$Pr_2$Ph | An | N/A | N/A | N | N | 0 | 0 | 1 |
| 46 | 0 | 2,6-$Me_2$Ph | An | N/A | N/A | N | N | 0 | 0 | 1 |
| 47 | 0 | 2,6-$Et_2$Ph | An | N/A | N/A | N | N | 0 | 0 | 1 |
| 48 | 0 | 2,6-t-$Bu_2$Ph | An | N/A | N/A | N | N | 0 | 0 | 1 |
| 49 | 0 | 2,6-$Ph_2$Ph | An | N/A | N/A | N | N | 0 | 0 | 1 |
| 50 | 0 | 2,6-$Cl_2$Ph | An | N/A | N/A | N | N | 0 | 0 | 1 |
| 51 | 0 | 2,6-$Br_2$Ph | An | N/A | N/A | N | N | 0 | 0 | 1 |
| 52 | 0 | 2,6-$I_2$Ph | An | N/A | N/A | N | N | 0 | 0 | 1 |
| 53 | 0 | 2,6-$Br_2$-4-MePh | An | N/A | N/A | N | N | 0 | 0 | 1 |
| 54 | 0 | 2,4-$Ph_2C_4$N | An | N/A | N/A | N | N | 0 | 0 | 1 |
| 55 | 0 | 2,4-$Me_2C_4$N | An | N/A | N/A | N | N | 0 | 0 | 1 |
| 56 | 0 | 2,4-i-$Pr_2C_4$N | j | N/A | N/A | N | N | 0 | 0 | 1 |
| 57 | 0 | 2,6-i-$Pr_2$Ph | j | N/A | N/A | N | N | 0 | 0 | 1 |
| 58 | 0 | 2,6-n-$Pr_2$Ph | j | N/A | N/A | N | N | 0 | 0 | 1 |
| 59 | 0 | 2,6-$Me_2$Ph | j | N/A | N/A | N | N | 0 | 0 | 1 |
| 60 | 0 | 2,6-$Et_2$Ph | j | N/A | N/A | N | N | 0 | 0 | 1 |
| 61 | 0 | 2,6-t-$Bu_2$Ph | j | N/A | N/A | N | N | 0 | 0 | 1 |
| 62 | 0 | 2,6-$Ph_2$Ph | j | N/A | N/A | N | N | 0 | 0 | 1 |
| 63 | 0 | 2,6-$Cl_2$Ph | j | N/A | N/A | N | N | 0 | 0 | 1 |
| 64 | 0 | 2,6-$Br_2$Ph | j | N/A | N/A | N | N | 0 | 0 | 1 |
| 65 | 0 | 2,6-$I_2$Ph | j | N/A | N/A | N | N | 0 | 0 | 1 |

TABLE Ia-continued

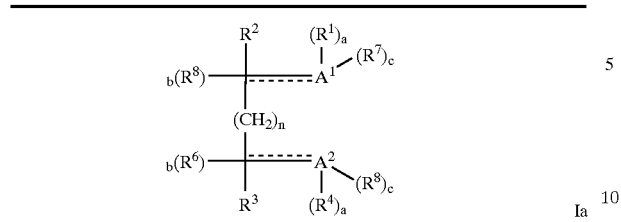

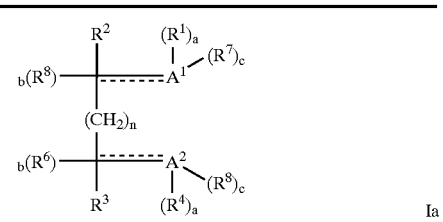

Ia

| # | n | R¹/R⁴ | R²/R³ | R⁵/R⁶ | R⁷/R⁸ | A¹ | A² | c | b | a |
|---|---|---|---|---|---|---|---|---|---|---|
| 66 | 0 | 2,6-Br$_2$-4-MePh | j | N/A | N/A | N | N | 0 | 0 | 1 |
| 67 | 0 | 2,4-Ph$_2$C$_4$N | j | N/A | N/A | N | N | 0 | 0 | 1 |
| 68 | 0 | 2,4-Me$_2$C$_4$N | j | N/A | N/A | N | N | 0 | 0 | 1 |
| 69 | 0 | 2,4-i-Pr$_2$C$_4$N | j | N/A | N/A | N | N | 0 | 0 | 1 |
| 70 | 0 | 2,4-i-Pr$_2$C$_4$N | k | N/A | N/A | N | N | 0 | 0 | 1 |
| 71 | 0 | 2,6-i-Pr$_2$Ph | k | N/A | N/A | N | N | 0 | 0 | 1 |
| 72 | 0 | 2,6-n-Pr$_2$Ph | k | N/A | N/A | N | N | 0 | 0 | 1 |
| 73 | 0 | 2,6-Me$_2$Ph | k | N/A | N/A | N | N | 0 | 0 | 1 |
| 74 | 0 | 2,6-Et$_2$Ph | k | N/A | N/A | N | N | 0 | 0 | 1 |
| 75 | 0 | 2,6-t-Bu$_2$Ph | k | N/A | N/A | N | N | 0 | 0 | 1 |
| 76 | 0 | 2,6-Ph$_2$Ph | k | N/A | N/A | N | N | 0 | 0 | 1 |
| 77 | 0 | 2,6-Cl$_2$Ph | k | N/A | N/A | N | N | 0 | 0 | 1 |
| 78 | 0 | 2,6-Br$_2$Ph | k | N/A | N/A | N | N | 0 | 0 | 1 |
| 79 | 0 | 2,6-I$_2$Ph | k | N/A | N/A | N | N | 0 | 0 | 1 |
| 80 | 0 | 2,6-Br$_2$-4-MePh | k | N/A | N/A | N | N | 0 | 0 | 1 |
| 81 | 0 | 2,4-Ph$_2$C$_4$N | k | N/A | N/A | N | N | 0 | 0 | 1 |
| 82 | 0 | 2,4-Me$_2$C$_4$N | k | N/A | N/A | N | N | 0 | 0 | 1 |
| 83 | 0 | 2,4-i-Pr$_2$C$_4$N | k | N/A | N/A | N | N | 0 | 0 | 1 |
| 84 | 1 | 2,6-i-Pr$_2$Ph | An | N/A | N/A | N | N | 0 | 0 | 1 |
| 85 | 1 | 2,6-n-Pr$_2$Ph | An | N/A | N/A | N | N | 0 | 0 | 1 |
| 86 | 1 | 2,6-Me$_2$Ph | An | N/A | N/A | N | N | 0 | 0 | 1 |
| 87 | 1 | 2,6-Et$_2$Ph | An | N/A | N/A | N | N | 0 | 0 | 1 |
| 88 | 1 | 2,6-t-Bu$_2$Ph | An | N/A | N/A | N | N | 0 | 0 | 1 |
| 89 | 1 | 2,6-Ph$_2$Ph | An | N/A | N/A | N | N | 0 | 0 | 1 |
| 90 | 1 | 2,6-Cl$_2$Ph | An | N/A | N/A | N | N | 0 | 0 | 1 |
| 91 | 1 | 2,6-Br$_2$Ph | An | N/A | N/A | N | N | 0 | 0 | 1 |
| 92 | 1 | 2,6-I$_2$Ph | An | N/A | N/A | N | N | 0 | 0 | 1 |
| 93 | 1 | 2,6-Br$_2$-4-MePh | An | N/A | N/A | N | N | 0 | 0 | 1 |
| 94 | 1 | 2,4-Ph$_2$C$_4$N | An | N/A | N/A | N | N | 0 | 0 | 1 |
| 95 | 1 | 2,4-i-Pr$_2$C$_4$N | An | N/A | N/A | N | N | 0 | 0 | 1 |
| 96 | 1 | 2,4-Me$_2$C$_4$N | An | N/A | N/A | N | N | 0 | 0 | 1 |
| 97 | 1 | 2,6-i-Pr$_2$Ph | j | N/A | N/A | N | N | 0 | 0 | 1 |
| 98 | 1 | 2,6-n-Pr$_2$Ph | j | N/A | N/A | N | N | 0 | 0 | 1 |
| 99 | 1 | 2,6-Me$_2$Ph | j | N/A | N/A | N | N | 0 | 0 | 1 |
| 100 | 1 | 2,6-Et$_2$Ph | j | N/A | N/A | N | N | 0 | 0 | 1 |
| 101 | 1 | 2,6-t-Bu$_2$Ph | j | N/A | N/A | N | N | 0 | 0 | 1 |
| 102 | 1 | 2,6-Ph$_2$Ph | j | N/A | N/A | N | N | 0 | 0 | 1 |
| 103 | 1 | 2,6-Cl$_2$Ph | j | N/A | N/A | N | N | 0 | 0 | 1 |
| 104 | 1 | 2,6-Br$_2$Ph | j | N/A | N/A | N | N | 0 | 0 | 1 |
| 105 | 1 | 2,6-I$_2$Ph | j | N/A | N/A | N | N | 0 | 0 | 1 |
| 106 | 1 | 2,6-Br$_2$-4-MePh | j | N/A | N/A | N | N | 0 | 0 | 1 |
| 107 | 1 | 2,4-Ph$_2$C$_4$N | j | N/A | N/A | N | N | 0 | 0 | 1 |
| 108 | 1 | 2,4-i-Pr$_2$C$_4$N | j | N/A | N/A | N | N | 0 | 0 | 1 |
| 109 | 1 | 2,4-Me$_2$C$_4$N | j | N/A | N/A | N | N | 0 | 0 | 1 |
| 110 | 1 | 2,6-i-Pr$_2$Ph | k | N/A | N/A | N | N | 0 | 0 | 1 |
| 111 | 1 | 2,6-n-Pr$_2$Ph | k | N/A | N/A | N | N | 0 | 0 | 1 |
| 112 | 1 | 2,6-Me$_2$Ph | k | N/A | N/A | N | N | 0 | 0 | 1 |
| 113 | 1 | 2,6-Et$_2$Ph | k | N/A | N/A | N | N | 0 | 0 | 1 |
| 114 | 1 | 2,6-t-Bu$_2$Ph | k | N/A | N/A | N | N | 0 | 0 | 1 |
| 115 | 1 | 2,6-Ph$_2$Ph | k | N/A | N/A | N | N | 0 | 0 | 1 |
| 116 | 1 | 2,6-Cl$_2$Ph | k | N/A | N/A | N | N | 0 | 0 | 1 |
| 117 | 1 | 2,6-Br$_2$Ph | k | N/A | N/A | N | N | 0 | 0 | 1 |
| 118 | 1 | 2,6-I$_2$Ph | k | N/A | N/A | N | N | 0 | 0 | 1 |
| 119 | 1 | 2,6-Br$_2$-4-MePh | k | N/A | N/A | N | N | 0 | 0 | 1 |
| 120 | 1 | 2,4-Ph$_2$C$_4$N | k | N/A | N/A | N | N | 0 | 0 | 1 |
| 121 | 1 | 2,4-i-Pr$_2$C$_4$N | k | N/A | N/A | N | N | 0 | 0 | 1 |
| 122 | 1 | 2,4-Me$_2$C$_4$N | k | N/A | N/A | N | N | 0 | 0 | 1 |
| 123 | 2 | 2,6-i-Pr$_2$Ph | An | N/A | N/A | N | N | 0 | 0 | 1 |
| 124 | 2 | 2,6-n-Pr$_2$Ph | An | N/A | N/A | N | N | 0 | 0 | 1 |
| 125 | 2 | 2,6-Me$_2$Ph | An | N/A | N/A | N | N | 0 | 0 | 1 |
| 126 | 2 | 2,6-Et$_2$Ph | An | N/A | N/A | N | N | 0 | 0 | 1 |
| 127 | 2 | 2,6-t-Bu$_2$Ph | An | N/A | N/A | N | N | 0 | 0 | 1 |
| 128 | 2 | 2,6-Ph$_2$Ph | An | N/A | N/A | N | N | 0 | 0 | 1 |
| 129 | 2 | 2,6-Cl$_2$Ph | An | N/A | N/A | N | N | 0 | 0 | 1 |
| 130 | 2 | 2,6-Br$_2$Ph | An | N/A | N/A | N | N | 0 | 0 | 1 |
| 131 | 2 | 2,6-I$_2$Ph | An | N/A | N/A | N | N | 0 | 0 | 1 |
| 132 | 2 | 2,6-Br$_2$-4-MePh | An | N/A | N/A | N | N | 0 | 0 | 1 |
| 133 | 2 | 2,4-Ph$_2$C$_4$N | An | N/A | N/A | N | N | 0 | 0 | 1 |
| 134 | 2 | 2,4-i-Pr$_2$C$_4$N | An | N/A | N/A | N | N | 0 | 0 | 1 |
| 135 | 2 | 2,4-Me$_2$C$_4$N | An | N/A | N/A | N | N | 0 | 0 | 1 |
| 136 | 2 | 2,6-i-Pr$_2$Ph | j | N/A | N/A | N | N | 0 | 0 | 1 |
| 137 | 2 | 2,6-n-Pr$_2$Ph | j | N/A | N/A | N | N | 0 | 0 | 1 |
| 138 | 2 | 2,6-Me$_2$Ph | j | N/A | N/A | N | N | 0 | 0 | 1 |
| 139 | 2 | 2,6-Et$_2$Ph | j | N/A | N/A | N | N | 0 | 0 | 1 |
| 140 | 2 | 2,6-t-Bu$_2$Ph | j | N/A | N/A | N | N | 0 | 0 | 1 |
| 141 | 2 | 2,6-Ph$_2$Ph | j | N/A | N/A | N | N | 0 | 0 | 1 |
| 142 | 2 | 2,6-Cl$_2$Ph | j | N/A | N/A | N | N | 0 | 0 | 1 |
| 143 | 2 | 2,6-Br$_2$Ph | j | N/A | N/A | N | N | 0 | 0 | 1 |
| 144 | 2 | 2,6-I$_2$Ph | j | N/A | N/A | N | N | 0 | 0 | 1 |
| 145 | 2 | 2,6-Br$_2$-4-MePh | j | N/A | N/A | N | N | 0 | 0 | 1 |
| 146 | 2 | 2,4-Ph$_2$C$_4$N | j | N/A | N/A | N | N | 0 | 0 | 1 |
| 147 | 2 | 2,4-i-Pr$_2$C$_4$N | j | N/A | N/A | N | N | 0 | 0 | 1 |
| 148 | 2 | 2,4-Me$_2$C$_4$N | j | N/A | N/A | N | N | 0 | 0 | 1 |
| 149 | 2 | 2,6-i-Pr$_2$Ph | k | N/A | N/A | N | N | 0 | 0 | 1 |
| 150 | 2 | 2,6-n-Pr$_2$Ph | k | N/A | N/A | N | N | 0 | 0 | 1 |
| 151 | 2 | 2,6-Me$_2$Ph | k | N/A | N/A | N | N | 0 | 0 | 1 |
| 152 | 2 | 2,6-Et$_2$Ph | k | N/A | N/A | N | N | 0 | 0 | 1 |
| 153 | 2 | 2,6-t-Bu$_2$Ph | k | N/A | N/A | N | N | 0 | 0 | 1 |
| 154 | 2 | 2,6-Ph$_2$Ph | k | N/A | N/A | N | N | 0 | 0 | 1 |
| 155 | 2 | 2,6-Cl$_2$Ph | k | N/A | N/A | N | N | 0 | 0 | 1 |
| 156 | 2 | 2,6-Br$_2$Ph | k | N/A | N/A | N | N | 0 | 0 | 1 |
| 157 | 2 | 2,6-I$_2$Ph | k | N/A | N/A | N | N | 0 | 0 | 1 |
| 158 | 2 | 2,6-Br$_2$-4-MePh | k | N/A | N/A | N | N | 0 | 0 | 1 |
| 159 | 2 | 2,4-Ph$_2$C$_4$N | k | N/A | N/A | N | N | 0 | 0 | 1 |
| 160 | 2 | 2,4-i-Pr$_2$C$_4$N | k | N/A | N/A | N | N | 0 | 0 | 1 |
| 161 | 2 | 2,4-Me$_2$C$_4$N | k | N/A | N/A | N | N | 0 | 0 | 1 |
| 162 | 0 | 2,6-i-Pr$_2$Ph | H | N/A | N/A | N | N | 0 | 0 | 1 |
| 163 | 0 | 2,6-n-Pr$_2$Ph | H | N/A | N/A | N | N | 0 | 0 | 1 |
| 164 | 0 | 2,6-Me$_2$Ph | H | N/A | N/A | N | N | 0 | 0 | 1 |
| 165 | 0 | 2,6-Et$_2$Ph | H | N/A | N/A | N | N | 0 | 0 | 1 |
| 166 | 0 | 2,6-t-Bu$_2$Ph | H | N/A | N/A | N | N | 0 | 0 | 1 |
| 167 | 0 | 2,6-Ph$_2$Ph | H | N/A | N/A | N | N | 0 | 0 | 1 |
| 168 | 0 | 2,6-Cl$_2$Ph | H | N/A | N/A | N | N | 0 | 0 | 1 |
| 169 | 0 | 2,6-Br$_2$Ph | H | N/A | N/A | N | N | 0 | 0 | 1 |
| 170 | 0 | 2,6-I$_2$Ph | H | N/A | N/A | N | N | 0 | 0 | 1 |
| 171 | 0 | 2,6-Br$_2$-4-MePh | H | N/A | N/A | N | N | 0 | 0 | 1 |
| 172 | 0 | 2,4-Ph$_2$C$_4$N | H | N/A | N/A | N | N | 0 | 0 | 1 |
| 173 | 0 | 2,4-i-Pr$_2$C$_4$N | H | N/A | N/A | N | N | 0 | 0 | 1 |
| 174 | 0 | 2,4-Me$_2$C$_4$N | H | N/A | N/A | N | N | 0 | 0 | 1 |
| 175 | 1 | 2,6-i-Pr$_2$Ph | H | N/A | N/A | N | N | 0 | 0 | 1 |
| 176 | 1 | 2,6-n-Pr$_2$Ph | H | N/A | N/A | N | N | 0 | 0 | 1 |
| 177 | 1 | 2,6-Me$_2$Ph | H | N/A | N/A | N | N | 0 | 0 | 1 |
| 178 | 1 | 2,6-Et$_2$Ph | H | N/A | N/A | N | N | 0 | 0 | 1 |
| 179 | 1 | 2,6-t-Bu$_2$Ph | H | N/A | N/A | N | N | 0 | 0 | 1 |
| 180 | 1 | 2,6-Ph$_2$Ph | H | N/A | N/A | N | N | 0 | 0 | 1 |
| 181 | 1 | 2,6-Cl$_2$Ph | H | N/A | N/A | N | N | 0 | 0 | 1 |
| 182 | 1 | 2,6-Br$_2$Ph | H | N/A | N/A | N | N | 0 | 0 | 1 |
| 183 | 1 | 2,6-I$_2$Ph | H | N/A | N/A | N | N | 0 | 0 | 1 |
| 184 | 1 | 2,6-Br$_2$-4-MePh | H | N/A | N/A | N | N | 0 | 0 | 1 |
| 185 | 1 | 2,4-Ph$_2$C$_4$N | H | N/A | N/A | N | N | 0 | 0 | 1 |
| 186 | 1 | 2,6-i-Pr$_2$Ph | H | N/A | N/A | N | N | 0 | 0 | 1 |
| 187 | 1 | 2,6-Me$_2$Ph | H | N/A | N/A | N | N | 0 | 0 | 1 |
| 188 | 2 | 2,6-i-Pr$_2$Ph | H | N/A | N/A | N | N | 0 | 0 | 1 |
| 189 | 2 | 2,6-n-Pr$_2$Ph | H | N/A | N/A | N | N | 0 | 0 | 1 |
| 190 | 2 | 2,6-Me$_2$Ph | H | N/A | N/A | N | N | 0 | 0 | 1 |
| 191 | 2 | 2,6-Et$_2$Ph | H | N/A | N/A | N | N | 0 | 0 | 1 |
| 192 | 2 | 2,6-t-Bu$_2$Ph | H | N/A | N/A | N | N | 0 | 0 | 1 |
| 193 | 2 | 2,6-Ph$_2$Ph | H | N/A | N/A | N | N | 0 | 0 | 1 |
| 194 | 2 | 2,6-Cl$_2$Ph | H | N/A | N/A | N | N | 0 | 0 | 1 |
| 195 | 2 | 2,6-Br$_2$Ph | H | N/A | N/A | N | N | 0 | 0 | 1 |

TABLE Ia-continued

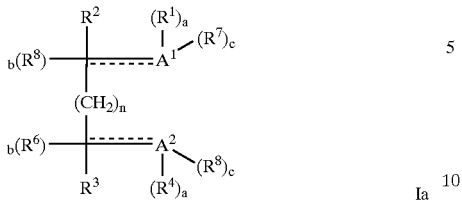
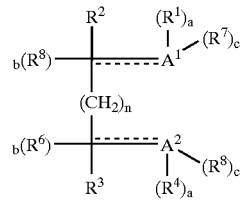

| # | n | R¹/R⁴ | R²/R³ | R⁵/R⁶ | R⁷/R⁸ | A¹ | A² | c | b | a |
|---|---|---|---|---|---|---|---|---|---|---|
| 196 | 2 | 2,6-I₂Ph | H | N/A | N/A | N | N | 0 | 0 | 1 |
| 197 | 2 | 2,6-Br₂-4-MePh | H | N/A | N/A | N | N | 0 | 0 | 1 |
| 198 | 2 | 2,4-Ph₂C₄N | H | N/A | N/A | N | N | 0 | 0 | 1 |
| 199 | 2 | 2,4-i-Pr₂C₄N | H | N/A | N/A | N | N | 0 | 0 | 1 |
| 200 | 2 | 2,4-Me₂C₄N | H | N/A | N/A | N | N | 0 | 0 | 1 |
| 201 | 0 | 2,6-Me₂Ph | Me | Me | Me | N | N | 0 | 1 | 1 |
| 202 | 0 | 2,4,6-Me₃Ph | Me | Me | Me | N | N | 0 | 1 | 1 |
| 203 | 1 | 2,4,6-Me₃Ph | Me | Me | Me | N | N | 0 | 1 | 1 |
| 204 | 2 | 2,4,6-Me₃Ph | Me | Me | Me | N | N | 0 | 1 | 1 |
| 205 | 3 | 2,4,6-Me₃Ph | Me | Me | Me | N | N | 0 | 1 | 1 |
| 206 | 0 | 2,4,6-Me₃Ph | H | Me | Me | N | N | 0 | 1 | 1 |
| 207 | 1 | 2,4,6-Me₃Ph | H | Me | Me | N | N | 0 | 1 | 1 |
| 208 | 2 | 2,4,6-Me₃Ph | H | Me | Me | N | N | 0 | 1 | 1 |
| 209 | 3 | 2,4,6-Me₃Ph | H | Me | Me | N | N | 0 | 1 | 1 |
| 210 | 0 | 2,4,6-Me₃Ph | An | Me | Me | N | N | 0 | 1 | 1 |
| 211 | 1 | 2,4,6-Me₃Ph | An | Me | Me | N | N | 0 | 1 | 1 |
| 212 | 2 | 2,4,6-Me₃Ph | An | Me | Me | N | N | 0 | 1 | 1 |
| 213 | 3 | 2,4,6-Me₃Ph | An | Me | Me | N | N | 0 | 1 | 1 |
| 214 | 0 | 2,6-Me₂Ph | Me | Me | Me | N | N | 0 | 1 | 1 |
| 215 | 1 | 2,6-Me₂Ph | Me | Me | Me | N | N | 0 | 1 | 1 |
| 216 | 2 | 2,6-Me₂Ph | Me | Me | Me | N | N | 0 | 1 | 1 |
| 217 | 3 | 2,6-Me₂Ph | Me | Me | Me | N | N | 0 | 1 | 1 |
| 218 | 0 | 2,6-Me₂Ph | H | Me | Me | N | N | 0 | 1 | 1 |
| 219 | 1 | 2,6-Me₂Ph | H | Me | Me | N | N | 0 | 1 | 1 |
| 220 | 2 | 2,6-Me₂Ph | H | Me | Me | N | N | 0 | 1 | 1 |
| 221 | 3 | 2,6-Me₂Ph | H | Me | Me | N | N | 0 | 1 | 1 |
| 222 | 0 | 2,6-Me₂Ph | An | Me | Me | N | N | 0 | 1 | 1 |
| 223 | 1 | 2,6-Me₂Ph | An | Me | Me | N | N | 0 | 1 | 1 |
| 224 | 2 | 2,6-Me₂Ph | An | Me | Me | N | N | 0 | 1 | 1 |
| 225 | 3 | 2,6-Me₂Ph | An | Me | Me | N | N | 0 | 1 | 1 |
| 226 | 0 | 2,6-i-Pr₂Ph | Me | Me | Me | N | N | 0 | 1 | 1 |
| 227 | 1 | 2,6-i-Pr₂Ph | Me | Me | Me | N | N | 0 | 1 | 1 |
| 228 | 2 | 2,6-i-Pr₂Ph | Me | Me | Me | N | N | 0 | 1 | 1 |
| 229 | 3 | 2,6-i-Pr₂Ph | Me | Me | Me | N | N | 0 | 1 | 1 |
| 230 | 0 | 2,6-i-Pr₂Ph | H | Me | Me | N | N | 0 | 1 | 1 |
| 231 | 1 | 2,6-i-Pr₂Ph | H | Me | Me | N | N | 0 | 1 | 1 |
| 232 | 2 | 2,6-i-Pr₂Ph | H | Me | Me | N | N | 0 | 1 | 1 |
| 233 | 3 | 2,6-i-Pr₂Ph | H | Me | Me | N | N | 0 | 1 | 1 |
| 234 | 0 | 2,6-i-Pr₂Ph | An | Me | Me | N | N | 0 | 1 | 1 |
| 235 | 1 | 2,6-i-Pr₂Ph | An | Me | Me | N | N | 0 | 1 | 1 |
| 236 | 2 | 2,6-i-Pr₂Ph | An | Me | Me | N | N | 0 | 1 | 1 |
| 237 | 3 | 2,6-i-Pr₂Ph | An | Me | Me | N | N | 0 | 1 | 1 |
| 238 | 0 | 2,6-i-Pr₂Ph | Me | N/A | N/A | P | O | 1 | 1 | 1 |
| 239 | 0 | 2,4,6-Me₃Ph | Me | N/A | N/A | P | O | 1 | 0 | 1 |
| 240 | 0 | 2,6-i-Pr₂Ph | H | N/A | N/A | P | O | 1 | 0 | 1 |
| 241 | 0 | 2,4,6-Me₃Ph | H | N/A | N/A | P | O | 1 | 0 | 1 |
| 242 | 0 | 2,6-i-Pr₂Ph | An | N/A | N/A | P | O | 1 | 0 | 1 |
| 243 | 0 | 2,4,6-Me₃Ph | An | N/A | N/A | P | O | 1 | 0 | 1 |
| 244 | 0 | 2,6-i-Pr₂Ph | j | N/A | N/A | P | O | 1 | 0 | 1 |
| 245 | 0 | 2,4,6-Me₃Ph | j | N/A | N/A | P | O | 1 | 0 | 1 |
| 246 | 0 | 2,6-i-Pr₂Ph | k | N/A | N/A | P | O | 1 | 0 | 1 |
| 247 | 0 | 2,4,6-Me₃Ph | k | N/A | N/A | P | O | 1 | 0 | 1 |
| 248 | 1 | 2,4,6-Me₃Ph | Me | N/A | N/A | N | N | 0 | 0 | 1 |
| 249 | 2 | 2,4,6-Me₃Ph | Me | N/A | N/A | N | N | 0 | 0 | 1 |
| 250 | 3 | 2,4,6-Me₃Ph | Me | N/A | N/A | N | N | 0 | 0 | 1 |
| 251 | 0 | 2,4,6-Me₃Ph | H | N/A | N/A | N | N | 0 | 0 | 1 |
| 252 | 1 | 2,4,6-Me₃Ph | H | N/A | N/A | N | N | 0 | 0 | 1 |
| 253 | 2 | 2,4,6-Me₃Ph | He | N/A | N/A | N | N | 0 | 0 | 1 |
| 254 | 3 | 2,4,6-Me₃Ph | He | N/A | N/A | N | N | 0 | 0 | 1 |
| 255 | 0 | 2,4,6-Me₃Ph | An | N/A | N/A | N | N | 0 | 0 | 1 |
| 256 | 1 | 2,4,6-Me₃Ph | An | N/A | N/A | N | N | 0 | 0 | 1 |
| 257 | 2 | 2,4,6-Me₃Ph | An | N/A | N/A | N | N | 0 | 0 | 1 |
| 258 | 3 | 2,4,6-Me₃Ph | An | N/A | N/A | N | N | 0 | 0 | 1 |
| 259 | 0 | 2,4,6-Me₃Ph | j | N/A | N/A | N | N | 0 | 0 | 1 |
| 260 | 1 | 2,4,6-Me₃Ph | j | N/A | N/A | N | N | 0 | 0 | 1 |
| 261 | 2 | 2,4,6-Me₃Ph | j | N/A | N/A | N | N | 0 | 0 | 1 |
| 262 | 3 | 2,4,6-Me₃Ph | j | N/A | N/A | N | N | 0 | 0 | 1 |
| 263 | 0 | 2,4,6-Me₃Ph | k | N/A | N/A | N | N | 0 | 0 | 1 |
| 264 | 1 | 2,4,6-Me₃Ph | k | N/A | N/A | N | N | 0 | 0 | 1 |
| 265 | 2 | 2,4,6-Me₃Ph | k | N/A | N/A | N | N | 0 | 0 | 1 |
| 266 | 3 | 2,4,6-Me₃Ph | k | N/A | N/A | N | N | 0 | 0 | 1 |
| 267 | 0 | Ph | j | N/A | N/A | N | N | 0 | 0 | 1 |
| 268 | 0 | Ph | k | N/A | N/A | N | N | 0 | 0 | 1 |
| 269 | 0 | Ph | Me | N/A | N/A | N | N | 0 | 0 | 1 |
| 270 | 0 | Ph | H | N/A | N/A | N | N | 0 | 0 | 1 |
| 271 | 0 | Ph | An | N/A | N/A | N | N | 0 | 0 | 1 |
| 272 | 0 | Ph | j | N/A | N/A | N | N | 0 | 0 | 1 |
| 273 | 0 | Ph | k | N/A | N/A | N | N | 0 | 0 | 1 |
| 274 | 0 | Ph | Me | N/A | N/A | N | N | 0 | 0 | 1 |
| 275 | 0 | Ph | H | N/A | N/A | N | N | 0 | 0 | 1 |
| 276 | 0 | Ph | An | N/A | N/A | N | N | 0 | 0 | 1 |
| 277 | 0 | 2-PhPh | j | N/A | N/A | N | N | 0 | 0 | 1 |
| 278 | 0 | 2-PhPh | k | N/A | N/A | N | N | 0 | 0 | 1 |
| 279 | 0 | 2-PhPh | Me | N/A | N/A | N | N | 0 | 0 | 1 |
| 280 | 0 | 2-PhPh | H | N/A | N/A | N | N | 0 | 0 | 1 |
| 281 | 0 | 2-PhPh | An | N/A | N/A | N | N | 0 | 0 | 1 |
| 282 | 0 | 2-PhPh | j | N/A | N/A | N | N | 0 | 0 | 1 |
| 283 | 0 | 2-PhPh | k | N/A | N/A | N | N | 0 | 0 | 1 |
| 284 | 0 | 2-PhPh | Me | N/A | N/A | N | N | 0 | 0 | 1 |
| 285 | 0 | 2-PhPh | H | N/A | N/A | N | N | 0 | 0 | 1 |
| 286 | 0 | 2-PhPh | An | N/A | N/A | N | N | 0 | 0 | 1 |
| 287 | 0 | 2,6-EtPh | j | N/A | N/A | N | N | 0 | 0 | 1 |
| 288 | 0 | 2,6-EtPh | k | N/A | N/A | N | N | 0 | 0 | 1 |
| 289 | 0 | 2,6-EtPh | Me | N/A | N/A | N | N | 0 | 0 | 1 |
| 290 | 0 | 2,6-EtPh | H | N/A | N/A | N | N | 0 | 0 | 1 |
| 291 | 0 | 2,6-EtPh | An | N/A | N/A | N | N | 0 | 0 | 1 |
| 292 | 0 | 2,6-EtPh | j | N/A | N/A | N | N | 0 | 0 | 1 |
| 293 | 0 | 2,6-EtPh | Me | N/A | N/A | N | N | 0 | 0 | 1 |
| 294 | 0 | 2,6-EtPh | H | N/A | N/A | N | N | 0 | 0 | 1 |
| 295 | 0 | 2,6-EtPh | An | N/A | N/A | N | N | 0 | 0 | 1 |
| 296 | 0 | 2-t-BuPh | j | N/A | N/A | N | N | 0 | 0 | 1 |
| 297 | 0 | 2-t-BuPh | k | N/A | N/A | N | N | 0 | 0 | 1 |
| 298 | 0 | 2-t-BuPh | Me | N/A | N/A | N | N | 0 | 0 | 1 |
| 299 | 0 | 2-4-BuPh | H | N/A | N/A | N | N | 0 | 0 | 1 |
| 300 | 0 | 2-t-BuPh | An | N/A | N/A | N | N | 0 | 0 | 1 |
| 301 | 0 | 2-t-BuPh | j | N/A | N/A | N | N | 0 | 0 | 1 |
| 302 | 0 | 2-t-BuPh | k | N/A | N/A | N | N | 0 | 0 | 1 |
| 303 | 0 | 2-t-BuPh | Me | N/A | N/A | N | N | 0 | 0 | 1 |
| 304 | 0 | 2-t-BuPh | H | N/A | N/A | N | N | 0 | 0 | 1 |
| 305 | 0 | 2-t-BuPh | An | N/A | N/A | N | N | 0 | 0 | 1 |
| 306 | 0 | 1-Np | j | N/A | N/A | N | N | 0 | 0 | 1 |
| 307 | 0 | 1-Np | k | N/A | N/A | N | N | 0 | 0 | 1 |
| 308 | 0 | 1-Np | Me | N/A | N/A | N | N | 0 | 0 | 1 |
| 309 | 0 | 1-Np | H | N/A | N/A | N | N | 0 | 0 | 1 |
| 310 | 0 | 1-Np | An | N/A | N/A | N | N | 0 | 0 | 1 |
| 311 | 0 | PhMe | j | N/A | N/A | N | N | 0 | 0 | 1 |
| 312 | 0 | PhMe | k | N/A | N/A | N | N | 0 | 0 | 1 |
| 313 | 0 | PhMe | Me | N/A | N/A | N | N | 0 | 0 | 1 |
| 314 | 0 | PhMe | H | N/A | N/A | N | N | 0 | 0 | 1 |
| 315 | 0 | PhMe | An | N/A | N/A | N | N | 0 | 0 | 1 |
| 316 | 0 | PhMe | j | N/A | N/A | N | N | 0 | 0 | 1 |
| 317 | 0 | PhMe | k | N/A | N/A | N | N | 0 | 0 | 1 |
| 318 | 0 | PhMe | Me | N/A | N/A | N | N | 0 | 0 | 1 |
| 319 | 0 | PhMe | H | N/A | N/A | N | N | 0 | 0 | 1 |
| 320 | 0 | PhMe | An | N/A | N/A | N | N | 0 | 0 | 1 |
| 321 | 0 | PhMe | j | N/A | N/A | N | N | 0 | 0 | 1 |
| 322 | 0 | PhMe | k | N/A | N/A | N | N | 0 | 0 | 1 |
| 323 | 0 | PhMe | Me | N/A | N/A | N | N | 0 | 0 | 1 |
| 324 | 0 | PhMe | H | N/A | N/A | N | N | 0 | 0 | 1 |
| 325 | 0 | PhMe | An | N/A | N/A | N | N | 0 | 0 | 1 |

TABLE Ia-continued

| # | n | R¹/R⁴ | R²/R³ | R⁵/R⁶ | R⁷/R⁸ | A¹ | A² | c | b | a |
|---|---|-------|-------|-------|-------|----|----|---|---|---|
| 326 | 0 | Ph$_2$Me | j | N/A | N/A | N | N | 0 | 0 | 1 |
| 327 | 0 | Ph$_2$Me | k | N/A | N/A | N | N | 0 | 0 | 1 |
| 328 | 0 | Ph$_2$Me | Me | N/A | N/A | N | N | 0 | 0 | 1 |
| 329 | 0 | Ph$_2$Me | H | N/A | N/A | N | N | 0 | 0 | 1 |
| 330 | 0 | Ph$_2$Me | An | N/A | N/A | N | N | 0 | 0 | 1 |
| 331 | 0 | Ph$_2$Me | j | N/A | N/A | N | N | 0 | 0 | 1 |
| 332 | 0 | Ph$_2$Me | k | N/A | N/A | N | N | 0 | 0 | 1 |
| 333 | 0 | Ph$_2$Me | Me | N/A | N/A | N | N | 0 | 0 | 1 |
| 334 | 0 | Ph$_2$Me | H | N/A | N/A | N | N | 0 | 0 | 1 |
| 335 | 0 | Ph$_2$Me | An | N/A | N/A | N | N | 0 | 0 | 1 |
| 336 | 0 | Ph | H | N/A | N/A | N | N | 0 | 0 | 1 |
| 337 | 0 | Ph | Me | N/A | N/A | N | N | 0 | 0 | 1 |
| 338 | 0 | Ph | An | N/A | N/A | N | N | 0 | 0 | 1 |
| 339 | 0 | Ph | j | N/A | N/A | N | N | 0 | 0 | 1 |
| 340 | 0 | Ph | k | N/A | N/A | N | N | 0 | 0 | 1 |
| 341 | 0 | 2-PhPh | H | N/A | N/A | N | N | 0 | 0 | 1 |
| 342 | 0 | 2-PhPh | Me | N/A | N/A | N | N | 0 | 0 | 1 |
| 343 | 0 | 2-PhPh | An | N/A | N/A | N | N | 0 | 0 | 1 |
| 344 | 0 | 2-i-Pr-6-MePh | H | N/A | N/A | N | N | 0 | 0 | 1 |
| 345 | 0 | 2-i-Pr-6-MePh | Me | N/A | N/A | N | N | 0 | 0 | 1 |
| 346 | 0 | 2-i-Pr-6-MePh | An | N/A | N/A | N | N | 0 | 0 | 1 |
| 347 | 0 | 2-i-Pr-6-MePh | j | N/A | N/A | N | N | 0 | 0 | 1 |
| 348 | 0 | 2-i-Pr-6-MePh | k | N/A | N/A | N | N | 0 | 0 | 1 |
| 349 | 0 | 2,5-t-BuPh | H | N/A | N/A | N | N | 0 | 0 | 1 |
| 350 | 0 | 2,5-t-BuPh | Me | N/A | N/A | N | N | 0 | 0 | 1 |
| 351 | 0 | 2,5-t-BuPh | An | N/A | N/A | N | N | 0 | 0 | 1 |
| 352 | 0 | 2,6-EtPh | H | N/A | N/A | N | N | 0 | 0 | 1 |
| 353 | 0 | 2,6-EtPh | Me | N/A | N/A | N | N | 0 | 0 | 1 |
| 354 | 0 | 2,6-EtPh | An | N/A | N/A | N | N | 0 | 0 | 1 |
| 355 | 0 | 2,6-EtPh | j | N/A | N/A | N | N | 0 | 0 | 1 |
| 356 | 0 | 2,6-EtPh | k | N/A | N/A | N | N | 0 | 0 | 1 |
| 357 | 0 | 1-Np | H | N/A | N/A | N | N | 0 | 0 | 1 |
| 358 | 0 | 1-Np | Me | N/A | N/A | N | N | 0 | 0 | 1 |
| 359 | 0 | 1-Np | An | N/A | N/A | N | N | 0 | 0 | 1 |
| 360 | 0 | 1-Np | j | N/A | N/A | N | N | 0 | 0 | 1 |
| 361 | 0 | 1-Np | k | N/A | N/A | N | N | 0 | 0 | 1 |
| 362 | 0 | 2,4,6-Me$_3$Ph | H | N/A | N/A | N | N | 0 | 0 | 1 |
| 363 | 0 | 2,4,6-Me$_3$Ph | Me | N/A | N/A | N | N | 0 | 0 | 1 |
| 364 | 0 | 2,4,6-Me$_3$Ph | An | N/A | N/A | N | N | 0 | 0 | 1 |
| 365 | 0 | 2,4,6-Me$_3$Ph | j | N/A | N/A | N | N | 0 | 0 | 1 |
| 366 | 0 | 2,4,6-Me$_3$Ph | k | N/A | N/A | N | N | 0 | 0 | 1 |

Note-In Table Ia, above, the following convention and abbreviations are used. For R1 and R4, when a substituted phenyl ring is present, the amount of substitution is indicated by the number of numbers indicating positions on the phenyl ring, as, for example, 2,6-iPr$_2$Ph represents 2,6-diisopropyl phenyl; iPr = isopropyl; Pr = propyl; Me = methyl; Et = ethyl; t-Bu = tert-butyl; Ph = phenyl; Np = naphthyl; An = 1,8-naphthalene; j is the group —C(Me)$_2$—CH$_2$—C(Me)$_2$—; e = the group (CH$_2$)$_3$CO$_2$Me and N/A = not applicable. k = —SCH$_2$CH$_2$S—

The typical ligand forming compounds may also be represented by the formula:

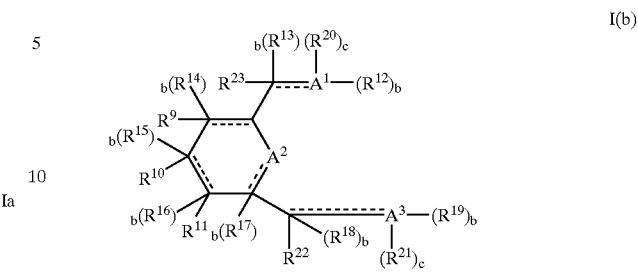

I(b)

wherein:

R$^{20}$ and R$^{21}$ are each independently selected from hydrogen, or an unsubstituted or substituted aryl group wherein said substitution is an alkyl or a functional hetero group which is inert with respect to the contemplated polymerization;

R$^{22}$ and R$^{23}$ are each independently selected from hydrogen, an unsubstituted or substituted C$_1$–C$_{20}$ (preferably C$_1$–C$_6$) hydrocarbyl as, for example, alkyl (methyl, ethyl, propyl, pentyl and the like); aryl (phenyl, toluyl and the like) or a functional group which is inert with respect to the polymerization (e.g., nitro, halo and the like);

R$^9$ and R$^{10}$ are each independently selected from hydrogen, or an unsubstituted or substituted aryl group wherein said substitution is an alkyl or a functional hetero group which is inert with respect to the contemplated polymerization;

R$^{11}$ and R$^{12}$ are each independently selected from hydrogen, an unsubstituted or substituted C$_1$–C$_{20}$ (preferably C$_1$–C$_6$) hydrocarbyl as, for example, alkyl (methyl, ethyl, propyl, pentyl and the like); aryl (phenyl, toluyl and the like) or a functional group which is inert with respect to the polymerization (e.g., nitro, halo and the like);

R$^{13}$ to R$^{23}$ are each independently selected from hydrogen, an unsubstituted or substituted C$_1$–C$_{20}$ hydrocarbyl or an inert functional group, all as described above for R$^7$;

b and c are each independently 0 or 1 and represent whether their associated R group is present or not to fulfill the valence state of the associated A group; and each A$^1$, A$^2$ and A$^3$ is independently selected as defined in connection with A of Formula I(a) above and the --- associated with any one A may be single or double.

Preferred compounds of I(b)) are those wherein each R$^{19}$, R$^{10}$ and R$^{15}$ are hydrogen; b is 0, c is 1, and R$^{11}$ and R$^{12}$ are each independently selected from halogen, hydrogen or a C$_1$–C$_6$ alkyl, preferably each is independently selected from methyl or hydrogen; and wherein R$^5$ and R$^6$ of I(b) are each an aryl or substituted aryl group, preferably wherein the aryl contains substitution in the 2 position, the 2,6 positions or the 2,4,6 positions which is selected from a C$_1$–C$_6$ (most preferably C$_1$–C$_3$) alkyl and the remaining positions are each independently selected from hydrogen (most preferred), halogen or a C$_1$–C$_6$ (preferably C$_1$–C$_3$) alkyl.

Illustrative examples of ligand forming compounds which are useful in providing the catalyst composition of the present invention are compounds of Formula I(b) having the following combination of groups shown in Table Ib below:

TABLE Ib

[Structure I(b): Aromatic ring A² with R⁹, R¹⁰, R¹¹ substituents bearing b(R¹⁴), b(R¹⁵), b(R¹⁶); with R²³—[b(R¹³)]—A¹(R¹²)ᵦ—(R²⁰)ᵧ and R²²—[b(R¹⁷)]—A³(R¹⁹)ᵦ—(R²¹)ᵧ, (R¹⁸)ᵦ groups]

| #  | R²⁰/R²¹ | R²²/R²³ | R⁹ | R¹⁰ | R¹¹ | A¹ | A² | A³ | b | c |
|----|---------|---------|----|----|----|----|----|----|---|---|
| 1  | 2,6-i-Pr₂Ph | Me | H | H | H | N | N | N | 0 | 1 |
| 2  | 2,6-n-Pr₂Ph | Me | H | H | H | N | N | N | 0 | 1 |
| 3  | 2,6-Me₂Ph | Me | H | H | H | N | N | N | 0 | 1 |
| 4  | 2,4-,6-Me₃Ph | Me | H | H | H | N | N | N | 0 | 1 |
| 5  | 2-t-BuPh | Me | H | H | H | N | N | N | 0 | 1 |
| 6  | 2-Et-Ph | Me | H | H | H | N | N | N | 0 | 1 |
| 7  | 2-Me-Ph | Me | H | H | H | N | N | N | 0 | 1 |
| 8  | Ph | Me | H | H | H | N | N | N | 0 | 1 |
| 9  | 2,6-Et₂Ph | Me | H | H | H | N | N | N | 0 | 1 |
| 10 | 2,6-t-Bu₂Ph | Me | H | H | H | N | N | N | 0 | 1 |
| 11 | 2,6-Ph₂Ph | Me | H | H | H | N | N | N | 0 | 1 |
| 12 | 2,6-Cl₂Ph | Me | H | H | H | N | N | N | 0 | 1 |
| 13 | 2,6-Br₂Ph | Me | H | H | H | N | N | N | 0 | 1 |
| 14 | 2,6-I₂Ph | Me | H | H | H | N | N | N | 0 | 1 |
| 15 | 2,6-Br₂-4-MePh | Me | H | H | H | N | N | N | 0 | 1 |
| 16 | 2,4-Ph₂C₄N | Me | H | H | H | N | N | N | 0 | 1 |
| 17 | 2,5-i-Pr₂C₄H₂N | Me | H | H | H | N | N | N | 0 | 1 |
| 18 | 2,5-Me₂C₄H₂N | Me | H | H | H | N | N | N | 0 | 1 |
| 19 | 2,4-i-Pr₂C₄N | Me | H | H | H | N | N | N | 0 | 1 |
| 20 | 2,4-Me₂C₄N | Me | H | H | H | N | N | N | 0 | 1 |
| 21 | 2,3,4,5,6-Me₅Ph | Me | H | H | H | N | N | N | 0 | 1 |
| 22 | (2-t-BuMe₂Sil)Bz | Me | H | H | H | N | N | N | 0 | 1 |
| 23 | (2-Me₃Sil)Bz | Me | H | H | H | N | N | N | 0 | 1 |
| 24 | (2-PhMe₂Sil)Bz | Me | H | H | H | N | N | N | 0 | 1 |
| 25 | (2-PhMeSil)Bz | Me | H | H | H | N | N | N | 0 | 1 |
| 26 | (2-Me₂Sil)Bz | Me | H | H | H | N | N | N | 0 | 1 |
| 27 | 2,6-i-Pr₂Ph | Me | H | X | H | N | N | N | 0 | 1 |
| 28 | 2,6-n-Pr₂Ph | Me | H | X | H | N | N | N | 0 | 1 |
| 29 | 2,6-Me₂Ph | Me | H | X | H | N | N | N | 0 | 1 |
| 30 | 2,4-,6-Me₃Ph | Me | H | X | H | N | N | N | 0 | 1 |
| 31 | 2-t-BuPh | Me | H | X | H | N | N | N | 0 | 1 |
| 32 | 2-Et-Ph | Me | H | X | H | N | N | N | 0 | 1 |
| 33 | 2-Me-Ph | Me | H | X | H | N | N | N | 0 | 1 |
| 34 | Ph | Me | H | X | H | N | N | N | 0 | 1 |
| 35 | 2,6-Et₂Ph | Me | H | X | H | N | N | N | 0 | 1 |
| 36 | 2,6-t-Bu₂Ph | Me | H | X | H | N | N | N | 0 | 1 |
| 37 | 2,6-Ph₂Ph | Me | H | X | H | N | N | N | 0 | 1 |
| 38 | 2,6-Cl₂Ph | Me | H | X | H | N | N | N | 0 | 1 |
| 39 | 2,6-Br₂Ph | Me | H | X | H | N | N | N | 0 | 1 |
| 40 | 2,6-I₂Ph | Me | H | X | H | N | N | N | 0 | 1 |
| 41 | 2,6-Br₂-4-MePh | Me | H | X | H | N | N | N | 0 | 1 |
| 42 | 2,4-Ph₂C₄N | Me | H | X | H | N | N | N | 0 | 1 |
| 43 | 2,5-i-Pr₂C₄H₂N | Me | H | X | H | N | N | N | 0 | 1 |
| 44 | 2,5-Me₂C₄H₂N | Me | H | X | H | N | N | N | 0 | 1 |
| 45 | 2,4-i-Pr₂C₄N | Me | H | X | H | N | N | N | 0 | 1 |
| 46 | 2,4-Me₂C₄N | Me | H | X | H | N | N | N | 0 | 1 |
| 47 | 2,3,4,5,6-Me₅Ph | Me | H | X | H | N | N | N | 0 | 1 |
| 48 | (2-t-BuMe₂Sil)Bz | Me | H | X | H | N | N | N | 0 | 1 |
| 49 | (2-Me₃Sil)Bz | Me | H | X | H | N | N | N | 0 | 1 |
| 50 | (2-PhMe₂Sil)Bz | Me | H | X | H | N | N | N | 0 | 1 |
| 51 | (2-PhMeSil)Bz | Me | H | X | H | N | N | N | 0 | 1 |
| 52 | (2-Me₂Sil)Bz | Me | H | X | H | N | N | N | 0 | 1 |
| 53 | 2,6-i-Pr₂Ph | Me | H | R | H | N | N | N | 0 | 1 |
| 54 | 2,6-n-Pr₂Ph | Me | H | R | H | N | N | N | 0 | 1 |
| 55 | 2,6-Me₂Ph | Me | H | R | H | N | N | N | 0 | 1 |
| 56 | 2,4-,6-Me₃Ph | Me | H | R | H | N | N | N | 0 | 1 |
| 57 | 2-t-BuPh | Me | H | R | H | N | N | N | 0 | 1 |
| 58 | 2-Et-Ph | Me | H | R | H | N | N | N | 0 | 1 |
| 59 | 2-Me-Ph | Me | H | R | H | N | N | N | 0 | 1 |
| 60 | Ph | Me | H | R | H | N | N | N | 0 | 1 |
| 61 | 2,6-Et₂Ph | Me | H | R | H | N | N | N | 0 | 1 |
| 62 | 2,6-t-Bu₂Ph | Me | H | R | H | N | N | N | 0 | 1 |

TABLE Ib-continued

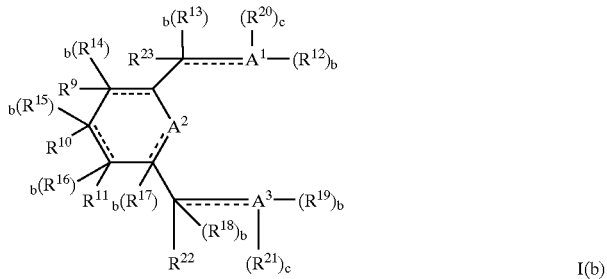

I(b)

| # | $R^{20}/R^{21}$ | $R^{22}/R^{23}$ | $R^9$ | $R^{10}$ | $R^{11}$ | $A^1$ | $A^2$ | $A^3$ | b | c |
|---|---|---|---|---|---|---|---|---|---|---|
| 63 | 2,6-Ph$_2$Ph | Me | H | R | H | N | N | N | 0 | 1 |
| 64 | 2,6-Cl$_2$Ph | Me | H | R | H | N | N | N | 0 | 1 |
| 65 | 2,6-Br$_2$Ph | Me | H | R | H | N | N | N | 0 | 1 |
| 66 | 2,6-I$_2$Ph | Me | H | R | H | N | N | N | 0 | 1 |
| 67 | 2,6-Br$_2$-4-MePh | Me | H | R | H | N | N | N | 0 | 1 |
| 68 | 2,4-Ph$_2$C$_4$N | Me | H | R | H | N | N | N | 0 | 1 |
| 69 | 2,5-i-Pr$_2$C$_4$H$_2$N | Me | H | R | H | N | N | N | 0 | 1 |
| 70 | 2,5-Me$_2$C$_4$H$_2$N | Me | H | R | H | N | N | N | 0 | 1 |
| 71 | 2,4-i-Pr$_2$C$_4$N | Me | H | R | H | N | N | N | 0 | 1 |
| 72 | 2,4-Me$_2$C$_4$N | Me | H | R | H | N | N | N | 0 | 1 |
| 73 | 2,3,4,5,6-Me$_5$Ph | Me | H | R | H | N | N | N | 0 | 1 |
| 74 | (2-t-BuMe$_2$Sil)Bz | Me | H | R | H | N | N | N | 0 | 1 |
| 75 | (2-Me$_3$Sil)Bz | Me | H | R | H | N | N | N | 0 | 1 |
| 76 | (2-PhMe$_2$Si1)Bz | Me | H | R | H | N | N | N | 0 | 1 |
| 77 | (2-PhMeSil)Bz | Me | H | R | H | N | N | N | 0 | 1 |
| 78 | (2-Me$_2$Sil)Bz | Me | H | R | H | N | N | N | 0 | 1 |
| 79 | 2,6-i-Pr$_2$Ph | Me | R | R | R | N | N | N | 0 | 1 |
| 80 | 2,6-n-Pr$_2$Ph | Me | R | R | R | N | N | N | 0 | 1 |
| 81 | 2,6-Me$_2$Ph | Me | R | R | R | N | N | N | 0 | 1 |
| 82 | 2,4-,6-Me$_3$Ph | Me | R | R | R | N | N | N | 0 | 1 |
| 83 | 2-t-BuPh | Me | R | R | R | N | N | N | 0 | 1 |
| 84 | 2-Et-Ph | Me | R | R | R | N | N | N | 0 | 1 |
| 85 | 2-Me-Ph | Me | R | R | R | N | N | N | 0 | 1 |
| 86 | Ph | Me | R | R | R | N | N | N | 0 | 1 |
| 87 | 2,6-Et$_2$Ph | Me | R | R | R | N | N | N | 0 | 1 |
| 88 | 2,6-t-Bu$_2$Ph | Me | R | R | R | N | N | N | 0 | 1 |
| 89 | 2,6-Ph$_2$Ph | Me | R | R | R | N | N | N | 0 | 1 |
| 90 | 2,6-Cl$_2$Ph | Me | R | R | R | N | N | N | 0 | 1 |
| 91 | 2,6-Br$_2$Ph | Me | R | R | R | N | N | N | 0 | 1 |
| 92 | 2,6-I$_2$Ph | Me | R | R | R | N | N | N | 0 | 1 |
| 93 | 2,6-Br$_2$-4-MePh | Me | R | R | R | N | N | N | 0 | 1 |
| 94 | 2,4-Ph$_2$C$_4$N | Me | R | R | R | N | N | N | 0 | 1 |
| 95 | 2,5-i-Pr$_2$C$_4$H$_2$N | Me | R | R | R | N | N | N | 0 | 1 |
| 96 | 2,5-Me$_2$C$_4$H$_2$N | Me | R | R | R | N | N | N | 0 | 1 |
| 97 | 2,4-i-Pr$_2$C$_4$N | Me | R | R | R | N | N | N | 0 | 1 |
| 98 | 2,4-Me$_2$C$_4$N | Me | R | R | R | N | N | N | 0 | 1 |
| 99 | 2,3,4,5,6-Me$_5$Ph | Me | R | R | R | N | N | N | 0 | 1 |
| 100 | (2-t-BuMe$_2$Sil)Bz | Me | R | R | R | N | N | N | 0 | 1 |
| 101 | (2-Me$_3$Sil)Bz | Me | R | R | R | N | N | N | 0 | 1 |
| 102 | (2-PhMe$_2$Sil)Bz | Me | R | R | R | N | N | N | 0 | 1 |
| 103 | (2-PhMeSil)Bz | Me | R | R | R | N | N | N | 0 | 1 |
| 104 | (2-Me$_2$Sil)Bz | Me | R | R | R | N | N | N | 0 | 1 |
| 105 | 2,6-i-Pr$_2$Ph | H | H | H | H | N | N | N | 0 | 1 |
| 106 | 2,6-n-Pr$_2$Ph | H | H | H | H | N | N | N | 0 | 1 |
| 107 | 2,6-Me$_2$Ph | H | H | H | H | N | N | N | 0 | 1 |
| 108 | 2,4-,6-Me$_3$Ph | H | H | H | H | N | N | N | 0 | 1 |
| 109 | 2-t-BuPh | H | H | H | H | N | N | N | 0 | 1 |
| 110 | 2-Et-Ph | H | H | H | H | N | N | N | 0 | 1 |
| 111 | 2-Me-Ph | H | H | H | H | N | N | N | 0 | 1 |
| 112 | Ph | H | H | H | H | N | N | N | 0 | 1 |
| 113 | 2,6-Et$_2$Ph | H | H | H | H | N | N | N | 0 | 1 |
| 114 | 2,6-t-Bu$_2$Ph | H | H | H | H | N | N | N | 0 | 1 |
| 115 | 2,6-Ph$_2$Ph | H | H | H | H | N | N | N | 0 | 1 |
| 116 | 2,6-Cl$_2$Ph | H | H | H | H | N | N | N | 0 | 1 |
| 117 | 2,6-Br$_2$Ph | H | H | H | H | N | N | N | 0 | 1 |
| 118 | 2,6-I$_2$Ph | H | H | H | H | N | N | N | 0 | 1 |
| 119 | 2,6-Br$_2$-4-MePh | H | H | H | H | N | N | N | 0 | 1 |
| 120 | 2,4-Ph$_2$C$_4$N | H | H | H | H | N | N | N | 0 | 1 |
| 121 | 2,5-i-Pr$_2$C$_4$H$_2$N | H | H | H | H | N | N | N | 0 | 1 |
| 122 | 2,5-Me$_2$C$_4$H$_2$N | H | H | H | H | N | N | N | 0 | 1 |
| 123 | 2,4-i-Pr$_2$C$_4$N | H | H | H | H | N | N | N | 0 | 1 |
| 124 | 2,4-Me$_2$C$_4$N | H | H | H | H | N | N | N | 0 | 1 |

TABLE Ib-continued

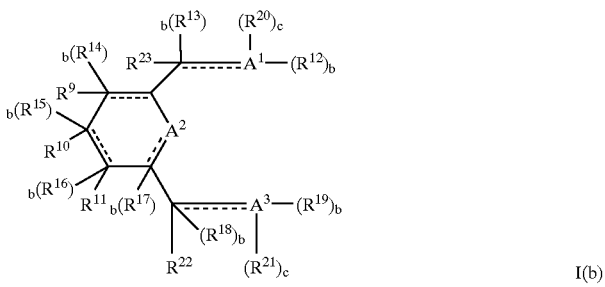

I(b)

| # | $R^{20}/R^{21}$ | $R^{22}/R^{23}$ | $R^9$ | $R^{10}$ | $R^{11}$ | $A^1$ | $A^2$ | $A^3$ | b | c |
|---|---|---|---|---|---|---|---|---|---|---|
| 125 | 2,3,4,5,6-Me$_5$Ph | H | H | H | H | N | N | N | 0 | 1 |
| 126 | (2-t-BuMe$_2$Sil)Bz | H | H | H | H | N | N | N | 0 | 1 |
| 127 | (2-Me$_3$Sil)Bz | H | H | H | H | N | N | N | 0 | 1 |
| 128 | (2-PhMe$_2$Sil)Bz | H | H | H | H | N | N | N | 0 | 1 |
| 129 | (2-PhMeSil)Bz | H | H | H | H | N | N | N | 0 | 1 |
| 130 | (2-Me$_2$Sil)Bz | H | H | H | H | N | N | N | 0 | 1 |
| 131 | 2,6-i-Pr$_2$Ph | H | H | X | H | N | N | N | 0 | 1 |
| 132 | 2,6-n-Pr$_2$Ph | H | H | X | H | N | N | N | 0 | 1 |
| 133 | 2,6-Me$_2$Ph | H | H | X | H | N | N | N | 0 | 1 |
| 134 | 2,4-,6-Me$_3$Ph | H | H | X | H | N | N | N | 0 | 1 |
| 135 | 2-t-BuPh | H | H | X | H | N | N | N | 0 | 1 |
| 136 | 2-Et-Ph | H | H | X | H | N | N | N | 0 | 1 |
| 137 | 2-Me-Ph | H | H | X | H | N | N | N | 0 | 1 |
| 138 | Ph | H | H | X | H | N | N | N | 0 | 1 |
| 139 | 2,6-Et$_2$Ph | H | H | X | H | N | N | N | 0 | 1 |
| 140 | 2,6-t-Bu$_2$Ph | H | H | X | H | N | N | N | 0 | 1 |
| 141 | 2,6-Ph$_2$Ph | H | H | X | H | N | N | N | 0 | 1 |
| 142 | 2,6-Cl$_2$Ph | H | H | X | H | N | N | N | 0 | 1 |
| 143 | 2,6-Br$_2$Ph | H | H | X | H | N | N | N | 0 | 1 |
| 144 | 2,6-I$_2$Ph | H | H | X | H | N | N | N | 0 | 1 |
| 145 | 2,6-Br$_2$-4-MePh | H | H | X | H | N | N | N | 0 | 1 |
| 146 | 2,4-Ph$_2$C$_4$N | H | H | X | H | N | N | N | 0 | 1 |
| 147 | 2,5-i-Pr$_2$C$_4$H$_2$N | H | H | X | H | N | N | N | 0 | 1 |
| 148 | 2,5-Me$_2$C$_4$H$_2$N | H | H | X | H | N | N | N | 0 | 1 |
| 149 | 2,4-i-Pr$_2$C$_4$N | H | H | X | H | N | N | N | 0 | 1 |
| 150 | 2,4-Me$_2$C$_4$N | H | H | X | H | N | N | N | 0 | 1 |
| 151 | 2,3,4,5,6-Me$_5$Ph | H | H | X | H | N | N | N | 0 | 1 |
| 152 | (2-t-BuMe$_2$Sil)Bz | H | H | X | H | N | N | N | 0 | 1 |
| 153 | (2-Me$_3$Sil)Bz | H | H | X | H | N | N | N | 0 | 1 |
| 154 | (2-PhMe$_2$Sil)Bz | H | H | X | H | N | N | N | 0 | 1 |
| 155 | (2-PhMeSil)Bz | H | H | X | H | N | N | N | 0 | 1 |
| 156 | (2-Me$_2$Sil)Bz | H | H | X | H | N | N | N | 0 | 1 |
| 157 | 2,6-i-Pr$_2$Ph | H | H | R | H | N | N | N | 0 | 1 |
| 158 | 2,6-n-Pr$_2$Ph | H | H | R | H | N | N | N | 0 | 1 |
| 159 | 2,6-Me$_2$Ph | H | H | R | H | N | N | N | 0 | 1 |
| 160 | 2,4-,6-Me$_3$Ph | H | H | R | H | N | N | N | 0 | 1 |
| 161 | 2-t-BuPh | H | H | R | H | N | N | N | 0 | 1 |
| 162 | 2-Et-Ph | H | H | R | H | N | N | N | 0 | 1 |
| 163 | 2-Me-Ph | H | H | R | H | N | N | N | 0 | 1 |
| 164 | Ph | H | H | R | H | N | N | N | 0 | 1 |
| 165 | 2,6-Et$_2$Ph | H | H | R | H | N | N | N | 0 | 1 |
| 166 | 2,6-t-Bu$_2$Ph | H | H | R | H | N | N | N | 0 | 1 |
| 167 | 2,6-Ph$_2$Ph | H | H | R | H | N | N | N | 0 | 1 |
| 168 | 2,6-Cl$_2$Ph | H | H | R | H | N | N | N | 0 | 1 |
| 169 | 2,6-Br$_2$Ph | H | H | R | H | N | N | N | 0 | 1 |
| 170 | 2,6-I$_2$Ph | H | H | R | H | N | N | N | 0 | 1 |
| 171 | 2,6-Br$_2$-4-MePh | H | H | R | H | N | N | N | 0 | 1 |
| 172 | 2,4-Ph$_2$C$_4$N | H | H | R | H | N | N | N | 0 | 1 |
| 173 | 2,5-i-Pr$_2$C$_4$H$_2$N | H | H | R | H | N | N | N | 0 | 1 |
| 174 | 2,5-Me$_2$C$_4$H$_2$N | H | H | R | H | N | N | N | 0 | 1 |
| 175 | 2,4-i-Pr$_2$C$_4$N | H | H | R | H | N | N | N | 0 | 1 |
| 176 | 2,4-Me$_2$C$_4$N | H | H | R | H | N | N | N | 0 | 1 |
| 177 | 2,3,4,5,6-Me$_5$Ph | H | H | R | H | N | N | N | 0 | 1 |
| 178 | (2-t-BuMe$_2$Sil)Bz | H | H | R | H | N | N | N | 0 | 1 |
| 179 | (2-Me$_3$Sil)Bz | H | H | R | H | N | N | N | 0 | 1 |
| 180 | (2-PhMe$_2$Sil)Bz | H | H | R | H | N | N | N | 0 | 1 |
| 181 | (2-PhMeSil)Bz | H | H | R | H | N | N | N | 0 | 1 |
| 182 | (2-Me$_2$Sil)Bz | H | H | R | H | N | N | N | 0 | 1 |
| 183 | 2,6-i-Pr$_2$Ph | H | R | R | R | N | N | N | 0 | 1 |
| 184 | 2,6-n-Pr$_2$Ph | H | R | R | R | N | N | N | 0 | 1 |
| 185 | 2,6-Me$_2$Ph | H | R | R | R | N | N | N | 0 | 1 |
| 186 | 2,4-,6-Me$_3$Ph | H | R | R | R | N | N | N | 0 | 1 |

TABLE Ib-continued

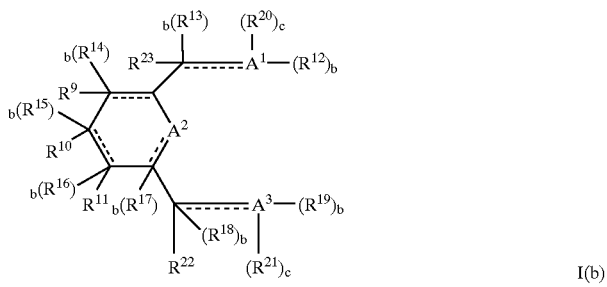

I(b)

| # | $R^{20}/R^{21}$ | $R^{22}/R^{23}$ | $R^9$ | $R^{10}$ | $R^{11}$ | $A^1$ | $A^2$ | $A^3$ | b | c |
|---|---|---|---|---|---|---|---|---|---|---|
| 187 | 2-t-BuPh | H | R | R | R | N | N | N | 0 | 1 |
| 188 | 2-Et-Ph | H | R | R | R | N | N | N | 0 | 1 |
| 189 | 2-Me-Ph | H | R | R | R | N | N | N | 0 | 1 |
| 190 | Ph | H | R | R | R | N | N | N | 0 | 1 |
| 191 | 2,6-Et$_2$Ph | H | R | R | R | N | N | N | 0 | 1 |
| 192 | 2,6-t-Bu$_2$Ph | H | R | R | R | N | N | N | 0 | 1 |
| 193 | 2,6-Ph$_2$Ph | H | R | R | R | N | N | N | 0 | 1 |
| 194 | 2,6-Cl$_2$Ph | H | R | R | R | N | N | N | 0 | 1 |
| 195 | 2,6-Br$_2$Ph | H | R | R | R | N | N | N | 0 | 1 |
| 196 | 2,6-I$_2$Ph | H | R | R | R | N | N | N | 0 | 1 |
| 197 | 2,6-Br$_2$-4-MePh | H | R | R | R | N | N | N | 0 | 1 |
| 198 | 2,4-Ph$_2$C$_4$N | H | R | R | R | N | N | N | 0 | 1 |
| 199 | 2,5-i-Pr$_2$C$_4$H$_2$N | H | R | R | R | N | N | N | 0 | 1 |
| 200 | 2,5-Me$_2$C$_4$H$_2$N | H | R | R | R | N | N | N | 0 | 1 |
| 201 | 2,4-i-Pr$_2$C$_4$N | H | R | R | R | N | N | N | 0 | 1 |
| 202 | 2,4-Me$_2$C$_4$N | H | R | R | R | N | N | N | 0 | 1 |
| 203 | 2,3,4,5,6-Me$_5$Ph | H | R | R | R | N | N | N | 0 | 1 |
| 204 | (2-t-BuMe$_2$Sil)Bz | H | R | R | R | N | N | N | 0 | 1 |
| 205 | (2-Me$_3$Sil)Bz | H | R | R | R | N | N | N | 0 | 1 |
| 206 | (2-PhMe$_2$Sil)Bz | H | R | R | R | N | N | N | 0 | 1 |
| 207 | (2-PhMeSil)Bz | H | R | R | R | N | N | N | 0 | 1 |
| 208 | (2-Me$_2$Sil)Bz | H | R | R | R | N | N | N | 0 | 1 |
| 209 | NA | Me | H | H | H | O | N | O | 0 | 0 |
| 210 | NA | Me | H | Me | H | O | N | O | 0 | 0 |
| 211 | NA | Ph | H | H | H | O | N | O | 0 | 0 |
| 212 | NA | Ph | H | Me | H | O | N | O | 0 | 0 |
| 213 | NA | Me | H | H | H | O | N | O | 0 | 0 |
| 214 | NA | Me | H | Me | H | O | N | O | 0 | 0 |
| 215 | NA | i-Pr | H | H | H | O | N | O | 0 | 0 |
| 216 | NA | i-Pr | H | Me | H | O | N | O | 0 | 0 |
| 217 | NA | i-Pr | Me | Me | Me | O | N | O | 0 | 0 |
| 218 | NA | Ph | H | H | H | O | N | O | 0 | 0 |
| 219 | NA | Ph | H | Me | H | O | N | O | 0 | 0 |
| 220 | 2,6-i-Pr$_2$Ph | Me | H | H | H | O | N | P | 0 | 1 |
| 221 | 2,6-n-Pr$_2$Ph | Me | H | H | H | O | N | P | 0 | 1 |
| 222 | 2,6-Me$_2$Ph | Me | H | H | H | O | N | P | 0 | 1 |
| 223 | 2,4-,6-Me$_3$Ph | Me | H | H | H | O | N | P | 0 | 1 |
| 224 | 2-t-BuPh | Me | H | H | H | O | N | P | 0 | 1 |
| 225 | 2-Et-Ph | Me | H | H | H | O | N | P | 0 | 1 |
| 226 | 2-Me-Ph | Me | H | H | H | O | N | P | 0 | 1 |
| 227 | Ph | Me | H | H | H | O | N | P | 0 | 1 |
| 228 | 2,6-Et$_2$Ph | Me | H | H | H | O | N | P | 0 | 1 |
| 229 | 2,6-t-Bu$_2$Ph | Me | H | H | H | O | N | P | 0 | 1 |
| 230 | 2,6-Ph$_2$Ph | Me | H | H | H | O | N | P | 0 | 1 |
| 231 | 2,6-Cl$_2$Ph | Me | H | H | H | O | N | P | 0 | 1 |
| 232 | 2,6-Br$_2$Ph | Me | H | H | H | O | N | P | 0 | 1 |
| 233 | 2,6-I$_2$Ph | Me | H | H | H | O | N | P | 0 | 1 |
| 234 | 2,6-Br$_2$-4-MePh | Me | H | H | H | O | N | P | 0 | 1 |
| 235 | 2,4-Ph$_2$C$_4$N | Me | H | H | H | O | N | P | 0 | 1 |
| 236 | 2,5-i-Pr$_2$C$_4$H$_2$N | Me | H | H | H | O | N | P | 0 | 1 |
| 237 | 2,5-Me$_2$C$_4$H$_2$N | Me | H | H | H | O | N | P | 0 | 1 |
| 238 | 2,4-i-Pr$_2$C$_4$N | Me | H | H | H | O | N | P | 0 | 1 |
| 239 | 2,4-Me$_2$C$_4$N | Me | H | H | H | O | N | P | 0 | 1 |
| 240 | 2,3,4,5,6-Me$_5$Ph | Me | H | H | H | O | N | P | 0 | 1 |
| 241 | (2-t-BuMe$_2$Sil)Bz | Me | H | H | H | O | N | P | 0 | 1 |
| 242 | (2-Me$_3$Sil)Bz | Me | H | H | H | O | N | P | 0 | 1 |
| 243 | (2-PhMe$_2$Sil)Bz | Me | H | H | H | O | N | P | 0 | 1 |
| 244 | (2-PhMeSil)Bz | Me | H | H | H | O | N | P | 0 | 1 |
| 245 | (2-Me$_2$Sil)Bz | Me | H | H | H | O | N | P | 0 | 1 |
| 246 | 2,6-i-Pr$_2$Ph | H | H | H | H | O | N | P | 0 | 1 |
| 247 | 2,6-n-Pr$_2$Ph | H | H | H | H | O | N | P | 0 | 1 |
| 248 | 2,6-Me$_2$Ph | H | H | H | H | O | N | P | 0 | 1 |

TABLE Ib-continued

I(b)

| # | $R^{20}/R^{21}$ | $R^{22}/R^{23}$ | $R^9$ | $R^{10}$ | $R^{11}$ | $A^1$ | $A^2$ | $A^3$ | b | c |
|---|---|---|---|---|---|---|---|---|---|---|
| 249 | 2,4-,6-Me$_3$Ph | H | H | H | H | O | N | P | 0 | 1 |
| 250 | 2-t-BuPh | H | H | H | H | O | N | P | 0 | 1 |
| 251 | 2-Et-Ph | H | H | H | H | O | N | P | 0 | 1 |
| 252 | 2-Me-Ph | H | H | H | H | O | N | P | 0 | 1 |
| 253 | Ph | H | H | H | H | O | N | P | 0 | 1 |
| 254 | 2,6-Et$_2$Ph | H | H | H | H | O | N | P | 0 | 1 |
| 255 | 2,6-t-Bu$_2$Ph | H | H | H | H | O | N | P | 0 | 1 |
| 256 | 2,6-Ph$_2$Ph | H | H | H | H | O | N | P | 0 | 1 |
| 257 | 2,6-Cl$_2$Ph | H | H | H | H | O | N | P | 0 | 1 |
| 258 | 2,6-Br$_2$Ph | H | H | H | H | O | N | P | 0 | 1 |
| 259 | 2,6-I$_2$Ph | H | H | H | H | O | N | P | 0 | 1 |
| 260 | 2,6-Br$_2$-4-MePh | H | H | H | H | O | N | P | 0 | 1 |
| 261 | 2,4-Ph$_2$C$_4$N | H | H | H | H | O | N | P | 0 | 1 |
| 262 | 2,5-i-Pr$_2$C$_4$H$_2$N | H | H | H | H | O | N | P | 0 | 1 |
| 263 | 2,5-Me$_2$C$_4$H$_2$N | H | H | H | H | O | N | P | 0 | 1 |
| 264 | 2,4-i-Pr$_2$C$_4$N | H | H | H | H | O | N | P | 0 | 1 |
| 265 | 2,4-Me$_2$C$_4$N | H | H | H | H | O | N | P | 0 | 1 |
| 266 | 2,3,4,5,6-Me$_5$Ph | H | H | H | H | O | N | P | 0 | 1 |
| 267 | (2-t-BuMe$_2$Sil)Bz | H | H | H | H | O | N | P | 0 | 1 |
| 268 | (2-Me$_3$Sil)Bz | H | H | H | H | O | N | P | 0 | 1 |
| 269 | (2-PhMe$_2$Sil)Bz | H | H | H | H | O | N | P | 0 | 1 |
| 270 | (2-PhMeSil)Bz | H | H | H | H | O | N | P | 0 | 1 |
| 271 | (2-Me$_2$Sil)Bz | H | H | H | H | O | N | P | 0 | 1 |

NA = Not Applicable
In Table Ib Bz = benzyl; Sil = siloxyl; iPrPh = isopropylphenyl; t-Bu = tert-butyl; Me$_2$ = dimethyl, Me$_3$ = trimethyl, X =F, Cl, Br, or I. R = independently selected from hydrogen, an unsubstituted or substituted C$_1$–C$_{20}$ hydrocarbyl or aryl or substituted aryl group, preferably wherein the aryl contains substitution in the 2 position, the 2,6 positions or the 2,4,6 positions which is selected from a C$_1$–C$_6$ (most preferably C$_1$–C$_3$) alkyl and the remaining positions are each independently selected from hydrogen (most preferred), halogen or a C$_1$–C$_6$ (preferably C$_1$–C$_3$) alkyl.

The transition metal compound that can suitably be used as the component II of the process defined herein above can be represented by the general formula:

$$M^xL_2L'_a \qquad \qquad II$$

wherein a is an integer of 0, 1 or 2 to provide a neutral compound. Thus, the sum of "a" plus 2 is equal to the oxidation state (x) of the metal M; and M represents at least one of Group 3 to 10 transition metals of the Periodic Table, preferably transition metals selected from Fe, Co, Ni, Ru, Rh, Pd, Os, Ir, Pt in the +2 (a=0) or +3 (a=1) oxidation state or Ti, V, Cr, Mn, Zr, Hf in the +2 (a=0), +3 (a=1) or +4 (a=2) oxidation states, more preferably a Group 8 to 10 late transition metal selected from iron, cobalt, nickel or palladium and most preferably iron or cobalt; and each L and, where applicable, L' independently represents a group selected from hydrogen, halo (e.g. Cl, Br and the like), and hydrocarbon based radical or group, such as methyl, ethyl, propyl (each isomer), butyl (each isomer), dimethyl amine, 1,3-butadiene-1,4-diyl, 1,4-pentadiene-1,5-diyl, C$_4$ or C$_5$ alkylene and the like, associated through a covalent bond to M, or the two L groups together represent a hydrocarbon based radical, preferably a C$_3$ to C$_{24}$ hydrocarbylene group, associated through a covalent or dative bond to M, and which, together with M, constitute a ring or fused ring structure, typically a 3 to 7, preferably 4 to 7 member heterocyclic ring structure.

In certain instances, the compound of formula II, in addition to the L and L' groups, can form of a weak dative bond chelate with water or a heteroatom containing organic compound such as, for example, dimethoxyethane, tetrahydrofuran, cyclooctadiene.

From a practical standpoint, it is preferred that L be halogen, e.g., Cl, Br or I in the transition metal compound II above. However, because L in this instance is highly electron withdrawing, it has been conventionally believed that it makes any formed pre-catalyst to be more difficult to induce activation thereof. Thus, it has been believed that the catalyst system may be activated by replacement of the halogens constituting L with groups that are less electron withdrawing, such as hydrocarbyl groups, e.g., alkyl groups.

One preferred embodiment comprises using transition metal compound II wherein at least one, and more preferably all L groups, is a halogen atom. When at least one L of the transition metal compound II is halogen, the ligand forming compound and the transition metal compound can be mixed in an inert diluent prior to, simultaneously with, or after contact (of either one) with the support-activator agglomerate. In this embodiment, the ligand forming compound and present support-activator agglomerate described herein below may be first contacted followed by introduction of the transition metal compound. Alternately, the transition metal compound and the support-activator agglomerate may be first contacted followed by introduction of the ligand forming compound I or its precursor reactants. Still further, the ligand forming compound, the transition metal compound and the support-agglomerate are admixed substantially simultaneously. It has thus been unexpectedly found that the catalyst composition comprising Components I, II and III can be readily formed in one reaction medium without the need to isolate the precatalyst and to use the composition without the need for an activation cocatalyst.

The term "substantially simultaneously" as used herein and in the appended claims with respect to the sequential introduction of the Components I and/or I-Pre with II and with III in a liquid media of a single reaction zone refers to a time of from 1 second to 60 minutes, preferably from about 30 seconds to 30 minutes, and more preferably from about 1 minute to about 10 minutes from the completed addition of the prior component. Alternatively, the components may be concurrently introduced into a liquid media of a single reaction zone.

The support-activator agglomerate is a composite in the form of agglomerates of at least two components, namely, (A) at least one inorganic oxide component and (B) at least one ion-containing layered component. In addition, the morphology of the support-activator agglomerate is believed to significantly influence the performance of the catalyst composition.

More specifically, the support-activator agglomerate used in preparing the catalyst system according to the present invention is in the form of a composite of: (A) at least one inorganic oxide component selected from $SiO_2$, $Al_2O_3$, MgO, $AlPO_4$, $TiO_2$, $ZrO_2$, $Cr_2O_3$ and mixed oxides and (B) at least one ion containing layered material having interspaces between the layers capable of exhibiting Lewis acidity, said layered material having a cationic component and an anionic component, wherein said cationic component is present within the interspaces of the layered material, and said layered material being intimately associated with said inorganic oxide component within the agglomerate. The Lewis acidity is present in an amount sufficient to activate the pre-catalyst presumably formed by the introduced components I and/or I-Pre with II. The activity of the formed coordination catalyst system can be expressed as Kg of polyethylene per gram of catalyst system per hour.

The inorganic oxide Component (A) of the support-activator agglomerate particles used in the present invention are derived from porous inorganic oxides including $SiO_2$, $Al_2O_3$, $AlPO_4$, MgO, $TiO_2$, $ZrO_2$; mixed inorganic oxides including $SiO_2.Al_2O_3$, $MgO.SiO_2$, $MgO.SiO_2.Al_2O_3$, $SiO_2.TiO_2$, $SiO_2.TiO_2.Al_2O_3$, $SiO_2.Cr_2O_3.Al_2O_3$ and $SiO_2.Cr_2O_3.TiO_2$. Where the inorganic oxide (including mixed inorganic oxides) is capable of forming a gel by known commercial procedures, it is preferred to utilize the same in a gel configuration for the milling procedures described herein. If the inorganic oxide is not susceptible to gel formation, the free oxide or mixed oxides derived from other conventional techniques such as precipitation, coprecipitation, or just admixing, can be utilized directly for the milling procedures after washing.

Most preferably, Component (A) of the support-activator agglomerate contains typically at least 80, preferably at least 90, and most preferably at least 95%, by weight, silica gel (e.g., hydrogel, aerogel, or xerogel) based on the weight of the catalyst support.

Silica hydrogel, also known as silica aquagel, is a silica gel formed in water which has its pores filled with water. A xerogel is a hydrogel with the water removed. An aerogel is a type of xerogel from which the liquid has been removed in such a way as to minimize any collapse or change in the structure as the water is removed.

Silica gel is prepared by conventional means such as by mixing an aqueous solution of an alkali metal silicate (e.g., sodium silicate) with a strong acid such as nitric or sulfuric acid, the mixing being done under suitable conditions of agitation to form a clear silica sol which sets into a hydrogel in less than about one-half hour. The resulting gel is then washed. The concentration of the $SiO_2$ in the hydrogel which is formed is usually in the range of typically between about 15 and about 40, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 50° C.

Washing is accomplished simply by immersing the newly formed hydrogel in a continuously moving stream of water which leaches out the undesirable salts, leaving about 99.5 wt. % pure silica ($SiO_2$) behind. The pH, temperature, and duration of the wash water will influence the physical properties of the silica, such as surface area (SA) and pore volume (PV). Silica gel washed at 65–90° C. at pH's of 8–9 for 28–36 hours will usually have SA's of 290–350 $m^2/g$ and form aerogels with PV's of 1.4 to 1.7 cc/gm. Silica gel washed at pH's of 3–5 at 50–65° C. for 15–25 hours will have SA's of 700–850 $m^2/g$ and form aerogels with PV's of 0.6–1.3 cc/g.

When employing a Component (A) inorganic oxide containing at least 80 wt. % silica gel, the remaining balance of the inorganic oxide Component-A can comprise various additional components. These additional components may be of two types, namely (1) those which are intimately incorporated into the gel structure upon formation, e.g., by cogelling silica gel with one or more other gel forming inorganic oxide materials, and (2) those materials which are admixed with silica gel particles prior to milling or after milling in slurry form just prior to spray drying. Thus, materials includable in the former category are silica-alumina, silica-titania, silica-titania-alumina, and silica-alumina phosphate cogels.

In the latter category, components which may be admixed, in slight proportions, with the silica hydrogel particles prior to milling and/or just prior to agglomeration include those prepared separately from inorganic oxides such as magnesium oxide, titanium oxide, thorium oxide, e.g., oxides of Groups 4 and 16, as well as other particulate constituents.

Other particulate constituents which may be present include those constituents having catalytic properties, not adversely affected by water, spray drying or calcination, such as finely divided oxides or chemical compounds, recognizing, however, that these constituents play no part in the agglomeration procedure. Similarly, it is possible to add powders or particles of other constituents to the silica hydrogel particles to impart additional properties to the support-activator agglomerate obtained. Accordingly, in addition to those powders or particulates having catalytic properties, there may be added materials which possess absorbent properties, such as synthetic zeolites. Thus, it is possible to obtain complex catalyst supports wherein amorphous silica gel contains crystallizable elements and the like.

The skilled artisan will appreciate that the amounts of such additional components must be restricted in order to avoid compromising the desired agglomerate properties described herein.

Also, it is feasible to add constituents to the inorganic oxide which may be eliminated after agglomeration in order to control porosity within a desired range; such agents as sulfur, graphite, wood charcoal, and the like being particularly useful for this purpose.

When non-silica gel components are to be employed with silica gel, they may be added to the slurry to be agglomerated. However, it is preferable that they be present in the silica gel during or prior to milling as described hereinafter, since they will be less likely to disturb the desired agglomerate morphology after spray drying when they are also subjected to milling.

In view of the above, the term "silica gel", when used to describe the process steps up to and including agglomeration, is intended to include the optional inclusion of the aforementioned non-silica gel constituents permitted to be present in Component-A of the support-activator agglomerate.

Component (B) of the support-activator agglomerate is a layered material having a three-dimensional structure which exhibits the strongest chemical bonds in only two dimensions. More specifically, the strongest chemical bonds are formed in and within two dimensional planes which are stacked on top of each other to form a three dimensional solid. The two dimensional planes are held together by weaker chemical bonds than those holding an individual plane together and generally arise from Van der Waals forces, electrostatic interactions, and hydrogen bonding. The electrostatic interactions are mediated by ions located between the layers and in addition, hydrogen bonding can occur between complimentary layers or can be mediated by interlamellar bridging molecules.

Representative examples of suitable layered materials includable in layered Component (B) can be amorphous or crystalline, preferably amorphous. Suitable layered Component (B) materials include clay, and clay minerals.

Clay is typically composed of clay minerals (i.e., crystalline silicate salts) as the main constituent. The clay or clay mineral is usually an inorganic polymeric compound of high molecular complexity constituted by a tetrahedral unit in which a central silicon atom coordinates oxygen atoms and an octahedral unit in which a central aluminum, magnesium or iron atom coordinates oxygen or hydroxide. The skeletal structures of many clays or clay minerals are not electrically neutral and have positive, most typically negative, charges on their surfaces. When possessing a negatively charged surface, they have cations in their interlaminar structures to complement such negative charges. Such interlaminar cations can be ion-exchanged by other cations. A quantification of a clay's ability to exchange interlaminar cations is called its cation exchange capacity (CEC) and is represented by milliequivalents (meq) per 100 g of clay. CEC differs depending upon the type of clay, and Clay Handbook, second edition (compiled by Japanese Clay Association, published by Gihodo Shuppan K. K.) gives the following information. Kaolinite: 3 to 15 meq/100 g, halloysite: 5 to 40 meq/100 g, montmorillonite: 80 to 150 meq/100 g, illite: 10 to 40 meq/100 g, vermiculite: 100 to 150 meq/100 g, chlorite: 10 to 40 meq/100 g, zeolite•attapulgite: 20 to 30 meq/100 g. Thus, layered Component-B to be used in the present invention, is a material, e.g., clay or clay mineral, typically having its surface negatively charged and preferably also having the ability to exchange cations.

Thus, clay minerals generally have the characteristic layer structure described above, containing between the layers, various levels of negative charges. In this respect, the clay mineral is substantially different from metal oxides having a three-dimensional structure such as silica, alumina, and zeolite. The clay minerals are classified according to the levels of the aforementioned negative charge for the chemical formula: (1) biophilite, kaolinite, dickalite, and talc having the negative charge of 0 (zero), (2) smectite having the negative charge of from −0.25 to −0.6, (3) vermiculite having the negative charge of from −0.6 to −0.9, (4) mica having the negative charge of from about −1, and (5) brittle mica having a negative charge of about −2. Each of the above groups includes various minerals. For example, the smectite group includes montmorillonite, beidellite, saponite, nontronite hectorite, teniolite, suconite and related analogues; the mica group includes white mica, palagonite and illite. These clay minerals exist in nature, and also can be synthesized artificially with a higher purity.

Any of the natural and artificial clay minerals having a negative charge below 0 are useful in the present invention. The presently preferred clay is montmorillonite, e.g., sodium montmorillonite.

Further, clays and clay minerals may be used as they are without subjecting them to any treatment prior to formation of the support-activator agglomerate therefrom, or they may be treated by ball milling, sieving, acid treatment or the like prior to such formation. Further, they may be treated to have water added and adsorbed or may be treated for dehydration under heating before support-activator agglomerate formation. They may be used alone or in combination as a mixture of two or more of them for support-activation synthesis.

Component (B) preferably is formed of pores having a diameter of at least 40 Å (e.g., 40–1000 Å) as measured by a mercury intrusion method employing a mercury porosimeter of at least 0.1 cc/g, more preferably from 0.1 to 1 cc/g. The average particle size of Component-B can vary typically from about 0.01 to about 50, preferably from about 0.1 to about 25, and most preferably from about 0.5 to about 10 microns.

Although such treatments are not preferred or required to obtain the benefits of the present invention and, therefore, may be excluded, the clays suitable for use as Component-B of the support-activator agglomerate may be subjected to pretreatment with chemicals prior or subsequent to support-activator agglomerate formation. Examples of the chemical pretreatment include treatment with an acid or alkali, treatment with a salt, and treatment with an organic or inorganic compound. The last treatment can result in formation of a composite material.

The treatment of the clay mineral with the acid or alkali may not only remove impurities from the mineral, but also may elute part of metallic cations from the crystalline structure of the clay, or may destructively alter the crystalline structure into an amorphous structure.

Examples of the acids used for this purpose are Brønstead acids, such as hydrochloric, sulfuric, nitric, acetic acid and the like. Sodium hydroxide, potassium hydroxide and calcium hydroxide are preferably used as alkali chemical in the alkali pretreatment of the clay mineral.

In the case where the clay mineral is pretreated with a salt or an inorganic, or organic compound to give a composite material, the crystalline structure may be retained substantially without being broken and, rather a product that has been modified by ion-exchange may be obtained. Examples of the inorganic salt compounds that may be used in the pretreatment with salts include ionic halide salts, such as sodium chloride, potassium chloride, lithium chloride, magnesium chloride, aluminum chloride, iron chloride and ammonium chloride; sulfate salts, such as sodium sulfate, potassium sulfate, aluminum sulfate and ammonium sulfate; carbonate salts, such as potassium carbonate, sodium carbonate and calcium carbonate; and phosphate salts, such as sodium phosphate, potassium phosphate, aluminum phosphate and ammonium phosphate. Examples of the organic salt compounds include sodium acetate, potassium acetate, potassium oxalate, sodium citrate, sodium tartarate and the like.

As examples of the inorganic compound used for the synthesis of inorganic composite material, metal hydroxides that yield hydroxide anions, for example, aluminum hydroxide, zirconium hydroxide, chromium hydroxide and the like may be mentioned.

In the case where the clay mineral is treated with an organic compound, such compounds will typically comprise a Lewis basic functional group containing an element of the Group 15 or 16 of the Periodic Table, such as organoammonium cation, oxonium cation, sulfonium cation, and phosphonium cation. The organic compound may also preferably comprise a functional group other than the Lewis basic functional group, such as carbonium cation, tropylium cation, and a metal cation. After undergoing such treatment, the exchangeable metallic cations originally present in the clay mineral are exchanged with the enumerated organic cations. Thus, compounds that yield a carbon cation, for example, trityl chloride, tropylium bromide and the like; or a complex compound that yields metallic complex cation, for example a ferrocenium salt and the like; may be used as the organic compound in the pretreatment. In addition to these compounds, onium salts may be used for the same purpose.

Particular examples of guest organic cations that may be introduced for modification of the clay minerals, include: triphenylsulfonium, trimethylsulfonium, tetraphenylphosphonium, alkyl tri(o-tolyl)phosphonium, triphenylcarbonium, cycloheptatrienium, and ferrocenium; ammonium ions, for example aliphatic ammonium cations, such as butyl ammonium, hexyl ammonium, decyl ammonium, dodecyl ammonium, diamyl ammonium, tributyl ammonium, and N,N-dimethyl decyl ammonium; and aromatic ammonium cations such as anilinium, N-methyl anilinium, N,N-dimethyl anilinium, N-ethyl anilinium, N,N-diethyl anilinium, benzyl ammonium, toluidinium, dibenzyl ammonium, tribenzyl ammonium, N,N-2,4,6-pentamethyl anilinium and the like; and also oxonium ions, such as dimethyl oxonium, diethyl oxonium and the like. These examples are not limiting. Ion exchange of the exchangeable cations in the clay mineral with selected organic cations is typically brought about by contacting the clay with an onium compound (salt) comprising the organic cations.

Particular examples of the onium salts which may be used, include: ammonium compounds; for example aliphatic amine hydrochloride salts, such as propylamine HCl salt, isopropylamine HCl salt, butylamine HCl salt, hexylamine HCl salt, decylamine HCl salt, dodecylamine HCl salt, diamylamine HCl salt, tribtutylamine HCl salt, triamylamine HCl salt, N,N-dimethyl decylamine HCl salt, N,N-dimethyl undecylamine HCl salt and the like; aromatic amine hydrochloride salts, such as aniline HCl salt, N-methylaniline HCl salt, N,N-dimethylaniline HCl salt, N-ethylaniline HCl salt, N,N-diethylaniline HCl salt, o-toluidine HCl salt, p-toluidine HCl salt, N-methyl-o-toluidine HCl salt, N-methyl-p-toluidine HCl salt, N,N-dimethyl-o-toluidine HCl salt, N,N-dimethyl-p-toluidine HCl salt, benzylamine HCl salt, dibenzylamine HCl salt, N,N-2,4,6-pentamethyl aniline HCl salt and the like; hydrofluoric, hydrobromic and hydroiodic acid salts and sulfate salts of the above-listed aliphatic and aromatic amines; and oxonium compounds, such as hydrochloric acid salts of methyl ether, ethyl ether, phenyl ether and the like. Of the onionium compounds the exemplified ammonium or oxonium compounds, preferably the ammonium compounds and more preferably the aromatic amine salts are employed in the modification of the clay mineral.

The onium compound to be reacted with the clay mineral may be in the isolated form. Alternatively, the onium compound may be formed in situ, for example by contacting the corresponding amine compound, a heteroatom-containing compound, such as an ether or sulfide compound, and a proton acid, such as hydrofluoric, hydrochloric, hydroiodic or sulfuric acid, in the reaction solvent in which the clay mineral is to be pretreated subsequently. The reaction conditions under which the clay mineral can be modified by the onium compound are not critical. Also the relative proportions of the reactants used therein are not critical. Preferably, however, when used the onium compound is employed in a proportion of not less than 0.5 equivalents per equivalent of the cation present in the clay mineral, and more preferably in a proportion of at least equivalent amount. The clay mineral may be used singly or in admixture with other clay mineral or minerals. Also the onium compound may be used singly or in admixture with other onium compounds.

The reaction solvent used in the modification pretreatment process may be water or a polar organic solvent. Examples of the organic solvents which may be used suitably, include alcohols, such as methyl alcohol, ethyl alcohol and the like; acetone, tetrahydrofuran, N,N-dimethyl formamide, dimethylsulfoxide, methylene chloride and the like. The solvent may be used singly or as a mixture of two or more solvents. Preferably, water or an alcohol is employed.

What can be viewed as separate and distinct classes of chemical modification treatments to which the clays can be subjected is referred to as pillaring and delamination. Pillaring is a phenomena whereby the platelets of certain clays, such as smectite clays, which are swellable, are separated by intercalation of large guest cations between the negatively charged platelet sheets, which cations function as molecular props or pillars separating the platelets and preventing the layers from collapsing under van der Waals forces.

Pillared clays are typically prepared by reacting a smectite clay, such as montmorillonite, with polyoxymetal cations such as polyoxycations of aluminum and zirconium. The reaction product is normally dried in air and calcined to convert the intercalated cations into metal oxide clusters interposed between the platelets of the clay such that the spacing between the platelets ranges from about 6 to about 10 Angstroms and is maintained at such values when the clay is heated to a temperature between about 500° C. and 700° C. When the reaction product is dried, the clay platelets, which are propped apart by the metal oxide clusters, orient themselves face-to-face, thereby forming a lamellar structure which yields an X-ray diffraction pattern containing distinct first order or (001) reflection. The extent of lamellar ordering is indicated by the X-ray powder diffraction pattern of the pillared clay. A well-ordered, air-dried, pillared montmorillonite may exhibit six or more orders of reflection. Pillared clays and their preparation are described more fully in the article entitled "Intercalated Clay Catalysts," *Science*, Vol. 220, No. 4595 pp. 365–371 (Apr. 22, 1983) and in U.S. Pat. Nos. 4,176,090; 4,216,188; 4,238,364; 4,248,739; 4,271,043; 4,367,163; 4,629,712;

4,637,992; 4,761,391; 4,859,648; and 4,995,964. The disclosures of the aforementioned articles and patents are incorporated herein by reference in their entireties.

In contrast to pillared clays, which have platelets that are ordered in a face-to-face arrangement, delaminated clays also contain large cations but the platelets are oriented edge-to-edge and edge-to-face in what can be described as a "house-of-cards" structure containing macropores of a size typically found in amorphous aluminosilicates in addition to the micropores found in pillared clays. (See U.S. Pat. No. 4,761,391 for a further discussion. ) Such clays are distinct from those that have been subjected to exfoliation by high shear forces and the like which substantially destroys the house of cards structure. Thus non-exfoliated clays should be used and non-delaminated and non-exfoliated clays are preferred.

While it is possible and permissible to modify Component (B) with guest cations as described above, such procedures add process steps to the overall preparation, and from a process point of view, are preferably not employed.

However, when Component (B) is modified by exchanging originally present cations for guest cations, the goal sought to be achieved by such exchange is to render the support-activator agglomerate capable of activating either the pre-catalyst or the pre-activated catalyst as described above. It is believed that the indigenous cations typically present in the aforementioned clays are already capable of accomplishing this goal.

The support-activator agglomerate is made from an intimate admixture of Components (A) and (B), which admixture is shaped in the form of an agglomerate. The weight ratio of Components (A)/(B) in the agglomerate can vary typically from about 0.25:1 to about 99:1, preferably from about 0.5:1 to about 20:1, most preferably from about 1:1 to about 10:1 (e.g., 4:1). The term "agglomerate" refers to a product that combines particles which are held together by a variety of physical-chemical forces. More specifically, each agglomerate is preferably composed of a plurality of contiguous, constituent primary particles derived primarily from Component (A) and much smaller secondary constituent particles derived from both Component-(A) and Component (B) preferably joined and connected at their points of contact.

The agglomerates of the present invention preferably will exhibit a higher macropore content than the constituent primary or secondary particles as a result of the interparticle voids between the constituent particles. However, such interparticle voids may be almost completely filled with the smaller secondary particles in other embodiments of the spray dried agglomerates.

The agglomeration of Components (A) and (B) may be carried out in accordance with methods well known to the art such as by pelletizing, extrusion, shaping into beads in a rotating coating drum, and the like. A nodulizing technique whereby composite particles having a diameter of not greater than about 0.1 mm are agglomerated to particles with a diameter of at least about 1 mm by means of a granulation liquid may also be employed.

However, the preferred agglomerates are made by drying, preferably spray drying a slurry of Components-A and -B. More specifically, in this embodiment, the support-activator agglomerate is made by admixing Components-A and -B to form a slurry, preferably an aqueous slurry, comprising typically at least 50, preferably at least 75 (e.g., at least 80), and most preferably at least 85 (e.g., at least 90), wt. % water based on the slurry weight. However, organic solvents, such as $C_5$ to $C_{12}$ alkanes, alcohols (e.g. isopropyl alcohol), may also be employed although they represent a fire hazard relative to water and often make agglomerates too fragile for use as polymerization catalysts.

To render Component (A) suitable for agglomerate formation, e.g. drying or spray drying, various milling procedures are typically employed (although not required). The goal of the milling procedure is to ultimately provide Component (A), when intended to be spray dried, with an average particle size of typically from about 2 to about 10 (e.g. 3 to about 7) preferably from about 4 to about 9, and most preferably from 4 to 7 microns. Desirably the milling procedures will also impart a particle size Distribution Span to the particles in the slurry of typically from 0.5 to about 3.0, and preferably from about 0.5 to about 2.0. The particle size Distribution Span is determined in accordance with the following equation:

$$\text{Distribution Span} = \frac{D_{90} - D_{10}}{D_{50}} \qquad \text{Equation 1a}$$

wherein $D_{10}$, $D_{50}$, and $D_{90}$ represent the $10^{th}$, $50^{th}$, and $90^{th}$ percentile, respectively, of the particle size (diameter) distribution, i.e. a $D_{90}$ of 100 microns means that 90 volume % of the particles have diameters less than or equal to 100 microns. Still more preferably, the milling is conducted to impart a particle size distribution to the Component (A) inorganic oxides in the slurry to be spray dried such that the Component (A) colloidal content is typically from about 2 to about 60 (e.g. 2 to about 40), preferably from about 3 to about 25, and most preferably from about 4 to about 20 wt. %.

The colloidal content of Component (A) to be spray dried is determined by centrifuging a sample for 30 minutes at 3600 RPM. The liquid (supernatant) which remains on top of the test tube is decanted, and analyzed for % solids. The % of colloidal material is then determined by the following equation:

$$\% \text{ colloid} = \left[ \frac{\left(\frac{1-B}{B}\right) - 2.2}{\left(\frac{1-A}{A}\right) - 2.2} \right] \times 100 \qquad \text{Equation 1b}$$

wherein
A=wt. % solids in supernatant/100, and
B=wt. % solids of original slurry/100

The colloidal content will possess a particle diameter in the colloidal range of typically less than about 1, preferably less than about 0.5, and typically from about 0.4 to about 1 micron.

All particle size and particle size distribution measurements described herein are determined by a Mastersizer unit from Malvern, which operates on the principle of laser light diffraction and is known to all familiar in the art of small particle analysis.

As the dry colloidal content content of the Component (A) slurry exceeds about 60 wt. %, the constituent particles of the agglomerate can become bound too tightly together. Conversely, while the presence of at least some colloidal content of the slurry is desired, a slurry containing no colloidal content (e.g. dry milled powder alone) will typically produce agglomerates of the support-activator agglomerate which have extremely low physical integrity to an undesirable degree. In such instances, it may be desirable to include some alternative source of binder. Thus, it is preferred that the colloidal content of the Component A (as dry solids) be within the range of from about 5 to 50, more preferably from 5–40 wt. %.

One milling procedure, which has been found to impart the aforedescribed properties, as well as the desired morphology, involves a wet milling procedure and optionally a dry milling procedure. A wet milling procedure is characterized by the presence of liquid, e.g. water, during the milling procedure. Thus, wet milling is typically performed on a slurry of the inorganic oxide particles having a solids content of typically from about 15 to about 25 weight % based on the slurry weight.

In the wet milling procedure, the washed inorganic oxide is typically subjected to a milling procedure well known in the art that is necessary to produce slurries with the particle sizes specified above. Suitable mills include hammer mills, impact mills (where particle size reduction/control) is achieved by impact of the oxide with metal blades and retained by an appropriately sized screen), and sand mills (where particle size control/reduction is achieved by contact of the oxide with hard media such as sand or zirconia beads).

The colloidal particles within the wet milled material are the primary source of the colloid content in the slurry to be spray dried as described above, and are believed to act as a binder upon spray drying.

More specifically, with wet milling, Component A can be slurried in a media (usually water) and the mixture then subjected to intense mechanical action, such as the high speed blades of a hammer mill or rapidly churning media of a sand mill. Wet milling reduces particle size and produces colloidal silica as well.

Accordingly, the inorganic oxide (typically while still wet) is then subjected to a milling operation as described below to prepare it for spray drying. Once the target average particle size and preferably the particle size Distribution Span is imparted to Component A, a slurry, preferably aqueous slurry, is prepared for agglomeration, preferably by spray drying.

A dry milling procedure is characterized by the substantial absence of the presence of free flowing liquid, e.g. water or solvent. Thus, while the final dry milled material may contain some absorbed moisture, it is essentially in powder form, not a suspension or solution of particles in liquid. The dry milling referred to typically takes particulate inorganic oxide and reduces it in size either by mechanical action, impingement onto a metal surface, or collision with other particles after entrainment into a high-velocity air stream or the like.

Accordingly, the inorganic oxide (typically while still wet) is then subjected to a milling operation as described below to prepare it for spray drying.

In the dry milling procedure, Component-A is typically milled in a manner sufficient to reduce its average particle size to typically from about 2 to about 10, preferably from about 3 to about 7, and most preferably from about 3 to 6 microns, and its moisture content to typically less that about 50, preferably less than about 25, and most preferably less that about 15 weight %. In order to attain the dry milling particle size targets at the higher moisture contents, it may be necessary to conduct dry milling while the particles are frozen.

The dry milling is also conducted to preferably impart a particle size distribution such that the Distribution Span is typically from about 0.5 to about 3.0, preferably from about 0.5 to about 2.0, and most preferably from about 0.7 to about 1.3. Thus, the resulting dry milled material exists in the form of a powder prior to being slurried for spray drying.

The dry milling is preferably conducted in a mill capable of flash drying the inorganic oxide while milling. Flash drying is a standard industrial process where the material to be dried is quickly dispersed into a hot air chamber and exposed to an air stream of 370–537° C. The rate of air and material input is balanced such that the temperature of the outgoing air and the material entrained in it is generally 121–176° C. The whole process of drying usually takes place in less than 10 seconds, reducing the moisture content to less than about 10%. Alternatively, the inorganic oxide can be separately flash dried to the aforedescribed moisture content in a flash dryer and then placed in a dry mill and milled. Suitable dry mills include an ABB Raymond™ impact mill or an ALJET™ FLUID ENERGY MILL. Ball mills can also be used. Suitable flash drying equipment includes Bowen™ flash dryer. Other similar equipment is well known in the chemical processing industry.

Flash drying is typically accomplished by exposing the inorganic oxide to conditions of temperature and pressure sufficient to reduce the moisture content thereof to levels as described above over a period of time of typically less than about 60, preferably less than about 30, and most preferably less than about 5 seconds. Dry milling typically does not produce colloidal silica.

In accordance with one embodiment of the agglomerate formation by spray drying, at least a portion of the material constituting Component-A is derived from wet milling, and optionally but preferably at least a portion is derived from dry milling. Thus, prior to agglomeration, Component-A will typically comprise a mixture of previously wet milled inorganic oxide, e.g. silica gel, and dry milled inorganic oxide, e.g. silica gel powder. More specifically, the weight ratio (on a dry solids content basis as defined hereinafter) of the wet milled:dry milled inorganic oxide solids in the slurry can vary typically from about 9:0 to about 0.1:1 (e.g., 9:1), preferably from about 1.5:1 to about 0.1:1, and most preferably from about 0.6:1 to about 0.25:1. The particular wet milled:dry milled solids ratio of Component-A employed will be selected to achieve the target properties in the final slurry to be used in agglomerate formation.

In an alternative embodiment, a sequential milling procedure can be employed to impart the target properties of average particle size and particle size distribution. The sequential milling procedure involves dry milling a sample of the Component-A inorganic oxide and then wet milling the previously dry milled sample.

It has been observed that drying of inorganic oxide starting material during dry milling and then using the dry milled product for wet milling tends to produce a lower colloidal content relative to mixing a separately prepared dry milled product and a separately prepared wet milled product. The reason for this phenomenon is not entirely understood. However, sufficient colloidal content is produced to bind the agglomerate together in a desirable manner.

Once the target average particle size and preferably the particle size Distribution Span is imparted to Component (A), a slurry, preferably aqueous slurry, is prepared for agglomeration, preferably by spray drying.

The Component (B) layered material, e.g. clay, is typically comprised of fine particles having an average particle size of typically less than 10, preferably less than 5, and most preferably less than 1 micron, such particle sizes ranging typically from about 0.1 to about 10, preferably from about 0.1 to about 5, and most preferably from about 0.1 to about 1 microns. Other preferable physical properties of the clay include a total nitrogen pore volume of typically greater than 0.005 (e.g., 0.005 to 1.50), preferably greater than about 0.1 (e.g., 0.1 to 2) cc/g; a nitrogen surface area of typically greater than 10, preferably greater than 30 (e.g., 10 to 100) m$^2$/g; and an Apparent Bulk Density (ABD) of typically greater than 0.10, preferably greater than 0.25 (e.g., 0.10 to 0.75) g/cc. Milling procedures can be employed to achieve these target properties, if necessary.

To agglomerate by spray drying, Components (A) and (B) are admixed, typically in a suitable diluent, to form a slurry of the same. The diluent can be aqueous or organic. The preferred liquid slurry medium for spray drying is aqueous, typically greater than 75, preferably greater than 80, and most preferably greater than 95 wt. % water (e.g. entirely water).

The weight ratio of Component (A):Component (B) in the slurry, can vary typically from about 0.25:1 to about 99:1, preferably from about 0.5:1 to about 20:1, and most preferably from about 1:1 to about 10:1 (e.g., 4:1). The solids content of the slurry containing the mixture of Components (A) and (B) can vary typically from about 5 to about 25, preferably from about 10 to about 20, and most preferably from about 15 to about 20 wt. % based on the slurry weight.

Accordingly, agglomerate formation is controlled to impart preferably the following properties to the support-activator agglomerate:

(1) A surface area of typically at least about 20, preferably at least about 30, and most preferably from at least about 50 m$^2$/g, which surface area can range typically from about 20 to about 800, preferably from about 30 to about 700, and most preferably from about 50 to about 600 m$^2$/g;

(2) A bulk density of the support-activator agglomerate particles of typically at least about 0.15, preferably at least about 0.20, and most preferably at least about 0.25 g/ml, which bulk density can range typically from about 0.15 to about 1, preferably from about 0.20 to about 0.75, and most preferably from about 0.25 to about 0.45 g/ml;

(3) An average pore diameter of typically from about 30 to about 300, and most preferably from about 60 to about 150 Angstroms;

(4) A total pore volume of typically from about 0.10 to about 2.0, preferably from about 0.5 to about 1.8, and most preferably from about 0.8 to about 1.6 cc/g; and (5) An attrition resistance which provides friability for suitable catalyst fragmentation for the particular polymerization process contemplated.

The particle size and particle size distribution sought to be imparted to the support-activator agglomerate particles is dictated and controlled by the type of polymerization reaction in which the ultimate supported catalyst will be employed. For example, a solution polymerization process typically can employ an average particle size of from about 1 to about 10 microns; a continuous stirred tank reactor (CSTR) slurry polymerization process of from about 8 to 50 microns; a loop slurry polymerization process of from about 10 to about 150 microns; and a gas phase polymerization process of from about 20 to about 120 microns. Moreover, each polymer manufacturer has its own preferences based on the particular reactor configuration.

Once the desired average particle size is determined for the agglomerates based on the targeted polymerization process, the particle size distribution will desirably be such that the Distribution Span is typically from about 0.5 to about 4, preferably from about 0.5 to about 3, and most preferably from about 0.5 to 2.

Accordingly, as a generalization, the average particle size of the agglomerates will range typically from about 4 to about 250 (e.g. about 8 to about 200), and preferably from about 8 to about 100 (e.g. about 30 to about 60) microns.

When the agglomerates are formed by spray drying, they can be further characterized in that typically at least 80, preferably at least 90, and most preferably at least 95 volume % of that fraction of the support-activator agglomerate particles smaller that the $D_{90}$ of the entire agglomerate particle size distribution possesses microspheroidal shape (i.e., morphology). Evaluation of the microspheroidal morphology is performed on that fraction of the particle size distribution of the support-activator agglomerates which is smaller than the $D_{90}$ to avoid distortion of the results by a few large particle chunks which because of their large volume, would constitute a non-representative sample of the agglomerate volume. The term "spheroidal" as used herein means small particles of a generally rounded, but not necessarily spherical shape. This term is intended to distinguish from irregular jagged chunks and leaf or rod like configurations. "Spheroidal" is also intended to include polylobed configurations wherein the lobes are also generally rounded, although polylobed structures are uncommon when the agglomerate is made as described herein.

Each microspheroid is preferably composed of a loosely to densely packed composite of Components (A) and (B) typically with some, to substantially no, interstitial void spaces, and typically substantially no visible boundaries, in an electron micrograph, between particles originally derived from Components (A) and (B).

However, microprobe image and elemental analysis of a cross-sectioned view of preferred agglomerate particles reveals that the Fe and Al ions associated with Component (B) are distributed in clusters of varying density around discrete sub-particles of material-bearing no iron or aluminum. This leads to the conclusion that, in the most preferred agglomerate particles, Component (B) is intimately admixed with Component-A such that islands of inorganic oxide (e.g., silica) are surrounded by a matrix of inorganic oxide (most likely derived from the colloidal constituents of the inorganic oxide) and layered material (e.g., clay). It is believed that the varying intensity (concentration) of Al and Fe, in the matrix is indicative of varying ratios of Component (A) to Component (B) in the matrix.

The microspheroidal shape of the support-activator agglomerate significantly enhances the desired morphology of the polymers derived therefrom. Thus, one is able to simultaneously significantly enhance catalyst activity and desired polymer morphology by utilizing the 2 components of support-activator agglomerate.

The terms "surface area" and "pore volume" refer herein to the specific surface area and pore volume determined by nitrogen adsorption using the B.E.T. technique as described by S. Brunauer, P. Emmett, and E. Teller in Journal of American Chemical society, 60, pp. 209–319 (1939).

Bulk density is measured by quickly transferring (in 10 seconds) the sample powder into a graduated cylinder which overflows when exactly 100 cc is reached. No further powder is added at this point. The rate of powder addition prevents settling within the cylinder. The weight of the powder is divided by 100 cc to give the density.

Spray drying conditions are typically controlled in order to impart the desired target properties described above to the agglomerate. The most influential spray drying conditions are the pH of the aqueous slurry to be spray dried, as well as its dry solids content. By "dry solids content" as used herein is meant the weight of solids in the slurry after such solids have been dried at 175° C. for 3 hours, and then at 955° C. for 1 hour. Thus, dry solids content is used to quantify the weight of solid ingredients which exist in the slurry and to avoid inclusion of adsorbed water in such weight.

Typically, the pH of the slurry will be controlled or adjusted to be from about 5 to about 10 (e.g., 8 to 9), preferably from about 7 to about 9. The dry solids content will be controlled or adjusted to be typically from about 12 to 30, preferably from about 15 to about 25, and most preferably from about 18 to about 22 (e.g. 20) weight % based on the weight of the slurry and the dry weight of the gel.

Control of the remaining variables in the spray drying process, such as the viscosity and temperature of the feed, surface tension of the feed, feed rate, the selection and operation of the atomizer (preferably an air atomizer is employed and preferably without the use of a pressure nozzle), the atomization energy applied, the manner in which air and spray are contacted, and the rate of drying, are well within the skill of the spray dry artisan once directed by the target properties sought to be imparted to the product produced by the spray drying. (See for example U.S. Pat. No. 4,131,452.)

Product separation from the drying air follows completion of the spray drying stage when the dried product remains suspended in the air. Any convenient collection method can be employed, such as removal from the base of the spray dryer by the use of separation equipment.

To provide uniformity to the catalyst as well as the resulting polymer, it is desirable to calcine the support-activator agglomerate to control any residual moisture present in the support. When calcination is employed, it will typically be conducted at sufficient temperature and time to reduce the total volatiles to between about 0.1 and 8 wt. % where the total volatiles are determined by measuring the weight loss upon destructive calcination of the sample at 1000° C. Accordingly, calcination, when employed, will typically be conducted by heating the support-activator agglomerate to temperatures of typically from about 100 to about 800, preferably from about 150 to about 600, and most preferably from about 200 to about 500° C. for periods of typically from about 1 to about 600 (e.g., 50 to 600), and preferably from about 50 to about 300 minutes. The atmosphere of calcination can be air or an inert gas. Calcination should be conducted to avoid sintering.

After formation, the support-activator agglomerate is preferably sized prior to calcination since the agglomerates will pick up moisture if sized after calcination. This can be conveniently accomplished by screening or air classifying as is well known in the art.

The particle size and particle size distribution selected will depend on the catalyst type and polymerization process to be applied, as would be well known in the art. Normally, when the catalyst composition of the present invention is contemplated for use in a slurry polymerization process, the particle size of the support-activator agglomerate is from 1 to 100, preferably from 10 to 60 microns.

The preferred manner in which the support-activator agglomerate (III) is combined with the ligand I of formula Ia or Ib or their precursors and the transition metal compound II will depend in part on the polymerization technique to be employed. Although it is preferred to provide for the catalyst composition of the present invention by contacting a single ligand forming compound (I) or its precursor reagents (I-Pre) with a transition metal compound (II) and a support-activator agglomerate (III), one may further introduce a second ligand compound I or a set of precursors reagents to a single medium containing the other components forming the catalyst composition of the present invention.

More specifically, the catalyst system resulting from the combination of at least one component I or I-Pre, with II and III as described herein above, are useful to produce polymers using high-pressure polymerization, solution polymerization, slurry polymerization, or gas phase polymerization techniques. As used herein, the term polymerization includes copolymerization and terpolymerization, and the terms "olefins" and "olefinic monomers" include olefins, alpha-olefins, diolefins, styrenic monomers, acetylenically unsaturated monomers, cyclic olefins, and mixtures thereof.

For example, polymerization of olefin monomers can be carried out in the gas phase by fluidizing, under polymerization conditions, a bed comprising the target polyolefin powder and particulates of the catalyst composition using a fluidizing gas stream comprising gaseous monomer. In a solution process the polymerization or copolymerization is typically conducted by introducing the monomer(s) into a solution or suspension of the present catalyst composition in a liquid hydrocarbon under conditions of temperature and pressure such that the produced polyolefin forms as a solution in the hydrocarbon diluent. In the slurry process, the temperature, pressure and choice of diluent are such that the produced polymer forms as a suspension in a liquid hydrocarbon diluent.

It will be apparent from the above discussion, that deployment of the catalyst system can vary depending on the polymerization process employed with a preference for permitting the formation in-situ of the activated system in the presence of the polymerizable monomer.

Thus, for gas phase polymerizations, the ligand I and the transition metal compound II can be impregnated into the support-activator agglomerate with a solvent and the solvent optionally evaporated, whereas for polymerizations which occur in the liquid state the catalyst system components can be simply mixed in an inert liquid (a hydrocarbon liquid) or any other inert media for addition to the polymerization zone, or to a media that is the same as or misible in the liquid in which the polymerizations are conducted.

The mixing of at least one ligand forming compound (I), or alternately, reactants (I-Pre) capable of directly forming a ligand(all referred to in the following discussion as Component I), transition metal compound (II)(referred to in the following discussion as Component II), and support-activator agglomerate (III)(referred to in the following discussion as Component III) can be readily accomplished by introducing the components into a liquid, preferably a substantially inert (with respect to chemical reaction with Components I, II and III) liquid, which can serve as a diluent or solvent for one or more of the catalyst's components.

Suitable inert liquids include hydrocarbon liquids, preferably $C_5$–$C_{10}$ aliphatic or cycloaliphatic hydrocarbons, or $C_6$–$C_{12}$ aromatic or alkyl substituted aromatic hydrocarbons and mixtures thereof. The inert liquid may also be selected from certain inert oxyhydrocarbon liquids, such as a $C_1$–$C_8$ alkanol, such as methanol, ethanol, isopropanol, butanol and the like; an di($C_1$–$C_3$alkyl)ether, such as diethyl ether, ethyl propyl ether and the like; a cyclic ether, such as tetrahydrofuran, glyme, diglyme and the like; and alkyl aldehydes and ketones. These liquids may be used to form the catalyst composition according to the present invention and removed prior to the composition being introduced into the polymerization zone. Alternately, the liquid used can be chosen from those that may be inert with respect to the polymerization process contemplated (e.g. $C_4$–$C_{12}$ alkanes) and, therefore, may be used as the liquid to form the catalyst composition and to introduce the formed composition into the polymerization zone. Still further, when the liquid is inert with respect to the polymerization process (the monomer and the resultant polymer), the composition may be formed in-situ in the polymerization zone by introducing the Components I, II and III directly to the polymerization zone.

The components are introduced into the liquid and maintained therein under agitation and at low temperature and pressure conditions. Particularly suitable hydrocarbons include, for example, 1,2-dichloroethane, dichloromethane, pentane, isopentane, hexane, heptane, octane, isooctane, nonane, isononane, decane, cyclohexane, methylcyclohexane, toluene, and combinations of two or more of such diluents. Ethers such as diethylether and tetrahydrofuran can also be used.

Components I and/or I-Pre, II and III can be introduced into the inert liquid substantially simultaneously in any order. It is preferred that, when the components are introduced sequentially, they are introduced in rapid order; that is, without a substantial period of delay between each components introduction. For example, the components can be introduced sequentially over a period of from about 1 second to 60 minutes, preferably from about 30 seconds to 30 minutes, and more preferably from about 1 minute to 10 minutes of the prior introduced component. Alternatively, the components can be introduced concurrently.

The temperature of the liquid into which the components are added may range typically from about 0 to about 200° C., preferably from about 5 to about 150° C., and most preferably from about 20 to about 100° C. (e.g. 60 to about 100° C.). The Components can be contacted at reduced, atmospheric or elevated pressure. Ambient conditions are preferred. The atmospheric condition of the mixing zone should preferably be substantially anaerobic and anhydrous.

The components are mixed for a period, preferably from 0.5 hour to 24 hours, more preferably from 1 to 12 hours and most preferably from 1 to 5 hours to provide a substantially uniform catalyst composition.

When the catalyst composition is formed outside of the polymerization zone, the formed product can be separated from the inert liquid, by filtration, vacuum distillation or the like to provide a solid preformed catalyst composition.

The solid preformed catalyst is preferably stored under anaerobic conditions until being introduced into a polymerization reaction zone for use in forming polyolefin products. The resultant catalyst composition is storage stable for about 3 to 6 months or longer.

Alternatively, the mixture of Components I, II and III in the inert liquid hydrocarbon (with respect to the components and the resulting composition), can remain without separation or purification as a slurry and be used directly as a polymerization catalyst composition. Thus, the present catalyst composition can be formed by the single-step of mixing the readily available components in an inert liquid and then either directly transferring the formed liquid dispersion to the polymerization reaction zone or placing it in storage under anerobic conditions for latter introduction to the polymerization reaction zone. In this embodiment, the inert liquid used to form the dispersion preferably is chosen from those liquids which (a) are miscible with the liquids used in the polymerization reaction zone, (b) are inert with respect to the solvents, monomer(s) and polymer products contemplated and (c) are capable of suspending or dispersing Component III (e.g., is a non-solvent for the support-activator agglomerate).

The present polymerization catalyst composition can be formed in-situ in a liquid phase polymerization reaction zone. The Components I, II and III can be introduced neat or as a solution in an inert liquid, which may be the same liquid as that of the polymerization media. These components may be introduced into the polymerization zone either as solids or as slurries in inert liquids. In all cases, the liquid(s) used to introduce the components forming the present catalyst composition preferably is miscible with the liquid used as the polymerization media.

In batch polymerization processes, the components forming the present catalyst composition may be introduced prior to, concurrently with or subsequent to the introduction of the olefinic monomer feed. It has been found that the present catalyst composition forms rapidly under normal polymerization conditions to exhibit high catalytic activity and provide a high molecular weight polymer product.

The amount of Components I and II in the inert liquid hydrocarbon should be controlled to provide a molar ratio of from about 0.01/1 to 10/1 and preferably from 0.1/1 to 2/1 and most preferably from 0.1/1 to 1/1 of Components I and II and a ratio of micromoles of Component I (ligand or the combined precursor reagents) to grams of Component III (support-activator agglomerate) of typically from about 5:1 to about 500:1, preferably from about 10:1 to about 250:1, and most preferably from about 30:1 to about 100:1 (e.g., 60:1).

It has been unexpectedly found that the presently formed catalyst composition exhibits high catalytic activity without the presence of a co-catalyst activator. Such activators are conventionally used to cause activation of single-site metallic catalysts, such as those of bidentate and tridentate transition metal ligand catalyst complexes. Thus, the use of conventional used organometallic activators (e.g. methyl alumoxane or borone and borate compounds) that present handling and cost concerns to the process can be avoided.

In addition, when the subject catalyst composition is formed from a Component II having all L groups in the form of halogens, as described above, the resultant catalyst is preferably combined with known organometallic scavenging agents either prior to entry or upon entry into the polymerization reaction zone.

Organometallic compounds suitable for use as scavengers include those represented by Formula (IV):

$$D^s(R^{25})_s \qquad \text{III}$$

wherein D represents an element of the Group 1, 2 or 13 of the Periodic Table, or a tin atom or a zinc atom; each $R^{25}$ independently represents a hydrogen atom, a halogen atom (e.g., chlorine, fluorine, bromine, iodine and mixtures thereof), a hydrocarbon based radical such as hydrocarbyl, typically a $C_1$ to $C_{24}$ hydrocarbyl, including $C_1$ to $C_{24}$ alkyl (e.g., methyl, ethyl, propyl, pentyl, hexyl, heptyl, decyl, isopropyl, butyl, isobutyl, sec-butyl, t-butyl),or alkoxy (e.g., methyoxy, ethoxy, propoxy, butoxy, isopropoxy)or an aryl (e.g., phenyl, biphenyl, naphthyl), aryloxy, arylalkyl, arylalkoxy, alkylaryl or alkylaryloxy group having 6 to 24 carbon atoms, such as, for example, aryloxy groups (e.g., phenoxy), arylalkyl groups (e.g., benzyl, phenylethyl), arylalkoxy groups (benzyloxy), alkylaryl groups (e.g., tolyl, xylyl, cumenyl, mesityl), and alkylaryloxy groups (e.g., methylphenoxy) provided at least one $R^{25}$ is selected from a hydrocarbyl radical described above; and s is the oxidation number of D. Preferably at least one $R^{20}$ is hydrocarbyl, e.g., an alkyl group having 1 to 24 carbon atoms or an aryl, arylalkyl or alkylaryl group having 6 to 24 carbon atoms. The symbol "s" represents the oxidation number of D. The preferred organometallic compounds are those wherein D is aluminum.

Representative examples of organometallic compounds include alkyl aluminum compounds, preferably trialkyl aluminum compounds, such as trimethyl aluminum, triethyl aluminum, triisopropyl aluminum, triisobutyl aluminum, tri-n-propylaluminum, triisobutylaluminum, tri-n-butylaluminum, triamylaluminum, and the like; alkyl aluminum alkoxides such as ethyl aluminum diethoxide, diisobutyl aluminum ethoxide, di(tert-butyl) aluminum butoxide, diisopropyl aluminum ethoxide, dimethyl aluminum ethoxide, diethyl aluminum ethoxide, di-n-propyl aluminum ethoxide, di-n-butyl aluminum ethoxide, and the like; aluminum alkoxides such as aluminum ethoxide, aluminum propoxide, aluminum butoxide and the like; alkyl or aryl aluminum halides such as diethyl aluminum chloride, ethyl aluminum dichloride, diisopropyl aluminum chloride and the like; aluminum aryloxides such as aluminum phenoxide, and the like; and mixed aryl, alkyl or aryloxy, alkyl aluminum compounds and aluminum hydrides such as dimethylaluminum hydride, diethylaluminum hydride, diisopropylaluminum hydride, di-n-propylaluminum hydride, diisobutylaluminum hydride, and di-n-butylaluminum hydride. The most preferred organometallic compounds are the trialkyl aluminum compounds.

In instances where the organometallic compound is used, it can be directly introduced to the polymerization zone in an inert liquid. When so employed by addition directly to the polymerization zone, the ratio of organometallic compound can be defined as a function of the weight of the support-activator agglomerate. More specifically, the ratio of millimoles (mmol) of organometallic compound to grams of support-activator agglomerate of the catalyst composition employed can vary typically from about 0.001:1 to about 100:1, preferably from about 0.01:1 to about 50:1, and most preferably from about 0.1:1 to about 30:1.

The amount of liquid hydrocarbon can vary typically from about 5 to about 98, preferably from about 60 to about 98, and most preferably from about 75 to about 90 wt. % based on the combined weight of liquid hydrocarbon and Components I, II and III.

Without wishing to be bound to any particular theory, it is believed that even without separation of the catalyst system from the inert liquid, the ligand forming compounds of Component I and the transition metal compound of Component II very quickly and uniformly adhere to the surface (outer surface and of the pores) of the support-activator agglomerate) and/or are absorbed (penetrate into the inner structure of the support-activator agglomerate particles) with respect to the structure of the support-activator agglomerate of Component III. It is believed that the molecular size and structure of the ligands and the transition metal compounds used herein permits these components to readily penetrate throughout the porous structure of the support-activator agglomerate. Further, they are caused to be disperse throughout the support-activator agglomerate due to the support's composition and to form a bidentate or tridentate transition metal ligand containing complex (a pre-catalyst specie) which is bound on and/or within the support-activator agglomerate by ionic bonding with the Lewis-acid species of the Component III. The complex or other catalytic structure formed by Components I and II are also physically intercalated within the layered structure of Component III. Thus, the resultant catalyst complex achieved herein results in effective immobilization of a transition metal ligand-containing complex onto the support-activator agglomerate matrix and activation of the pre-catalyst complex by the support-activator agglomerate as a single-site catalyst complex.

The catalyst composition of the present invention can be used for polymerization, typically addition polymerization, processes wherein one or more monomers are contacted with the coordination catalyst system (either in its original inert liquid or as separated solid product, as described above) by introduction into the polymerization zone under polymerization conditions.

The present catalyst composition has unexpectedly been found to exhibit higher polymerization catalytic activity than compositions composed of pre-catalyst that was first formed using the same ligand and transition metal compound and then impregnating the preformed pre-catalyst onto the same support-activator agglomerate, as used herein. The exact reason for this improvement is not known but is an indication that the present catalyst composition is unique. Further, the present catalyst composition can be effectively used without the need of a cocatalyst, as is normally believed necessary.

Suitable polymerizable monomers include ethylenically unsaturated monomers, acetylenic compounds, conjugated or non-conjugated dienes, and polyenes. Preferred monomers include olefins, for example alpha-olefins having from 2 to 20,000, preferably from 2 to 20, and more preferably from 2 to 8 carbon atoms and combinations of two or more of such alpha-olefins. Particularly suitable alpha-olefins include, for example, ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene or combinations thereof, as well as long chain vinyl terminated oligomeric or polymeric reaction products formed during the polymerization and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1, 1-hexene, 1-octene, and combinations of ethylene and/or propylene with one or more of such other alpha-olefins. The most preferred is ethylene alone or with other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

In addition, the polymerization monomers may include functionalized ethylenically unsaturated monomers wherein the functional group is selected from hydroxyl, carboxylic acid, carboxylic acid esters, acetates, ethers, amides, amines and the like.

More specifically, the catalyst system described herein are useful to produce polymers using high pressure polymerization, solution polymerization, slurry polymerization, or gas phase polymerization techniques. As used herein, the term polymerization includes copolymerization and terpolymerization, and the terms olefins and olefinic monomers include olefins, alpha-olefins, diolefins, styrenic monomers, acetylenically unsaturated monomers, cyclic olefins, and mixtures thereof.

For example, polymerization of olefin monomers can be carried out in the gas phase by fluidizing, under polymerization conditions, a bed comprising the target polyolefin powder and particulates of the present catalyst composition using a fluidizing gas stream comprising gaseous monomer. In a solution process the (co)polymerization is typically conducted by introducing the monomer into a solution or suspension of the present catalyst composition in a liquid hydrocarbon under conditions of temperature and pressure such that the produced polyolefin forms as a solution in the hydrocarbon diluent. In the slurry process, the temperature, pressure and choice of diluent are such that the produced polymer forms as a suspension in a liquid hydrocarbon diluent.

The present catalyst system (the composition resulting from the combining of Components I, II and III either alone or further with an organometallic compound IV, a described herein above) can be advantageously employed in a high pressure, solution, slurry or gas phase polymerization process. Methods and apparatus for effecting such polymerization reactions are well known. The catalyst system according to the present invention can be used in similar amounts and under similar conditions generally known for olefin polymerization catalysts. However, due to the enhanced catalytic activity exhibited by the present compositions, lower dosages of catalyst can be employed for a specific production of polymer. Alternately, the same dosage of catalyst composition, as is conventionally used with its relevant coordinate catalyst composition, will produce higher yields of polymer product.

When the polymerization is conducted by a slurry process, the temperature is from approximately 0° C. to just below the temperature at which the polymer becomes soluble in the polymerization medium. For the gas phase process, the temperature is from approximately 0° C. to just below the melting point of the polymer. For the solution process, the temperature is typically the temperature from which the polymer is soluble in the reaction medium, up to approximately 275° C. The pressure used can be selected from a relatively wide range of suitable pressures, e.g., from subatmospheric to about 20,000 psi. Preferred pressures can range from atmospheric to about 1000 psi, and most preferred from 50 to 550 psi. In the slurry or particle form process, the process is suitably performed with a liquid inert diluent such as a saturated aliphatic hydrocarbon. The hydrocarbon is typically a $C_3$ to $C_{10}$ hydrocarbon, e.g., propane, isobutane or an aromatic hydrocarbon liquid such as benzene, toluene or xylene. The polymer can be recovered directly from the gas phase process, by filtration or evaporation of the slurry from the slurry process, or evaporation of solvent in the solution process.

The supported catalyst composition of the present invention can be used as the sole catalyst composition in the polymerization of olefins. Alternately, it may be used in combination with at least one supplemental active catalyst species such as metallocene, constrained geometry, bidentate or tridentate ligand containing materials. For example, the catalyst compositions of the present invention either as its components or as a previously prepared material may be admixed with at least one secondary preformed catalyst particulate that utilizes a support-activator agglomerate formed from a mixture comprising (A) at least one inorganic oxide component, and (B) at least one ion-containing layered component, which optionally has chromium atoms immobilized on and/or within the agglomerate.

The morphological configuration in which the supplemental catalyst species is employed will typically involve use of at least one supplemental catalytic species absorbed or adsorbed in and/or on (a) a support-agglomerate particles in which chromium is immobilized on and/or within the support-agglomerate; (b) a support-agglomerate particles which do not contain chromium, such as described herein; or (c) mixtures of (a) and (b). Such supplemental catalysts are disclosed in U.S. applications Ser. Nos. 60/287,607; 60/287,602; 60/287,617; and 60/287,600; and concurrently filed and copending U.S. applications having Ser. No. 10/120,291; Ser. No. 10/120,317; Ser. No. 10/120,331; Ser. No. 10/120,310; and Ser. No. 10/120,314; the teachings of which are incorporated herein in their entirety by reference.

For example, the additional particulate may be formed by:
I. contacting substantially simultaneously or sequentially in a liquid media at least one ligand forming compound comprising at least one bidentate ligand forming compound or at least one tridentate ligand forming compound or mixtures thereof with a transition metal compound and with a support-activator agglomerate comprising (A) at least one inorganic oxide component, and (B) at least one ion-containing layered component. The agglomerate may further have chromium atoms immobilized on and/or within the agglomerate. The resultant particles have the catalyst component(s) contained on such support-activator agglomerate;

II. contacting substantially simultaneously or sequentially in a liquid media at least one coordination catalyst comprising at least one transition metal bidentate ligand containing compound or at least one transition metal tridentate chelate ligand containing compound or mixtures thereof alone or further with at least one constrained geometry transition metal compound (e.g. a metallocene or its precursors, such as a cyclopentadienyl compound and a metal selected from titanium, zirconium or hafnium) with a support-activator agglomerate comprising (A) at least one inorganic oxide component, and (B) at least one ion-containing layered component. The agglomerate may further have chromium atoms immobilized on and/or within the agglomerate. The resultant particles have the catalyst component(s) contained on such support-activator agglomerates;

III. contacting substantially simultaneously or sequentially in a liquid media a mixture comprising a) at least one transition metal bidentate ligand containing compound or at least one transition metal tridentate ligand containing compound or mixtures thereof with b) at least one metallocene or constrained geometry transition metal compound (e.g. a metallocene or its precursors, such as a cyclopentadiene or its derivative compounds and a metal selected from titanium, zirconium or hafnium), and with c) a support-activator agglomerate comprising (A) at least one inorganic oxide component, and (B) at least one ion-containing layered component. The agglomerate may further have chromium atoms immobilized on and/or within the agglomerate. The resultant particles have the catalyst component(s) contained on such support-activator agglomerate; or IV. contacting substantially simultaneously or sequentially in a liquid media at least one metallocene or constrained geometry transition metal compound (e.g. a metallocene or its precursors, such as a cyclopentadiene or its derivative compounds and a metal selected from titanium, zirconium or hafnium), with a support-activator agglomerate comprising (A) at least one inorganic oxide component, and (B) at least one ion-containing layered component. The agglomerate may further have chromium atoms immobilized on and/or within the agglomerate. The resultant particles have the catalyst component(s) contained on such support-activator agglomerate.

The present catalyst may be admixed with the additional preformed catalyst particulate in any proportion. Thus, one may customize the blend to enhance one or more of the properties of the resultant catalyst composition. For example, if the particular catalyst of the present invention provides a polymer from a particular monomer which exhibits mono-modal molecular weight distribution, a second supported catalyst may be used to provide bimodal molecular weight distribution to the resultant polymer product. The specific identity of the additional supported catalyst(s) and the exact ratio to be used to form the admixture will depend on the modification of the property being observed, the nature of each catalyst component and the polymerization conditions contemplated. Such conditions can be determined by simple experimentation by one skilled in this art.

For example, in an embodiment wherein the present catalyst composition is employed in a mixture with particles of supplemental catalyst specie(s), the present catalyst composition may be a component of a catalyst system that comprises from about 1 to about 99 (e.g. 10 to 90, such as 20 to 85) weight percent of support-activator agglomerate of a first catalyst composition and from about 95 to about 2 (e.g. 90 to 10, such as 80 to 15, respectively) weight percent of support-activator agglomerate of the second supported supplemental catalyst specie(s) formed from supported bidentate or tridentate transition metal complexes, a metallocene or constrained geometry transition metal compound or precursors of the complex or of the compound., respectively, or mixtures thereof.

In another embodiment, the present catalyst may be a component of a catalyst composition in which each particle is a composite of the catalyst species of the present invention and at least one supplemental catalyst species. The composite particle may be formed by physically mixing the product of the mixture of Components I, II and III as described herein above and a prior formed supplemental catalyst species as also described above and reforming the particulate material or by introducing at least one supplemental catalyst species during the formation of the catalyst species formed according to the present invention. The ratio of present catalyst to supplemental catalyst within each particle may vary widely and will depend on the particular end result desired (catalyst activity, polymer properties, etc.) The composition of the particles may be, for example, from about 5 to about 98 (e.g., 10 to 90, such as 20 to 85) weight percent of a first catalyst component formed from Components I, II, and III according to the present invention and from about 95 to about 2 (e.g., 90 to 10, such as 80 to 15, respectively) weight percent of a second supplemental catalyst component. The compounds useful in the formation of each of the above composite particles are described in the above referenced U.S. patent applications concurrently filed with this application.

The compounds useful in the formation of each of the composite particles are described in the above referenced U.S. provisional patent applications and the US applications concurrently filed with this application.

All references herein to elements or metals belonging to a certain Group refer to the Periodic Table of the Elements in Hawley's Condensed Chemical Dictionary, 12$^{th}$ Edition. Also, any references to the Group or Groups shall be to the Group or Groups as reflected in this Periodic Table of Elements using the new notation system for numbering groups.

The following examples are given as specific illustrations of the subject invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLE 1

Preparation of Support-activator Agglomerate

Part A—Preparation of Base Silica Hydrogel

Silica gel was prepared by mixing an aqueous solution of sodium silicate and sulfuric acid under suitable agitation and temperature to form a silica sol that sets to a gel in about 8 minutes. The resulting gel was base washed with dilute (about 2 wt. %) ammonia ($NH_3$) solution at 65.5° C. (150° F.) for 18 to 36 hours. During this time, the silica gel was cleansed of salt by-products and the surface area was modified. The base wash was followed by a fresh water wash wherein the gel was placed in a re-circulating bath at 82° C.

The base washed gel was aged at 65–82° C. for about 36 hours and a pH of 6 to 7 for one sample designated 1A, and a pH of 7.5 to 9 for another sample designated 1B. The surface area of the gel was thereby reduced to about 600 $m^2/g$ for Sample 1A and to 300 $m^2/g$ for Sample 1B. The resulting water washed gel of Samples 1A and 1B have a $SiO_2$ content of about 35 wt. % with the balance being water, and an Average Particle Size (APS) of Samples 1A and 1B from 0.5 to 2.0 micron.

Part B(i)—Preparation of Wet Milled Hydrogel Sample 2A (SA 600 $m^2/g$)

A Sample 1A silica gel prepared in accordance with Part A was subjected to wet milling in a sand mill. Sufficient water was then added thereto to make a slurry of 20 wt. % solids. The bulk sample particle size was reduced with a blade mill and further processed through a wet sand mill to reduce the average particle size (APS) to <100 microns. The sample was then sand milled. The slurry was pumped through the sand mill at 1 liter per minute with a media load of 80% (4 liters) zirconia silicate 1.2 mm beads. The average particle size was reduced to 8 and 10 microns and the particle size distribution was 4/8/15 microns for D10, D50 and D90. The surface area was 600 $m^2/g$. The resulting wet milled sample was designated Sample 2A. Sample 2A had a colloidal content between 20 and 25 wt. % as determined by centrifugation.

Part B(ii)—Preparation of Wet Milled Hydrogel Sample 2B (SA 300 $m^2/g$)

Example 1, Part B(i) was repeated using base silica gel Sample 1B. The resulting wet milled sample was designated Sample 2B and had a colloidal content between 15 and 30 wt. % as determined by centrifugation and a SA of 300 $m^2/g$. The resulting material was designated Sample 2B.

Part C—Preparation of Dry Milled Sample 3B (SA 300 $m^2/g$)

A base silica gel Sample 1B prepared in accordance with Part A was subjected to dry milling procedure as follows:

The sample was flash or spray dried to a moisture content below 10 wt. %. The dried powder sample was then milled to an average particle size (APS) of about 5 microns, a surface area (SA) of still about 300 $m^2/g$, and a N2 pore volume of 1.5 cc/g. The resulting sample was designated Sample 3B.

Part D—Preparations of Dry Milled Sample 3A (600 $m^2/g$)

Part C was repeated except that the base silica gel was Sample 1A prepared in accordance with Example 1, Part A. The resulting dry milled sample had a moisture content of less than 10 wt. %, an APS of 5 microns and a SA of 600 $m^2/g$. The resulting sample was designated Sample 3A.

Part E—Preparation of Silica Slurry

Six different blends (designated Runs 1 to 6) of Sample 2B and Sample 3B were prepared at weight ratios of Sample 3B (dry milled):Sample 2B (wet milled) as reported in Table I. Before blending, Sample 3B was slurried in water to a 20 wt. % solids content using a mixer. The Sample 3B slurry was then added to the 20 wt. % solids content aqueous slurry of Sample 2B at amounts sufficient to achieve the ratios reported in Table I.

TABLE I

Silica Support Slurries
Sample 3B (Dry Milled):Sample 2B (Wet Milled)

| Run Number | Ex No | Weight % Ratio | Weight Ratio |
|---|---|---|---|
| 1 | Ex 1 Part E | 79/21 | 3.75:1 |
| 2 | Ex 1 Part E | 78/22 | 3.50:1 |
| 3 | Ex 1 Part E | 75/25 | 3.00:1 |
| 4 | Ex 1 Part E | 70/30 | 2.25:1 |
| 5 | Ex 1 Part E | 60/40 | 1.50:1 |
| 6 | Ex 1 Part E | 0/100 | 0:1 |

Part F—Preparation of Alternate Silica Support Slurries

Part E was repeated except that Sample 3B (300 m$^2$/g) was replaced with Sample 3A (600 m$^2$/g) and Sample 2B (300 m$^2$ g) was replaced with Sample 2A (600 m$^2$/g,. The dry milled/wet milled ratios employed are summarized at Table V and the slurries designated Runs 7 to 9.

TABLE II

Sample 3A (Dry Milled):Sample 2A (Wet Milled)

| Run Number | Weight % Ratio | Weight Ratio |
|---|---|---|
| 7 | 75/25 | 3.00:1 |
| 8 | 60/40 | 1.50:1 |
| 9 | 0/100 | 0:1 |

Part G—Preparation of Clay Slurry

A montmorillonite clay available from Southern Clay, under the trade names, Montmorillonite BP Colloidal Clay, was obtained. This clay has the following properties as summarized at Table III.

TABLE III

Chemical Composition of Montmorillonite BP Colloidal Clay

| Chemical Composition | | Physical Properties | |
|---|---|---|---|
| Component | Weight % | Appearance | Tan Powder |
| SiO2 | 69.5 | Apparent Bulk Density | 0.45 g/cc |
| Fe2O3 | 4.4 | Surface Area | 70 m$^2$/g |
| Al2O3 | 19.0 | APS | 1.5 microns |
| MgO | 2.3 | Average Pore Diameter | 114 Å |
| CaO | 1.0 | Total Pore Volume | 0.20 cc/g |
| Na2O | 2.7 | | |
| SO4 | 0.6 | | |

Part H—Preparation of Silica/Clay Slurry for Spray Drying

Each of the silica slurries of Runs 1 to 9 was combined with the clay slurry of Part G in a manner sufficient to control the weight ratio of silica: clay dry solids to be as reported at Table IV. Each slurry was adjusted with acid (sulfuric acid) or base (ammonium hydroxide) to achieve a slurry pH of 7–8.5. The APS of the slurry solids was about 4 to 5 microns, the total dry solids content of the slurry was about 15 to 18 wt. % The resulting slurries are designated Runs 10 to 18.

TABLE IV

Spray Drying or Tray Drying Slurry and Conditions

| Run No. | Ex. No. | Source of Silica (Run Nos.) | Silica:Clay Dry Solids Ratio (w/w) |
|---|---|---|---|
| 10 | Ex 1 Pt H | 1 | 95:5 |
| 11 | Ex 1 Pt H | 2 | 90:10 |
| 12 | Ex 1 Pt H | 3 | 80:20 |
| 13 | Ex 1 Pt H | 4 | 65:35 |
| 14 | Ex 1 Pt H | 5 | 50:50 |
| 15 | Ex 1 Pt H | 6 | 25:75 |
| 16 | Ex 1 Pt H | 7 | 80:20 |
| 17 | Ex 1 Pt H | 8 | 50:50 |
| 18 | Ex 1 Pt H | 9 | 25:75 |

Part I—Spray Drying of Silica/Clay Slurry

The pH value of the silica/clay slurry was adjusted and was then pumped to a spray dryer to dry the mixture and to form microspheroidal agglomerates. All spray drying is conducted by using a Bowen 3-ft. diameter spray dryer with inlet-outlet temperatures of 350/150° C. and a two-fluid spray nozzle using air at 10–30 psi to atomize the slurry. The air through-put of the Niro is dampened to keep the spray chamber under 7" vacuum and the slurry is fed at 250–300 cc/min. The product is then collected in the chamber collection pot, located directly under the drying chamber, where the coarsest fraction drops out from air entrainment. Other, smaller fractions go to a cyclone collection pot and the smallest to a baghouse. The chamber material is then screened through 200 to 250 mesh to give the desired APS of 40–55 microns. The Total Volatiles (TV %) at 954.4° C. (1750° F.) of the spray dried product is in the range of 2–20 wt. %, so further drying in a static bed oven at 150–800° C. is then used to lower the total volatiles down to 0.5–5%.

The total yield of material from the spray dryer chamber collection pot and from screening the same is about 15–20 wt. %.

Table V below reports silica/clay morphological properties of the resulting agglomerates. The resulting Agglomerate Samples are designated Runs 19 to 27.

TABLE V

Spray Dried Silica/Clay Support-Activator Product Properties

| | | | Agglomerate Properties | | | | |
|---|---|---|---|---|---|---|---|
| Run No. | Ex. No. | Slurry Source from Table VII (Run No.) | Silica/Clay (Weight Ratio) | APS (microns) | SA (m$^2$/g) | Pore Vol. (cc/g) | Drying Procedure |
| 19 | Ex 1 | 10 | 95:5 | 45 | 275 | 1.65 | Spray |
| 20 | Ex 1 | 11 | 90:10 | 45 | 268 | 1.61 | Spray |
| 21 | Ex 1 | 12 | 80:20 | 45 | 251 | 1.48 | Spray |

TABLE V-continued

Spray Dried Silica/Clay Support-Activator Product Properties

| | | | Agglomerate Properties | | | | |
|---|---|---|---|---|---|---|---|
| Run No. | Ex. No. | Slurry Source from Table VII (Run No.) | Silica/Clay (Weight Ratio) | APS (microns) | SA ($m^2/g$) | Pore Vol. (cc/g) | Drying Procedure |
| 22 | Ex 1 | 13 | 65:35 | 45 | 213 | 1.28 | Spray |
| 23 | Ex 1 | 14 | 50:50 | 45 | 185 | 1.04 | Spray |
| 24 | Ex 1 | 15 | 25:75 | 45 | 160 | 0.64 | Spray |
| 25 | Ex 1 | 16 | 80:20 | 45 | 494 | 1.16 | Spray |
| 26 | Ex 1 | 17 | 50:50 | 45 | 322 | 0.83 | Spray |
| 27 | Ex 1 | 18 | 25:75 | 45 | 192 | 0.54 | Spray |

EXAMPLE 2

Method for Preparation of Catalyst

Method A (Simultaneous Addition) 80 mg (201 mmoles) of a tridentate ligand forming compound, 2,6-diacetylpyridine-bis(2,4,6-trimethylaniline), 25 mg (197 mmole) iron dichloride and 10 g of the support-activator agglomerate of Example 1, Table V, Run 25 (APS=35 microns; dehydrated at 250° C.), were simultaneously charged into one vessel with 50 ml of 1-butanol. The resultant slurry was maintained at 80° C. under and inert atmosphere of argon for 3 hours. The resultant reaction slurry was evaporated under vacuum at 80° C. for about 15 hours to remove residual butanol. The resultant product was a free flowing grayish brown solid.

Method B (Sequential Support Addition) The process of Example 2A above was repeated using the same ligand, transition metal compound and support in the amounts described above except that the support-activator agglomerate was added into the same reaction vessel about 15 minutes after the ligand forming compound and transition metal compound were charged into the vessel.

Method C (Use of Pre-I) A catalyst composition was formed by directly charging the precursors of the tridentate ligand forming compound used in Examples 2A and 2B above. 33 mg (0.202 mmole) of 2,6-diacetlypyridine, 60 mg (0.44 mmole) of 2,4,6-trimethylaniline were mixed with 25 mg (0.197 mmole)of $FeCl_2$ and 10 g of support-activator agglomerate of Example 1, Table V, Run 25. The components were mixed in 100 ml of n-butanol for 4 hours with some formic acid present. The resultant slurry was evaporated to dryness at 80° C. to give a free flowing powder product.

Comparative Method D For comparative purposes, a catalyst was formed by using a preformed late transition metal trident containing pre-catalyst compound (instead of its precursors) with the support-activator agglomerate. 50 mg (95 µmole) of 2,6-diacetylpyridine-bis(2,4,6-trimethylaniline)iron dichloride was added to 75 ml of toluene that contained 5.0 g support-activator agglomerate of Example 1,Table V, Run 25 (APS=35 microns; dehydrated at 250° C.). The resulting solution was agitated at room temperature overnight, filtered, washed with heptane and then dried in vacuo for about 3 hours. Yield=5.04 g.

EXAMPLE 3

Polymerization of Ethylene

A. Polymerization Method

In the slurry polymerization experiments of this and the following examples, unless otherwise indicated, a 2-liter Zipperclave (Autoclave Engineers, Inc.) reactor was rendered inert by heating under vacuum at the polymerization temperature 80° C., for 90 minutes. A reactor charge consisting of a mixture of 400 ml of dry, degassed heptane and the specified amount of tri-isobutylaluminum and the specified supported catalyst system were injected into the reactor. While the reactor contents were stirred at 500 rpm, ethylene and hydrogen were quickly introduced into the reactor until a final reactor pressure of 200 psig was attained. The stated polymerization temperature was maintained by a circulating water bath. Ethylene was supplied on demand via a mass flow controller to maintain the reactor pressure at about 200 psig. After 60 minutes, the ethylene and hydrogen feed was stopped and the reactor cooled to room temperature and vented. The resulting polymer slurry was filtered and washed with methanol and acetone to deactivate any residual catalyst, filtered and dried in a vacuum oven at about 50° C. for at least three hours to constant weight. After drying, the polymer was weighed to calculate catalyst activity and a sample of dried polymer was used to determine apparent bulk density according to the procedure of ASTM 1895. Polymer molecular weight and molecular weight distribution data were obtained by GPC, where indicated.

B. Catalytic Performances for the Catalyst Produced According to Example 2 Above.

15 mg of each of the catalyst produced according to Examples 2, Methods A, B, C and D were separately charged into a 2 liter Zipperclave reactor having 400 ml of heptane with specified amounts (See Table VI) of tri-isobutylaluminum as a 1M solution in toluene. Ethylene polymerization was conducted at 80° C. and 200 psig pressure which was derived from a 10 psig partial pressure of $H_2$ and a 190 psig partial pressure of ethylene. The reaction was allowed to continue for 60 minutes. The results are shown in Table VI below.

TABLE VI

Performance of One-stage Formed Catalyst Composition

| Run # | Cat Prep Method of Ex. 2 | Fe %* | Cat wt. mg | AlBu₃ Used μmole | PE yield g | Cat activity g/g-cat-h | Fe activity g/g-Fe-h | ABD g/cc | HLMI |
|---|---|---|---|---|---|---|---|---|---|
| 28 | A | 0.11 | 15 | 400 | 120.0 | 8,530 | $8.00 \times 10^6$ | 0.44 | 3.18 |
| 29 | A | 0.11 | 15 | 500 | 130.7 | 8,710 | $8.15 \times 10^6$ | 0.43 | 2.46 |
| 30 | B | 0.11 | 15 | 400 | 135.5 | 9,000 | $8.26 \times 10^6$ | 0.44 | 3.58 |
| 31 | C | 0.11 | 15 | 400 | 41.0 | 2,700 | $2.5 \times 10^6$ | 0.38 | 2.51 |
| 32 | D | 0.11 | 15 | 400 | 109.2 | 7,260 | $6.8 \times 10^6$ | 0.42 | 3.23 |

*Fe % is based on the tridentate Fe complex
ABD = Average Bulk Density
HLMI = High/Low Melt Index The above results show that polymer product having excellent morphology can be readily formed. The similar catalytic activity exhibited for catalysts formed by Example 2, Methods A and B (and superior to Comparative Run 32) suggests that the support does not interfere with the combining of the Fe compound, the ligand and the support used. Further, the support did not interact with the n-butanol solvent. The present support, instead, causes the formation of a heterogeneous supported catalyst complex. Further, although the activity shown for Run 31 is lower than the other samples formed directly from ligand, the activity is still commercially desirable especially when one considers the efficiency of skipping the reaction process to form ligand as well as Fe pre-catalyst.

EXAMPLE 4

Preparations of Heterogeneous Catalyst Using Bidentate Ligand, NiBr₂(DME), and Support-activator Agglomerate Catalyst 1. A supported bidentate Ni catalyst was prepared according to the following procedure: Bi-dentate ligand [ArN=C(An)—C(An)=NAr] where (Ar=2,6-C₆H₃(i-Pr)₂ (70 mg; 0.227 mmole), NiBr₂(DME) where (DME=1,2-dimethoxyethane) (50 mg; 0.162 mmole), and support-activator agglomerate of Example 1, Table V, Run 25 having an APS of 45 microns (3 g; dehydrated @ 500° C.) were mixed with 75 ml toluene at room temperature under argon atmosphere. The resulting reaction slurry was agitated in an orbital shaker overnight and was then filtered through a fritted filter funnel. The resulting light orange color solid was washed with heptane (~2×20 ml) and dried in vacuo to give free-flowing powder.

Catalyst 2. A supported bidentate Ni catalyst was prepared by the same procedure as described for Catalyst 1 above except that 80 mg (0.259 mmole) of NiBr₂ was used.

Catalyst Evaluation. 100 mg of the above mentioned catalyst 1 and 2 was used for polymerization (in the same manner as described above in Example 3, Part A) at 50° C. and 200 psi ethylene pressure.

TABLE VIII

| Run # | Cat # | Ni %* | Cat. Wt mg | AlBu₃ μmole | PE yield g | ABD‡ g/cc | Mw × 10³ | Mw/Mn |
|---|---|---|---|---|---|---|---|---|
| 33 | 1 | 0.3 | 100 | 500 | 25.4 | 0.25 | 257.1 | 2.99 |
| 34 | 2 | 0.3 | 100 | 500 | 25.2 | 0.25 | NA | NA |

*Ni % based on moles of Bidentate Ni complex theoretically formed in the composition
‡Apparent Bulk Density The principals, preferred embodiments and modes of operation of the present invention have been described in the foregoing specification. The invention which is intended to be protected herein, however, is not to be construed as limited to be particular forms disclosed, since these are to be regarded as illustrative rather than restrictive. Variations and changes may be made by those skilled in the art, without departing from the spirit of the invention.

What is claimed:

1. A process for forming an activated coordination catalyst system useful for the polymerization of olefins comprising:

providing Component I selected from at least one ligand forming compound or, precursor compounds for forming at least one ligand forming compound, wherein said at least one ligand forming compound is represented by at least one of the following formulas IA or IB:

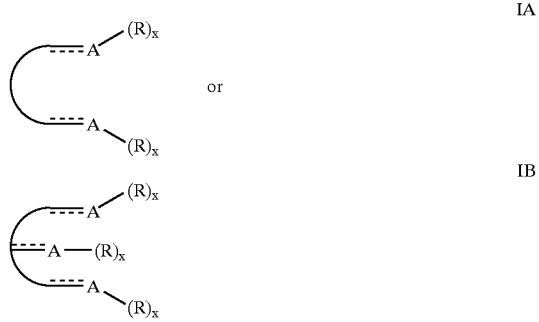

wherein in each of formulas IA and IB above:
  each A independently represents an atom of oxygen, sulfur, phosphorous or nitrogen;
  each R independently represents hydrogen, an unsubstituted or substituted $C_1$–$C_{20}$ hydrocarbyl;
  - - - represents a bond between an A atom and a carbon atom, wherein said bond is selected from a single or a double bond; and each x independently represents an integer of 0, 1 or 2, provided that when A represents either a nitrogen or phosphorous atom and - - - represents a double bond then x is 1; when A represents either a nitrogen or phosphorous atom and - - - represents a single bond, then x is 2; when A represents either an oxygen or sulfur atom and - - - represents a double bond, then x is 0; and when A represents either an oxygen or sulfur atom and - - - represents a single bond, then x is 1: and the lines joining each A to each other A represent a $C_2$ to $C_{90}$ hydrocarbon based group;

providing as Component II at least one a transition metal compound represented by the formula:

$$M^xL_2L'_a \qquad \text{II}$$

wherein a is an integer of 0, 1 or 2 such that the sum of a plus 2 equals x,

M represents at least one of Group 3 to 10 transition metals of the Periodic Table; and each L and L', independently represents a member selected from hydrogen, halogen, and hydrocarbon based group associated through a covalent bond to M, or together represent a $C_3$ to $C_{24}$ hydrocarbon based group, associated through a covalent or dative bond to M, and which, together with M, constitute a ring or fused ring structure; and providing as Component III a support-activator agglomerate composite comprising agglomerates of at least two components comprising (A) at least one inorganic oxide component and (B) at least one ion-containing layered component; and contacting Components I, II and III in the presence of an inert liquid, said contacting being conducted under conditions sufficient to have Components I, II and III form an activated coordination catalyst composition.

2. The process of claim 1 wherein Component I is at least one compound represented by the formula:

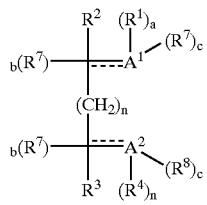

Ia wherein $R^1$ and $R^4$ are each independently selected from an unsubstituted or substituted $C_1$–$C_{20}$ hydrocarbyl group, or a fluorinated hydrocarbyl group or together with adjacent groups represent a $C_3$–$C_{20}$ hydrocarbylene group;

$R^2$, $R^3$, $R^5$, $R^6$, $R^7$, and $R^8$ are each independently selected from hydrogen, an unsubstituted or substituted $C_1$–$C_{20}$ hydrocarbyl group, or any two adjacent R groups together represent an unsubstituted or substituted $C_3$–$C_{20}$ hydrocarbylene group;

each A independently represents oxygen, nitrogen, sulfur or phosphorous;

- - - represents a bond between an A atom and a carbon atom, wherein said bond is selected from a single or a double bond; and a, b and c each independently represent 0 or 1, provided that when A represents a nitrogen or phosphorous atom and - - - represents a double bond, then a and b are 0 and c is 1; when A represents a nitrogen or phosphorous atom and - - - represents a single bond then a, b and c are each 1; when A represents oxygen or sulfur and - - - represents a double bond, then a, b and c are each 0, and when A represents oxygen or sulfur atom and - - - represents a single bond, then a and b are each 1 and c is 0.

3. The process of claim 1 wherein Component I is at least one compound represented by the formula:

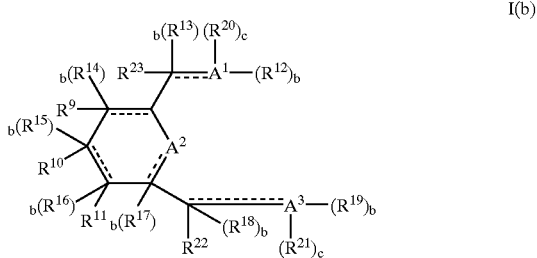

I(b)

wherein:

$R^{20}$ and $R^{21}$ are each independently selected from hydrogen, or an unsubstituted or substituted aryl group wherein said substitution is an alkyl or a hetero group which is inert with respect to any contemplated polymerization;

$R^{22}$ and $R^{23}$ are each independently selected from hydrogen, an unsubstituted or substituted $C_1$–$C_{20}$ hydrocarbyl;

$R^9$ to $R^{19}$ are each independently selected from hydrogen, an unsubstituted or substituted $C_1$–$C_{20}$ hydrocarbyl or an inert functional group;

each A independently represents oxygen, nitrogen, sulfur or phosphorous;

- - - represents a bond between an A atom and a carbon atom, wherein said bond is selected from a single or a double bond; and b and c are each independently 0 or 1, provided that when A is nitrogen or phosphorous atom and - - - represents a double bond, then b is 0 and c is 1; when A is nitrogen or phosphorous atom and - - - represents a single bond, each b and c is 1; when A represents oxygen or sulfur atom and - - - is a double bond, then a and b are each 0; and, when A represents oxygen or sulfur atom and - - - is a single bond, then b is 0 and c is 1.

4. The process of claim 1 wherein at least one L of the Component II is a halogen atom selected from chlorine or bromine.

5. The process of claim 2 wherein at least one L of the Component II is a halogen atom selected from chlorine or bromine.

6. The process of claim 3 wherein at least one L of the Component II is a halogen atom selected from chlorine or bromine.

7. The process of claim 1 wherein L and L' of the Component II are halogen atoms selected from chlorine or bromine.

8. The process of claim 1 wherein M of the Component II is a transition metal selected from Fe, Go, Ni, Ru, Rh, Pd, Os, Ir, Pt in the +2 or +3 oxidation state or Ti, V, Cr, Mn, Zr, Hf in the +2, +3 or +4 oxidation state and at least one L is selected from chlorine or bromine.

9. The process of claim 1 wherein M of the Component II is a transition metal selected from Fe, Co, Ni, or Pd, in the +2 or +3 oxidation state and at least one L is selected from chlorine or bromine.

10. The process of claim 2 or 3 wherein M of the Component II is a transition metal selected from Fe, Co, Ni, or Pd, in the +2 or +3 oxidation state and at least one L is selected from chlorine or bromine.

11. The process of claim 2 or 3 wherein the Component II is iron chloride.

12. The process of claim 1, 2, 3, 4, 5, 6, 7, 8 or 9 wherein Component III is derived from the inorganic oxide (A) selected from $SiO_2$, $Al_2O_3$, $AlPO_4$, $MgO$, $TiO_2$, $ZrO_2$, $SiO_2.Al_2O_3$, $MgO.SiO_2.Al_2O_3$, $SiO_2.TiO_2.Al_2O_3$, $SiO_2.Cr_2O_3.Al_2O_3$ or $SiO_2.Cr_2O_3.TiO_2$ and and mixtures thereof.

13. The process of claim 10 wherein Component III is derived from the inorganic oxide (A) selected from $SiO_2$, $Al_2O_3$, $AlPO_4$, $MgO$, $TiO_2$, $ZrO_2$, $SiO_2.Al_2O_3$, $MgO.SiO_2.Al_2O_3$, $SiO_2.TiO_2.Al_2O_3$, $SiO_2.Cr_2O_3.Al_2O_3$ or $SiO_2.Cr_2O_3.TiO_2$ and mixtures thereof.

14. The process of claim 12 wherein the ion-containing layered component (B) of Component III is derived from at least one ion containing layered material having interspaces between the layers and capable of exhibiting Lewis acidity, said layered material having a cationic component and an anionic component, wherein said cationic component is present within the interspace of the layered material and said layered material is intimately dispersed with said inorganic oxide component of the Component III.

15. The process of claim 13 wherein the ion-containing layered component (B) of Component III is derived from at least one ion containing layered material having interspaces between the layers and capable of exhibiting Lewis acidity, said layered material having a cationic component and an anionic component, wherein said cationic component is present within the interspace of the layered material and said layered material is intimately dispersed with said inorganic oxide component of the Component III.

16. The process of claim 12 wherein at least about 80 weight percent of the inorganic oxide (A) of the Component III comprises silica gel.

17. The process of claim 1 wherein in each of the formula IA and IB:
each A in IA and at least two A's in IB represent nitrogen;
each R independently represents a $C_3$–$C_{20}$ hydrocarbyl group;
each x independently represents 1 or 2; and
the lines joining each A to each other A represents a $C_3$–$C_{20}$ hydrocarbylene radical.

18. The process of claim 2 wherein: $R^1$ and $R^4$ are each independently selected from an unsubstituted or substituted $C_3$–$C_2$o hydrocarbyl group; and each A independently represents oxygen or nitrogen.

19. The process of claim 3 wherein each A represents oxygen or nitrogen; $R^{20}$ and $R^{21}$ are each independently selected from an unsubstituted or substituted aryl group; $R^{12}$ $R^{19}$ is each in dependently selected from an unsubstituted or substituted hydrocarbyl; $R^9$ $R^{10}$ and $R^{12}$ are hydrogen; $R^{22}$ and $R^{23}$ are independently selected from hydrogen or methyl.

20. The process of claim 2 wherein the Component III, (B) is derived from layered clay and clay minerals having a three dimensional structure wherein stronger bonds are present in two of the three dimensions and have a negative charge of less than 0.

21. The process of claim 3 wherein the Component III, (B) is derived from layered clay and clay minerals having a three dimensional structure wherein stronger bonds are present in two of the three dimensions and have a negative charge of less than 0.

22. The process of claim 2 wherein the Component III comprises component (A) to (B) in a weight ratio of from 0.025:1 to 99:1 and has a surface area of from about 20 to about 800 $m^2$/g; a bulk density of at least about 0.15 g/ml; an average pore diameter of from 30 to 300 Å; a total pore volume of from about 0.1 to about 2 cc/g; and an average particle size of from about 4 to about 250 microns.

23. The process of claim 3 wherein the Component III comprises component (A) to (B) in a weight ratio of from 0.025:1 to 99:1 and has a surface area of from about 20 to about 800 $m^2$/g; a bulk density of at least about 0.15 g/ml; an average pore diameter of from 30 to 300 Å; a total pore volume of from about 0.1 to about 2 cc/g; and an average particle size of from about 4 to about 250 microns.

24. The process of claim 1, 2, 3, 4, 5, 6, 7, 8 or 9 wherein Components (I), (II) and (III) are contacted substantially simultaneously in a liquid medium.

25. The process of claim 1, 2, 3, 4, 5, 6, 7, 8 or 9 wherein Components (II) and (III) are contacted substantially simultaneously in a liquid medium follows by contact with Component (I).

26. The process of claim 1, 2, 3, 4, 5, 6, 7, 8 or 9 wherein Components (I) and (III) are contacted substantially simultaneously in a liquid medium followed by contact with Component (II).

27. The process of claim 1, 2, 3, 4, 5, 6, 7, 8 or 9 wherein Component (I) comprises precursor reagents capable of forming said bidentate or tridentate ligand.

28. A catalyst useful for the polymerization of olefins formed by contacting substantially simultaneously in an inert liquid:

Component (I) is selected from at least one ligand forming compound or precursor compounds capable of forming at least one ligand forming compound, wherein said at least one ligand forming compound is represented by the general formula:

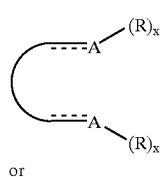

IA or

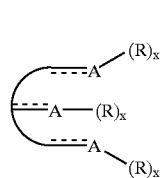

IB wherein in each of formulas IA and TB above:
each A independently represents an atom of oxygen, sulfur, phosphorous or nitrogen;
each R independently represents hydrogen, an unsubstituted or substituted $C_1$–$C_{20}$ hydrocarbyl;
- - - represents a bond between an A atom and a carbon atom, wherein said bond is selected from a single or a double bond;
each x independently represents an integer of 0, 1 or 2, provided that when A represents either a nitrogen or phosphorous atom and - - - represents a double bond then x is 1; when A represents either a nitrogen or phosphorous atom and --- represents a single band, then x is 2; when A represents either an oxygen or sulfur atom and --- represents a double band, then x is 0; and when A represents either an oxygen or sulfur atom and --- represents a single band, then x is 1: and the lines joining each A to each other A represent a $C_2$ to $C_{90}$ hydrocarbon based group; with Component(II) comprising a transition metal compound represented by the formula:

$$M^xL_2L'_a \qquad \text{II}$$

wherein a is an integer of 0, 1 or 2 such that a plus 2 equals x,

M represents at least one of Group 3 to 10 transition metals of the Periodic Table; and each L and L', independently represents a group selected from hydrogen, halogen, and hydrocarbon based group associated through a covalent bond to M, or together represent a $C_3$ to $C_{24}$ hydrocarbon based group, associated through a covalent or dative bond to M, and which, together with M, constitute a ring or fused ring structure; and with (III) a support-activator agglomerate composite comprising agglomerates of at least two components comprising (A) at least one inorganic oxide component and (B) at least one ion-containing layered component;

said contacting being conducted under conditions sufficient to have Component I, II and II form an activated catalyst composition.

29. The catalyst of claim 28 wherein the Component I is at least one compound represented by the formula:

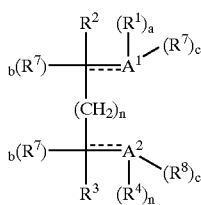

Ia a, b and c each independently represent 0 or 1;

$R^1$ and $R^4$ are each independently selected from an unsubstituted or substituted $C_1$–$C_{20}$ hydrocarbyl group, or a fluorinated hydrocarbyl group or together with adjacent groups represent a $C_3$–$C_{20}$ hydrocarbylene group;

$R^2$, $R^3$, $R^6$, $R^7$, and $R^8$ independently selected from an hydrogen, an unsubstituted or substituted $C_1$–$C_{20}$ hydrocarbyl group, or any two adjacent R groups together represent an unsubstituted or substituted $C_3$–$C_{20}$ hydrocarbylene group;

each A independently represents oxygen, nitrogen, sulfur or phosphorous; and

--- represents a bond between an A atom and a carbon atom, wherein said bond is selected from a single or a double bond; and a, b and c each independently represent 0 or 1, provided that when A represents a nitrogen or phosphorous atom and represents a double bond, then a and b are 0 and c is 1; when A represents a nitrogen or phosphorous atom and represents a single bond then a, b and c are each 1; when A represents oxygen or sulfur and --- represents a double bond, then a, b and c are each 0, and when A represents oxygen or sulfur atom and --- represents a single bond, then a and b are each 1 and c is 0.

30. The catalyst of claim 28 wherein the Component I is at least one compound represented by the formula:

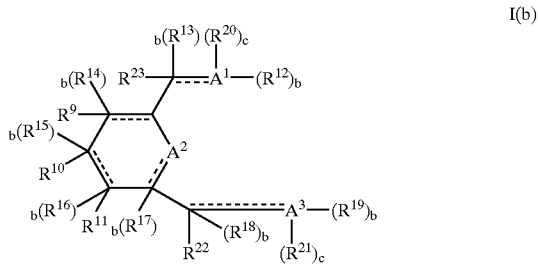

I(b)

wherein:

$R^{20}$ and $R^{21}$ are each independently selected from hydrogen, or an unsubstituted or substituted aryl group wherein said substitution is an alkyl or a hetero group which is inert with respect to any contemplated polymerization;

$R^{22}$ and $R^{23}$ are each independently selected from hydrogen, an unsubstituted or substituted $C_1$–$C_{20}$ hydrocarbyl;

$R^9$ $R^{19}$ are each independently selected from hydrogen, an unsubstituted or substituted $C_1$–$C_{20}$ hydrocarbyl or an inert functional group;

each A independently represents oxygen, nitrogen, sulfur or phosphorous;

--- represents a bond between atoms wherein said bond is selected from a single or a double bond; and b and c are each independently 0 or 1; provided that when A is nitrogen or phosphorous atom and --- represents a double bond, then b is 0 and c is 1; when A is nitrogen or phosphorous atom and --- represents a single bond each b and c is 1; when A represents oxygen or sulfur atom and --- is a double bond, then a and b are each 0; and, when A represents oxygen or sulfur atom and --- is a single bond, then b isO and c is 1.

31. The catalyst of claim 28 wherein at least one L of the Component II is a halogen atom selected from chlorine or bromine.

32. The catalyst of claim 29 wherein at least one L of the Component II is a halogen atom selected from chlorine or bromine.

33. The catalyst of claim 30 wherein at least one L of the Component II is a halogen atom selected from chlorine or bromine.

34. The catalyst of claim 28 wherein L and L' of the Component II are halogen atoms selected from chlorine or bromine.

35. The catalyst of claim 28 wherein M of the Component II is a transition metal selected from Fe, Co, Ni, Ru, Rh, Pd, Os, Ir, Pt in the +2 or +3 oxidation state or Ti, V, Cr, Mn, Zr, Hf in the +2, +3 or +4 oxidation state and at least one L is selected from chlorine or bromine.

36. The catalyst of claim 28 wherein M of the Component II is a transition metal selected from Fe, Co, Ni, or Pd, in the +2 or +3 oxidation state and at least one L is selected from chlorine or bromine.

37. The catalyst of claim 29 or 30 wherein M of the Component II is a transition metal selected from Fe, Co, Ni, or Pd, in the +2 or +3 oxidation state and at least one L is selected from chlorine or bromine.

38. The catalyst of claim 29 or 30 wherein the Component II is iron chloride.

39. The catalyst of claim 28, 29, 30, 31, 32, 33, 34, 35 or 36 wherein Component III is derived from the inorganic oxide (A) selected from $SiO_2$, $Al_2O_3$, $AlPO_4$, MgO, $TiO_2$, $ZrO_2$, $SiO_2.Al_2O_3$, $MgO.SiO_2.Al_2O_3$, $SiO_2.TiO_2.Al_2O_3$, $SiO_2.Cr_2O_3.Al_2O_3$ or $SiO_2.Cr_2O_3.TiO_2$ and mixtures thereof.

40. The catalyst of claim 37 wherein Component III is derived from the inorganic oxide (A) selected from $SiO_2$, $Al_2O_3$, $AlPO_4$, MgO, $TiO_2$, $ZrO_2$, $SiO_2.Al_2O_3$, $MgO.SiO_2.Al_2O_3$, $SiO_2.TiO_2.Al_2O_3$, $SiO_2.Cr_2O_3.Al_2O_3$ or $SiO_2.Cr_2O_3.TiO_2$ and mixtures thereof.

41. The catalyst of claim 39 wherein the ion-containing layered component (B) of Component III is derived from at least one ion containing layered material having interspaces between the layers and capable of exhibiting Lewis acidity, said layered material having a cationic component and an anionic component, wherein said cationic component is present within the interspace of the layered material and said layered material is intimately dispersed with said inorganic oxide component of the Component III.

42. The catalyst of claim 28 wherein at least about 80 weight percent of the inorganic oxide component (A) of the support activator is composed of a silica gel.

43. The catalyst of claim 28 wherein in each of the formula IA and IB:
each A in IA and at least two A's in IB represent nitrogen;
each R independently represents a $C_3$–$C_{20}$ hydrocarbyl group;
each x independently represents 1 or 2; and
the lines joining each A to each other A represents a $C_3$–$C_{20}$ hydrocarbylene radical.

44. The catalyst of claim 29 wherein $R^1$ and $R^4$ are each independently selected from an unsubstituted or substituted $C_3$–$C_{20}$ hydrocarbyl group; and each A independently represents oxygen or nitrogen.

45. The catalyst of claim 30 wherein each A is selected from oxygen or nitrogen; $R^{20}$ and $R^{21}$ are each independently selected from an unsubstituted or substituted aryl group; $R^{12}$ $R^{29}$ is each independently selected from an unsubstituted or substituted hydrocarbyl; $R^9$, $R^{20}$ and $R^{11}$ are hydrogen; $R^{22}$ and $R^{23}$ are independently selected from hydrogen or methyl.

46. The catalyst of claim 28 wherein the Component III, (B) is derived from layered clay and clay minerals having a three dimensional structure wherein stronger bonds are present in two of the three dimensions and have a negative charge of less than 0.

47. The catalyst of claim 29 or 30 wherein the Component III, (B) is derived from layered clay and clay minerals having a three dimensional structure wherein stronger bonds are present in two of the three dimensions and have a negative charge of less than 0.

48. The catalyst of claim 28 wherein the Component III comprises component (A) to (B) in a weight ratio of from 0.025:1 to 99:1 and has a surface area of from about 20 to about 800 m²/g; a bulk density of at least about 0.15 g/ml; an average pore diameter of from 30 to 300 Å; a total pore volume of from about 0.1 to about 2 cc/g; and an average particle size of from about 4 to about 250 microns.

49. The catalyst of claim 29 wherein the Component III comprises component (A) to (B) in a weight ratio of from 0.025:1 to 99:1 and has a surface area of from about 20 to about 800 m²/g; a bulk density of at least about 0.15 g/ml; an average pore diameter of from 30 to 300 Å; a total pore volume of from about 0.1 to about 2 cc/g; and an average particle size of from about 4 to about 250 microns.

50. The catalyst of claim 28, 29, 30, 31, 32, 33, 34, 35 or 36 wherein Components(I), (II) and (III) are contacted substantially simultaneously in a liquid medium.

51. The catalyst of claim 28, 29, 30, 31, 32, 33, 34, 35 or 36 wherein Components (II) and (III) are contacted substantially simultaneously in a liquid medium follows by contact with Component (I).

52. The catalyst of claim 28, 29, 30, 31, 32, 33, 34, 35 or 36 wherein Components (I) and (III) are contacted substantially simultaneously in a liquid medium followed by contact with Component (II).

53. The catalyst of claim 28, 29, 30, 31, 32, 33, 34, 35 or 36 wherein Component (I) comprises precursor reagents capable of forming said bidentate or tridentate ligand.

54. A process for the polymerization of olefins comprising contacting in a polymerization zone at least one olefinic compound with the catalyst composition of claim 28, 29, 30, 31, 32, 33, 34, 35 or 36.

55. A process for the polymerization of olefins comprising contacting in a polymerization zone at least one olefinic compound with the catalyst composition of claim 37.

56. A process for the polymerization of olefins comprising contacting in a polymerization zone at least one olefinic compound with the catalyst composition of claim 39.

57. A process for the polymerization of olefins comprising contacting in a polymerization zone at least one olefinic compound with the catalyst composition of claim 41.

58. A process for the polymerization of olefins comprising contacting in a polymerization zone at least one olefinic compound with the catalyst composition of claim 50.

59. A process for the polymerization of olefins comprising contacting in a polymerization zone at least one olefinic compound with the catalyst composition of claim 51.

60. A process for the polymerization of olefms comprising contacting in a polymerization zone at least one olefinic compound with the catalyst composition of claim 52.

61. A process for the polymerization of olefins comprising contacting in a polymerization zone at least one olefinic compound with the catalyst composition of claim 53.

62. The process of claim 54 wherein the polymerization zone further contains a compound represented by the formula:

$$D^s(R^{20})_s \qquad \text{IV}$$

wherein D represents an element of the Group 1, 2 or 13 of the Periodic Table, or a tin atom or a zinc atom; each $R^{20}$ independently represents a hydrogen atom, a halogen atom, a $C_1$ to $C_{24}$ hydrocarbyl or halogenated hydrocarbyl group, and s is the oxidation number of D.

63. The process of claim 57 wherein the polymerization zone further contains a compound represented by the formula:

$$D^s(R^{20})_s \qquad \text{IV}$$

wherein D represents an element of the Group 1, 2 or 13 of the Periodic Table, or a tin atom or a zinc atom; each $R^{20}$ independently represents a hydrogen atom, a halogen atom, a $C_1$ to $C_{24}$ hydrocarbyl or halogenated hydrocarbyl group, and s is the oxidation number of D.

64. The process of claim 54 wherein the polymerization zone further contains at least one supplemental particulate catalyst comprising:
i) a pre-catalyst component selected from a supported bidentate transition metal complex or tridentate transition metal complex, a metallocene transition metal complex or constrained geometry transition metal complex or precursors of said complexes, or mixtures thereof; and
ii) a support for said pre-catalyst composed of a support-activator agglomerate comprising (A) at least one inorganic oxide component selected from $SiO_2.Al_2O_3$, $MgO.SiO_2.Al_2O_3$, $SiO_2.TiO_2.Al_2O_3$, $SiO_2.Cr_2O_3.Al_2O_3$ or $SiO_2.Cr_2O_3.TiO_2$ and mixtures thereof, and (B) at least one ion-containing layered component having interspaces between the layers and capable of exhibiting Lewis acidity, said layered material having a cationic component and an anionic component, wherein said cationic component is present within the interspace of the layered material and said layered material is intimately dispersed with said inorganic oxide component of the Component III.

65. The process of claim 57 wherein the polymerization zone further contains at least one supplemental particulate catalyst comprising:

i) at least one pre-catalyst component selected from a supported bidentate transition metal complex, a tridentate transition metal complex, a metallocene transition metal complex or a constrained geometry transition metal complex or precursors of said complexes, or mixtures thereof; and ii) a support for said pre-catalyst composed of a support-activator agglomerate comprising (A) at least one inorganic oxide component selected from $SiO_2.Al_2O_3$, $MgO.SiO_2.Al_2O_3$, $SiO_2.TiO_2.Al_2O_3$, $SiO_2.Cr_2O_3.Al_2O_3$ or $SiO_2.Cr_2O_3.TiO_2$ and mixtures thereof, and (B) at least one ion-containing layered component having interspaces between the layers and capable of exhibiting Lewis acidity, said layered material having a cationic component and an anionic component, wherein said cationic component is present within the interspace of the layered material and said layered material is intimately dispersed with said inorganic oxide component of the Component III.

66. The process of claim 64 wherein the support-activator agglomerate of said at least one supplemental particulate catalyst has chromium atoms immobilized to the support-activator agglomerate.

67. The process of claim 65 wherein the support-activator agglomerate of said at least one supplemental particulate catalyst has chromium atoms immobilized to the support-activator agglomerate.

* * * * *